(12) United States Patent
Shah et al.

(10) Patent No.: US 12,554,473 B2
(45) Date of Patent: Feb. 17, 2026

(54) HANDLING INTERRUPTS FROM A VIRTUAL FUNCTION IN A SYSTEM WITH A MULTI-DIE RECONFIGURABLE PROCESSOR

(71) Applicant: SambaNova Systems, Inc., Palo Alto, CA (US)

(72) Inventors: Manish K. Shah, Austin, TX (US); Paul Jordan, Austin, TX (US); Maran Wilson, Palo Alto, CA (US); Ravinder Kumar, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 532 days.

(21) Appl. No.: 18/118,410

(22) Filed: Mar. 7, 2023

(65) Prior Publication Data

US 2023/0244515 A1 Aug. 3, 2023

Related U.S. Application Data

(63) Continuation of application No. 18/104,759, filed on Feb. 1, 2023.
(Continued)

(51) Int. Cl.
*G06F 8/41* (2018.01)
*G06F 9/455* (2018.01)
(Continued)

(52) U.S. Cl.
CPC .............. *G06F 8/457* (2013.01); *G06F 8/441* (2013.01); *G06F 9/45558* (2013.01);
(Continued)

(58) Field of Classification Search
CPC .......................... G06F 9/5077; G06F 12/121
See application file for complete search history.

(56) References Cited

U.S. PATENT DOCUMENTS 11,250,105 B2   2/2022   Wang et al.
11,327,923 B2   5/2022   Wang et al.
(Continued)

FOREIGN PATENT DOCUMENTS

WO    2010142987 A1    12/2010

OTHER PUBLICATIONS

Koeplinger et al., Spatial: A Language and Compiler for Application Accelerators, PLDI '18, Jun. 18-22, 2018, Association for Computng Machinery, 16 pages.
(Continued)

*Primary Examiner* — Getente A Yimer
(74) *Attorney, Agent, or Firm* — Flagship Patents; Sikander M. Khan; Bruce A. Young

(57) ABSTRACT

A system is presented that includes a communication link, a runtime processor, and a reconfigurable processor. The reconfigurable processor is adapted for generating an interrupt to the runtime processor in response to a predetermined event and includes first and second dies arranged in a package, having respective first and second arrays of coarse-grained reconfigurable (CGR) units, and respective first and second communication link interfaces coupled to the communication link. The runtime processor is adapted for configuring the first and second communication link interfaces to provide access to the first and second arrays of coarse-grained reconfigurable units from first and second physical function drivers and from at least one virtual function driver, and the reconfigurable processor is adapted for sending the interrupt to the first or to the second physical function driver and for sending the interrupt to a virtual function driver of the at least one virtual function driver.

20 Claims, 15 Drawing Sheets

Related U.S. Application Data

(60) Provisional application No. 63/305,956, filed on Feb. 2, 2022.

(51) Int. Cl.
*G06F 9/48* (2006.01)
*G06F 13/24* (2006.01)

(52) U.S. Cl.
CPC ............ *G06F 9/4812* (2013.01); *G06F 13/24* (2013.01); *G06F 2009/45579* (2013.01); *G06F 2009/45583* (2013.01); *G06F 2009/45595* (2013.01); *G06F 2213/0026* (2013.01)

(56) References Cited

U.S. PATENT DOCUMENTS

| | | | |
|---|---|---|---|
| 11,409,540 B1* | 8/2022 | Grohoski | G06F 15/80 |
| 11,410,027 B2 | 8/2022 | Chen et al. | |
| 11,487,694 B1* | 11/2022 | Misra | G06F 9/5077 |
| 2006/0004997 A1 | 1/2006 | Mykland | |
| 2006/0149608 A1 | 7/2006 | Asgari et al. | |
| 2006/0259650 A1 | 11/2006 | Chou et al. | |
| 2008/0114937 A1 | 5/2008 | Reid et al. | |
| 2008/0183955 A1 | 7/2008 | Yang et al. | |
| 2009/0064199 A1 | 3/2009 | Bidelis et al. | |
| 2010/0332775 A1 | 12/2010 | Kapil et al. | |
| 2012/0126850 A1 | 5/2012 | Wasson et al. | |
| 2012/0131257 A1 | 5/2012 | Rudosky et al. | |
| 2013/0080732 A1 | 3/2013 | Nellans et al. | |
| 2014/0003284 A1* | 1/2014 | Doyle | H04L 67/10 370/254 |
| 2015/0128268 A1* | 5/2015 | Fine | H04L 63/1441 726/23 |
| 2021/0216873 A1 | 7/2021 | Liu | |
| 2021/0271630 A1 | 9/2021 | Koeplinger et al. | |
| 2021/0373867 A1* | 12/2021 | Chen | G06F 8/41 |
| 2022/0012077 A1 | 1/2022 | Kumar et al. | |
| 2022/0058129 A1 | 2/2022 | Kim et al. | |
| 2023/0029331 A1 | 1/2023 | Chisnall et al. | |
| 2023/0095330 A1* | 3/2023 | Lee | G11C 11/419 365/154 |

OTHER PUBLICATIONS

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al, A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

* cited by examiner

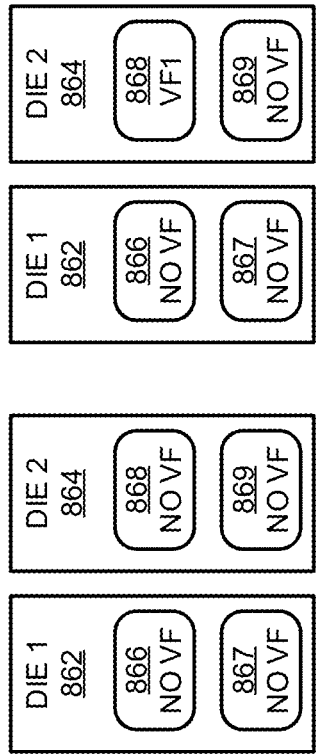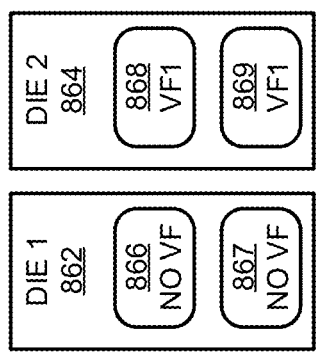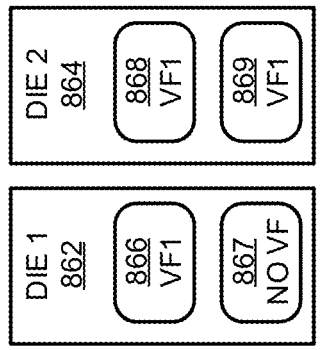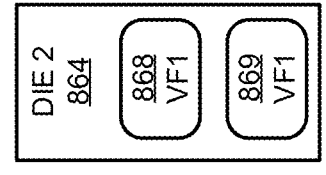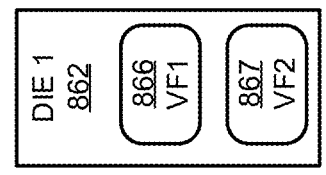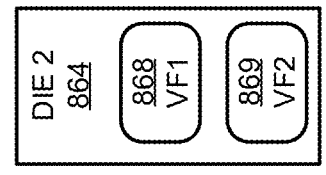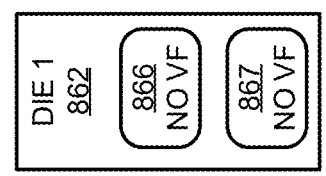

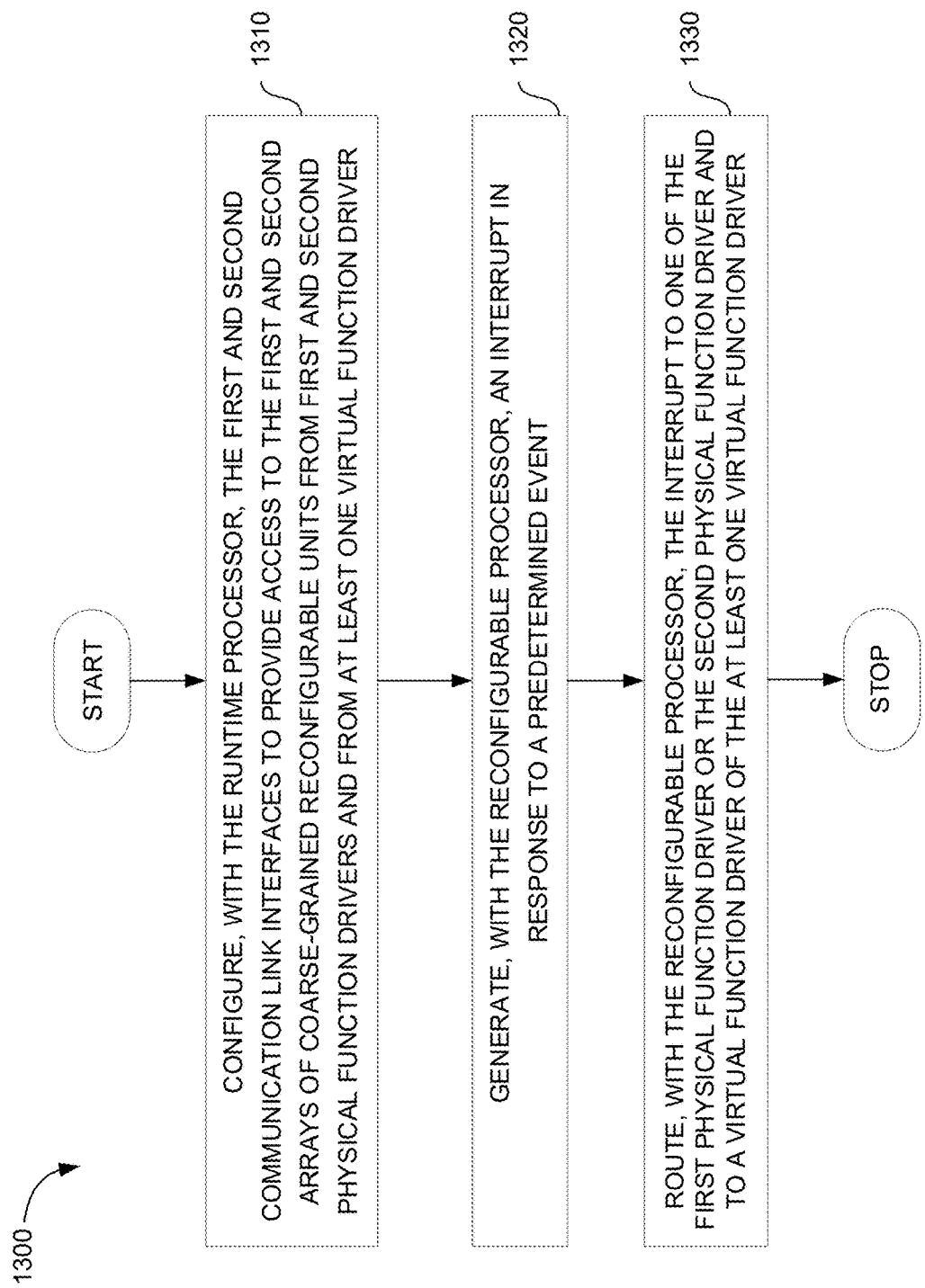

HANDLING INTERRUPTS FROM A VIRTUAL FUNCTION IN A SYSTEM WITH A MULTI-DIE RECONFIGURABLE PROCESSOR

RELATED APPLICATIONS AND DOCUMENTS

This application is a continuation application of co-pending, commonly-assigned U.S. patent application Ser. No. 18/104,759, entitled, "Configurable Access to a Multi-Die Reconfigurable Processor by a Virtual Function,", filed on Feb. 1, 2023, which claims the benefit of U.S. Provisional Patent Application No. 63/305,956, entitled, "Configurable Virtual Function" filed on 2 Feb. 2022. The priority application and the provisional application are hereby incorporated herein in their entirety for all purposes.

This application also is related to the following papers and commonly owned applications:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;

U.S. Nonprovisional patent application Ser. No. 16/239, 252, now U.S. Pat. No. 10,698,853 B1, filed Jan. 3, 2019, entitled "VIRTUALIZATION OF A RECONFIGURABLE DATA PROCESSOR;"

U.S. Nonprovisional patent application Ser. No. 16/862, 445, now U.S. Pat. No. 11,188,497 B2, filed Apr. 29, 2020, entitled "VIRTUALIZATION OF A RECONFIGURABLE DATA PROCESSOR;"

U.S. Nonprovisional patent application Ser. No. 16/197, 826, now U.S. Pat. No. 10,831,507 B2, filed Nov. 21, 2018, entitled "CONFIGURATION LOAD OF A RECONFIGURABLE DATA PROCESSOR;"

U.S. Nonprovisional patent application Ser. No. 16/198, 086, now U.S. Pat. No. 11,188,497 B2, filed Nov. 21, 2018, entitled "CONFIGURATION UNLOAD OF A RECONFIGURABLE DATA PROCESSOR;"

U.S. Nonprovisional patent application Ser. No. 17/093, 543, filed Nov. 9, 2020, entitled "EFFICIENT CONFIGURATION OF A RECONFIGURABLE DATA PROCESSOR;"

U.S. Nonprovisional patent application Ser. No. 16/260, 548, now U.S. Pat. No. 10,768,899 B2, filed Jan. 29, 2019, entitled "MATRIX X NORMAL/TRANSPOSE READ AND A RECONFIGURABLE DATA PROCESSOR INCLUDING SAME;"

U.S. Nonprovisional patent application Ser. No. 16/536, 192, now U.S. Pat. No. 11,080,227 B2, filed Aug. 8, 2019, entitled "COMPILER FLOW LOGIC FOR RECONFIGURABLE ARCHITECTURES;"

U.S. Nonprovisional patent application Ser. No. 17/326, 128, filed May 20, 2021, entitled "COMPILER FLOW LOGIC FOR RECONFIGURABLE ARCHITECTURES;"

U.S. Nonprovisional patent application Ser. No. 16/407, 675, now U.S. Pat. No. 11,386,038 B2, filed May 9, 2019, entitled "CONTROL FLOW BARRIER AND RECONFIGURABLE DATA PROCESSOR;"

U.S. Nonprovisional patent application Ser. No. 16/504, 627, now U.S. Pat. No. 11,055,141 B2, filed Jul. 8, 2019, entitled "QUIESCE RECONFIGURABLE DATA PROCESSOR;"

U.S. Nonprovisional patent application Ser. No. 17/322, 697, filed May 17, 2021, entitled "QUIESCE RECONFIGURABLE DATA PROCESSOR;"

U.S. Nonprovisional patent application Ser. No. 16/572, 516, filed Sep. 16, 2019, entitled "EFFICIENT EXECUTION OF OPERATION UNIT GRAPHS ON RECONFIGURABLE ARCHITECTURES BASED ON USER SPECIFICATION;"

U.S. Nonprovisional patent application Ser. No. 16/744, 077, filed Jan. 15, 2020, entitled "COMPUTATIONALLY EFFICIENT SOFTMAX LOSS GRADIENT BACKPROPAGATION;"

U.S. Nonprovisional patent application Ser. No. 16/590, 058, now U.S. Pat. No. 11,327,713 B2, filed Oct. 1, 2019, entitled "COMPUTATION UNITS FOR FUNCTIONS BASED ON LOOKUP TABLES;"

U.S. Nonprovisional patent application Ser. No. 16/695, 138, now U.S. Pat. No. 11,328,038 B2, filed Nov. 25, 2019, entitled "COMPUTATIONAL UNITS FOR BATCH NORMALIZATION;"

U.S. Nonprovisional patent application Ser. No. 16/688, 069, filed Nov. 19, 2019, now U.S. Pat. No. 11,327,717 B2, entitled "LOOK-UP TABLE WITH INPUT OFFSETTING;"

U.S. Nonprovisional patent application Ser. No. 16/718, 094, filed Dec. 17, 2019, now U.S. Pat. No. 11,150,872 B2, entitled "COMPUTATIONAL UNITS FOR ELEMENT APPROXIMATION;"

U.S. Nonprovisional patent application Ser. No. 16/560, 057, now U.S. Pat. No. 11,327,923 B2, filed Sep. 4, 2019, entitled "SIGMOID FUNCTION IN HARDWARE AND A RECONFIGURABLE DATA PROCESSOR INCLUDING SAME;"

U.S. Nonprovisional patent application Ser. No. 16/572, 527, now U.S. Pat. No. 11,410,027 B2, filed Sep. 16, 2019, entitled "Performance Estimation-Based Resource Allocation for Reconfigurable Architectures;"

U.S. Nonprovisional patent application Ser. No. 15/930, 381, now U.S. Pat. No. 11,250,105 B2, filed May 12, 2020, entitled "COMPUTATIONALLY EFFICIENT GENERAL MATRIX-MATRIX MULTIPLICATION (GEMM);"

U.S. Nonprovisional patent application Ser. No. 17/337, 080, now U.S. Pat. No. 11,328,209 B1, filed Jun. 2, 2021, entitled "MEMORY EFFICIENT DROPOUT;"

U.S. Nonprovisional patent application Ser. No. 17/337, 126, now U.S. Pat. No. 11,256,987 B1, filed Jun. 2, 2021, entitled "MEMORY EFFICIENT DROPOUT, WITH REORDERING OF DROPOUT MASK ELEMENTS;"

U.S. Nonprovisional patent application Ser. No. 16/890, 841, filed Jun. 2, 2020, entitled "ANTI-CONGESTION FLOW CONTROL FOR RECONFIGURABLE PROCESSORS;"

U.S. Nonprovisional patent application Ser. No. 17/023, 015, now U.S. Pat. No. 11,237,971 B1, filed Sep. 16, 2020, entitled "COMPILE TIME LOGIC FOR DETECTING STREAMING COMPATIBLE AND BROADCAST COMPATIBLE DATA ACCESS PATTERNS;"

U.S. Nonprovisional patent application Ser. No. 17/031, 679, filed Sep. 24, 2020, entitled "SYSTEMS AND

METHODS FOR MEMORY LAYOUT DETERMINATION AND CONFLICT RESOLUTION;"

U.S. Nonprovisional patent application Ser. No. 17/175,289, now U.S. Pat. No. 11,126,574 B1, filed Feb. 12, 2021, entitled "INSTRUMENTATION PROFILING FOR RECONFIGURABLE PROCESSORS;"

U.S. Nonprovisional patent application Ser. No. 17/371,049, filed Jul. 8, 2021, entitled "SYSTEMS AND METHODS FOR EDITING TOPOLOGY OF A RECONFIGURABLE DATA PROCESSOR;"

U.S. Nonprovisional patent application Ser. No. 16/922,975, filed Jul. 7, 2020, entitled "RUNTIME VIRTUALIZATION OF RECONFIGURABLE DATA FLOW RESOURCES;"

U.S. Nonprovisional patent application Ser. No. 16/996,666, filed Aug. 18, 2020, entitled "RUNTIME PATCHING OF CONFIGURATION FILES;"

U.S. Nonprovisional patent application Ser. No. 17/214,768, now U.S. Pat. No. 11,200,096 B1, filed Mar. 26, 2021, entitled "RESOURCE ALLOCATION FOR RECONFIGURABLE PROCESSORS;"

U.S. Nonprovisional patent application Ser. No. 17/127,818, now U.S. Pat. No. 11,182,264 B1, filed Dec. 18, 2020, entitled "INTRA-NODE BUFFER-BASED STREAMING FOR RECONFIGURABLE PROCESSOR-AS-A-SERVICE (RPAAS);"

U.S. Nonprovisional patent application Ser. No. 17/127,929, now U.S. Pat. No. 11,182,221 B1, filed Dec. 18, 2020, entitled "INTER-NODE BUFFER-BASED STREAMING FOR RECONFIGURABLE PROCESSOR-AS-A-SERVICE (RPAAS);"

U.S. Nonprovisional patent application Ser. No. 17/185,264, filed Feb. 25, 2021, entitled "TIME-MULTIPLEXED USE OF RECONFIGURABLE HARDWARE;"

U.S. Nonprovisional patent application Ser. No. 17/216,647, now U.S. Pat. No. 11,204,889 B1, filed Mar. 29, 2021, entitled "TENSOR PARTITIONING AND PARTITION ACCESS ORDER;"

U.S. Nonprovisional patent application Ser. No. 17/216,650, now U.S. Pat. No. 11,366,783 B1, filed Mar. 29, 2021, entitled "MULTI-HEADED MULTI-BUFFER FOR BUFFERING DATA FOR PROCESSING;"

U.S. Nonprovisional patent application Ser. No. 17/216,657, now U.S. Pat. No. 11,263,170 B1, filed Mar. 29, 2021, entitled "LOSSLESS TILING IN CONVOLUTION NETWORKS-PADDING BEFORE TILING, LOCATION-BASED TILING, AND ZEROING-OUT;"

U.S. Nonprovisional patent application Ser. No. 17/384,515, filed Jul. 23, 2021, entitled "LOSSLESS TILING IN CONVOLUTION NETWORKS-MATERIALIZATION OF TENSORS;"

U.S. Nonprovisional patent application Ser. No. 17/216,651, now U.S. Pat. No. 11,195,080 B1, filed Mar. 29, 2021, entitled "LOSSLESS TILING IN CONVOLUTION NETWORKS-TILING CONFIGURATION;"

U.S. Nonprovisional patent application Ser. No. 17/216,652, now U.S. Pat. No. 11,227,207 B1, filed Mar. 29, 2021, entitled "LOSSLESS TILING IN CONVOLUTION NETWORKS-SECTION BOUNDARIES;"

U.S. Nonprovisional patent application Ser. No. 17/216,654, now U.S. Pat. No. 11,250,061 B1, filed Mar. 29, 2021, entitled "LOSSLESS TILING IN CONVOLUTION NETWORKS-READ-MODIFY-WRITE IN BACKWARD PASS;"

U.S. Nonprovisional patent application Ser. No. 17/216,655, now U.S. Pat. No. 11,232,360 B1, filed Mar. 29, 2021, entitled "LOSSLESS TILING IN CONVOLUTION NETWORKS-WEIGHT GRADIENT CALCULATION;"

U.S. Nonprovisional patent application Ser. No. 17/364,110, filed Jun. 30, 2021, entitled "LOSSLESS TILING IN CONVOLUTION NETWORKS-TILING CONFIGURATION FOR A SEQUENCE OF SECTIONS OF A GRAPH;"

U.S. Nonprovisional patent application Ser. No. 17/364,129, filed Jun. 30, 2021, entitled "LOSSLESS TILING IN CONVOLUTION NETWORKS-TILING CONFIGURATION BETWEEN TWO SECTIONS;"

"U.S. Nonprovisional patent application Ser. No. 17/364,141, filed Jun. 30, 2021, entitled ""LOSSLESS TILING IN CONVOLUTION NETWORKS-PADDING AND RE-TILING AT SECTION BOUNDARIES;"

U.S. Nonprovisional patent application Ser. No. 17/384,507, filed Jul. 23, 2021, entitled "LOSSLESS TILING IN CONVOLUTION NETWORKS-BACKWARD PASS;"

U.S. Provisional Patent Application No. 63/107,413, filed Oct. 29, 2020, entitled "SCANNABLE LATCH ARRAY FOR STRUCTURAL TEST AND SILICON DEBUG VIA SCANDUMP;"

U.S. Provisional Patent Application No. 63/165,073, filed Mar. 23, 2021, entitled "FLOATING POINT MULTIPLY-ADD, ACCUMULATE UNIT WITH CARRY-SAVE ACCUMULATOR IN BF16 AND FLP32 FORMAT;"

U.S. Provisional Patent Application No. 63/166,221, filed Mar. 25, 2021, entitled "LEADING ZERO AND LEADING ONE DETECTOR PREDICTOR SUITABLE FOR CARRY-SAVE FORMAT;"

U.S. Provisional Patent Application No. 63/190,749, filed May 19, 2021, entitled "FLOATING POINT MULTIPLY-ADD, ACCUMULATE UNIT WITH CARRY-SAVE ACCUMULATOR;"

U.S. Provisional Patent Application No. 63/174,460, filed Apr. 13, 2021, entitled "EXCEPTION PROCESSING IN CARRY-SAVE ACCUMULATION UNIT FOR MACHINE LEARNING;"

U.S. Nonprovisional patent application Ser. No. 17/397,241, now U.S. Pat. No. 11,429,349 B1, filed Aug. 9, 2021, entitled "FLOATING POINT MULTIPLY-ADD, ACCUMULATE UNIT WITH CARRY-SAVE ACCUMULATOR;"

U.S. Nonprovisional patent application Ser. No. 17/216,509, now U.S. Pat. No. 11,191,182 B1, filed Mar. 29, 2021, entitled "UNIVERSAL RAIL KIT;"

U.S. Nonprovisional patent application Ser. No. 17/379,921, now U.S. Pat. No. 11,392,740 B2, filed Jul. 19, 2021, entitled "DATAFLOW FUNCTION OFFLOAD TO RECONFIGURABLE PROCESSORS;"

U.S. Nonprovisional patent application Ser. No. 17/379,924, now U.S. Pat. No. 11,237,880 B1, filed Jul. 19, 2021, entitled "DATAFLOW ALL-REDUCE FOR RECONFIGURABLE PROCESSOR SYSTEMS;"

U.S. Nonprovisional patent application Ser. No. 17/378,342, now U.S. Pat. No. 11,556,494 B1, filed Jul. 16, 2021, entitled "DEFECT REPAIR FOR A RECONFIGURABLE DATA PROCESSOR;"

U.S. Nonprovisional patent application Ser. No. 17/378,391, now U.S. Pat. No. 11,327,771 B1, filed Jul. 16, 2021, entitled "DEFECT REPAIR CIRCUITS FOR A RECONFIGURABLE DATA PROCESSOR;"

U.S. Nonprovisional patent application Ser. No. 17/378, 399, now U.S. Pat. No. 11,409,540 B1, filed Jul. 16, 2021, entitled "ROUTING CIRCUITS FOR DEFECT REPAIR FOR A RECONFIGURABLE DATA PROCESSOR;"

U.S. Provisional Patent Application No. 63/220,266, filed Jul. 9, 2021, entitled "LOGIC BIST AND FUNCTIONAL TEST FOR A CGRA;"

U.S. Provisional Patent Application No. 63/195,664, filed Jun. 1, 2021, entitled "VARIATION-TOLERANT VARIABLE-LENGTH CLOCK-STRETCHER MODULE WITH IN-SITU END-OF-CHAIN DETECTION MECHANISM;"

U.S. Nonprovisional patent application Ser. No. 17/338, 620, now U.S. Pat. No. 11,323,124 B1, filed Jun. 3, 2021, entitled "VARIABLE-LENGTH CLOCK STRETCHER WITH CORRECTION FOR GLITCHES DUE TO FINITE DLL BANDWIDTH;"

U.S. Nonprovisional patent application Ser. No. 17/338, 625, now U.S. Pat. No. 11,239,846 B1, filed Jun. 3, 2021, entitled "VARIABLE-LENGTH CLOCK STRETCHER WITH CORRECTION FOR GLITCHES DUE TO PHASE DETECTOR OFFSET;"

U.S. Nonprovisional patent application Ser. No. 17/338, 626, now U.S. Pat. No. 11,290,113 B1, filed Jun. 3, 2021, entitled "VARIABLE-LENGTH CLOCK STRETCHER WITH CORRECTION FOR DIGITAL DLL GLITCHES;"

U.S. Nonprovisional patent application Ser. No. 17/338, 629, now U.S. Pat. No. 11,290,114 B1, filed Jun. 3, 2021, entitled "VARIABLE-LENGTH CLOCK STRETCHER WITH PASSIVE MODE JITTER REDUCTION;"

U.S. Nonprovisional patent application Ser. No. 17/405, 913, now U.S. Pat. No. 11,334,109 B1, filed Aug. 18, 2021, entitled "VARIABLE-LENGTH CLOCK STRETCHER WITH COMBINER TIMING LOGIC;"

U.S. Provisional Patent Application No. 63/230,782, filed Aug. 8, 2021, entitled "LOW-LATENCY MASTER-SLAVE CLOCKED STORAGE ELEMENT;"

U.S. Provisional Patent Application No. 63/236,218, filed Aug. 23, 2021, entitled "SWITCH FOR A RECONFIGURABLE DATAFLOW PROCESSOR;"

U.S. Provisional Patent Application No. 63/236,214, filed Aug. 23, 2021, entitled "SPARSE MATRIX MULTIPLIER;"

U.S. Provisional Patent Application No. 63/389,767, filed Jul. 15, 2022. entitled "PEER-TO-PEER COMMUNICATION BETWEEN RECONFIGURABLE DATAFLOW UNITS;"

U.S. Provisional Patent Application No. 63/405,240, filed Sep. 9, 2022, entitled "PEER-TO-PEER ROUTE THROUGH IN A RECONFIGURABLE COMPUTING SYSTEM."

All of the related application(s) and documents listed above are hereby incorporated by reference herein for all purposes.

FIELD OF THE TECHNOLOGY DISCLOSED

The present technology relates to a data processing system, and more particularly, to a data processing system that handles configurable virtual functions. Such a data processing system includes a communication link, a runtime processor that is operatively coupled to the communication link, and one or more reconfigurable processors, whereby a reconfigurable processor of the one or more reconfigurable processors includes a package with two dies that are arranged in the package.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Reconfigurable processors, including FPGAs, can be configured to implement a variety of functions more efficiently or faster than might be achieved using a general-purpose processor executing a computer program. So-called coarse-grained reconfigurable architectures (CGRAs) are being developed in which the configurable units in the array are more complex than used in typical, more fine-grained FPGAs, and may enable faster or more efficient execution of various classes of functions. For example, CGRAs have been proposed that can enable implementation of low-latency and energy-efficient accelerators for machine learning and artificial intelligence workloads.

Virtualization has enabled the efficient scaling and sharing of compute resources in the cloud, adapting to changing user needs at runtime. Users are offered a view of an application service with management of resources hidden from view, or alternatively abstracted development platforms for deploying applications that can adapt to changing needs. The flexibility, scalability, and affordability offered by cloud computing are fundamental to the massively connected compute paradigm of the future.

Furthermore, applications are migrating to the cloud in search of scalability, resilience, and cost-efficiency. Cloud providers typically offer support for new specialized hardware accelerators such as tensor processing units (TPUs) and intelligence processing units (IPUs), and on-demand graphics processing units (GPUs) and field programmable gate arrays (FPGAs). Such accelerators have driven the success of emerging application domains in the cloud, but cloud computing and hardware specialization are on a collision course.

In recent years, reconfigurable processors have emerged as a contender for cloud accelerators.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 8A is a diagram of an illustrative configuration in which no virtual function is enabled.

FIG. 8B is a diagram of an illustrative configuration in which a virtual function is assigned an array of CGR units on die 2 of a reconfigurable processor.

FIG. 8C is a diagram of an illustrative configuration in which a virtual function is assigned two arrays of CGR units on die 2 of a reconfigurable processor.

FIG. 8D is a diagram of an illustrative configuration in which a virtual function is assigned two arrays of CGR units on die 2 and an array of CGR units on die 1 of a reconfigurable processor.

FIG. 8E is a diagram of an illustrative configuration in which a virtual function is assigned two arrays of CGR units on die 2 and two arrays of CGR units on die 1 of a reconfigurable processor.

FIG. 8F is a diagram of an illustrative configuration in which two virtual functions are each assigned an array of CGR units on die 2 of a reconfigurable processor.

FIG. 8G is a diagram of an illustrative configuration in which a first virtual function is assigned two arrays of CGR units on die 2 and an array of CGR units on die 1 and a second virtual function is assigned another array of CGR units on die 1 of a reconfigurable processor.

FIG. 13 is a flowchart showing illustrative operations that a runtime processor of a data processing system may perform for handling interrupts when virtual functions are enabled in a reconfigurable processor with two dies.

DETAILED DESCRIPTION

Figure 1:
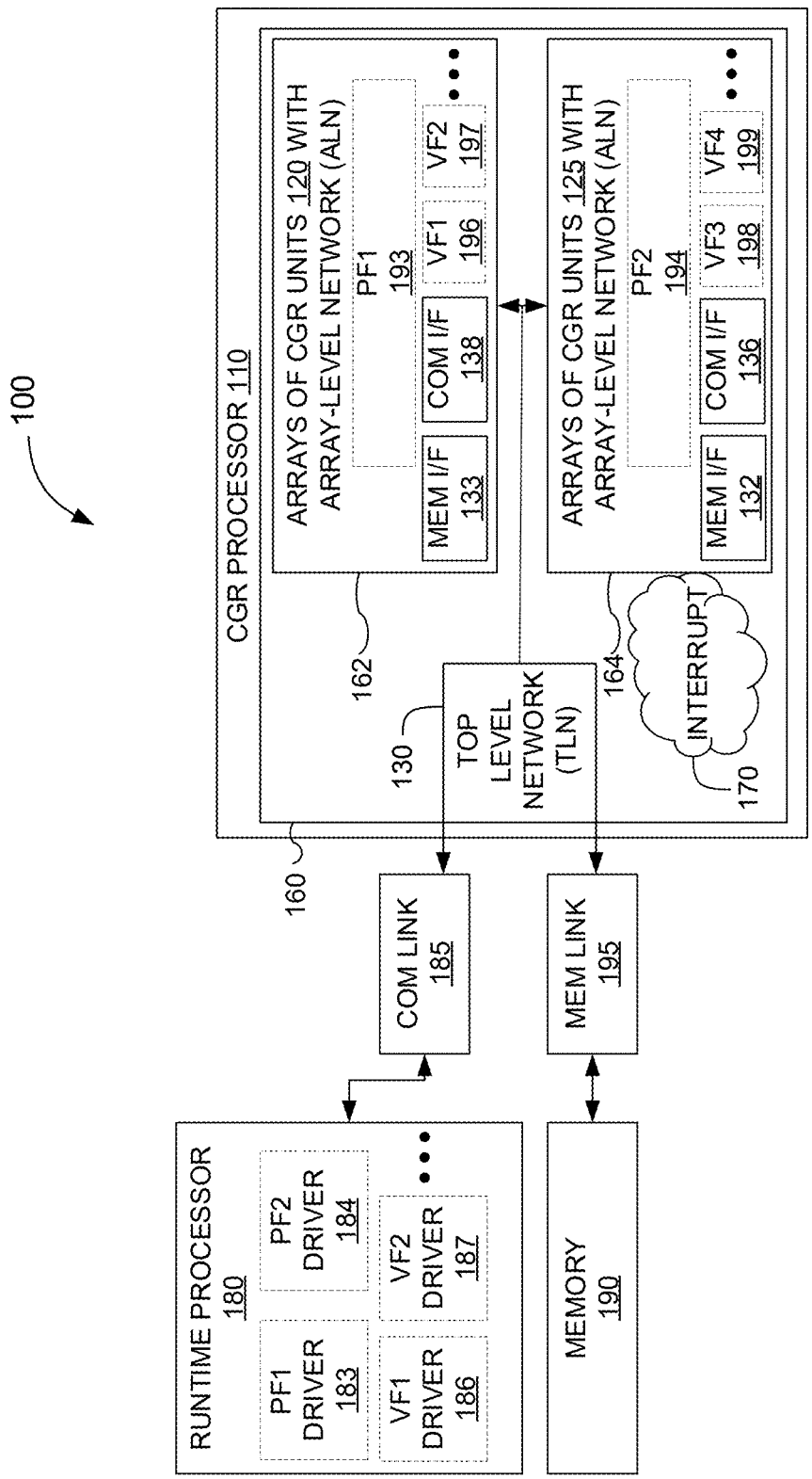
FIG. 1 is a diagram of an illustrative data processing system including a reconfigurable processor with two dies in a package, external memory, and a runtime processor.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Reconfigurable processors combine significant computational capabilities with an architecture more amenable to virtualization and a lower power footprint. A key strength of reconfigurable processors is the ability to modify their operation at runtime, as well as the ease with which they can be safely partitioned for sharing. Reconfigurable processors, including FPGAs, can be configured to implement a variety of functions more efficiently or faster than might be achieved using a general-purpose processor executing a computer program.

So-called coarse-grained reconfigurable architectures (CGRAs) are being developed in which the configurable units in the array are more complex than used in typical, more fine-grained FPGAs, and may enable faster or more efficient execution of various classes of functions. For example, CGRAs have been proposed that can enable implementation of low-latency and energy-efficient accelerators for machine learning and artificial intelligence workloads.

As deep learning accelerators, reconfigurable processors are optimized to provide high performance for single-task and static-workload scenarios, which conflict with the multi-tenancy and dynamic resource allocation requirements of cloud computing.

Cloud applications typically run on virtual infrastructure, but practical virtualization support for accelerators has yet to arrive. Cloud providers routinely support accelerators but do so using Peripheral Component Interconnect Express (PCIe) pass-through techniques that dedicate physical hardware to virtual machines (VMs). Multi-tenancy and consolidation are lost as a consequence, which leads to hardware under-utilization.

In fact, practical virtualization should support sharing and isolation under flexible policy with minimal overhead. The structure of accelerator stacks makes this combination extremely difficult to achieve. Historically, accelerator stacks are silos comprising proprietary layers communicating through memory mapped interfaces. This opaque organization makes it impractical to interpose intermediate layers to form an efficient and compatible virtualization boundary. The remaining interposable interfaces leave designers with untenable alternatives that sacrifice critical virtualization properties such as interposition and compatibility.

It is desirable therefore to provide virtual function support for reconfigurable processors that support multi-client and dynamic-workload scenarios. Runtime support for executing virtual functions on reconfigurable processors is needed that supports sharing and isolation with minimal overhead.

A technology is described which enables the execution of two or more applications on one or more reconfigurable processor with a reconfigurable processor of the one or more reconfigurable processor having two dies that are arranged on a package while ensuring isolation between the two applications.

Traditional compilers translate human-readable computer source code into machine code that can be executed on a Von Neumann computer architecture. In this architecture, a processor serially executes instructions in one or more threads of software code. The architecture is static and the compiler does not determine how execution of the instructions is pipelined, or which processor or memory takes care of which thread. Thread execution is asynchronous, and safe exchange of data between parallel threads is not supported.

High-level programs for machine learning (ML) and artificial intelligence (AI) may require massively parallel computations, where many parallel and interdependent threads (meta-pipelines) exchange data. Such programs are ill-suited for execution on Von Neumann computers. They require architectures that are optimized for parallel processing, such as coarse-grained reconfigurable architectures (CGRAs) or graphic processing units (GPUs). The ascent of ML, AI, and massively parallel architectures places new requirements on compilers, including how computation graphs, and in particular data flow graphs, are pipelined, which operations are assigned to which compute units, how data is routed between various compute units and memory, and how synchronization is controlled, particularly when a data flow graph includes one or more nested loops, whose execution time varies dependent on the data being processed.

The architecture, configurability, and data flow capabilities of an array of coarse-grained reconfigurable (CGR) units enable increased compute power that supports both parallel and pipelined computation. A CGR processor, which includes a package with at least two dies and one or more CGR arrays (arrays of CGR units) arranged on each die, can be programmed to simultaneously execute multiple independent and interdependent data flow graphs. To enable simultaneous execution, the data flow graphs may be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

Translation of high-level programs to executable bit files is performed by a compiler. While traditional compilers sequentially map operations to processor instructions, typically without regard to pipeline utilization and duration (a task usually handled by the hardware), an array of CGR units requires mapping operations to processor instructions in both space (for parallelism) and time (for synchronization of interdependent computation graphs or data flow graphs). This requirement implies that a compiler for a CGRA must decide which operation of a computation graph or data flow graph is assigned to which of the CGR units on which die, and how both data and, related to the support of data flow graphs, control information flows among CGR units, and to and from external hosts and storage.

FIG. 1 illustrates an example system 100 including a CGR processor 110, a runtime processor 180, and a communication link 185 that couples the CGR processor 110 with the runtime processor 180. If desired, the system 100 may include a memory 190 and a memory link 195 that couples the CGR processor 110 with the memory 190. In some implementations, the system 100 may include multiple memories, and a different memory link 195 may couple each memory 190 of the multiple memories with the CGR processor 110.

As shown, CGR processor 110 has a coarse-grained reconfigurable architecture (CGRA) and includes a package 160 with two dies 162, 164. Each one of the two dies 162, 164 includes arrays of CGR units 120, 125, which are sometimes also referred to as CGR arrays.

For example, the first die 162 includes K arrays of CGR units 120, and the second die 164 includes L arrays of CGR units 125, where K and L are integers greater than 1 (i.e., K>1, L>1). Thus, the first die 162 may include two arrays of CGR units 120, three arrays of CGR units 120, four arrays of CGR units 120, or more than four arrays of CGR units 120, and the second die 164 may include two arrays of CGR units 125, three arrays of CGR units 125, four arrays of CGR units 125, or more than four arrays of CGR units 125, if desired. In some implementations, L is greater than or equal to K.

Illustratively, CGR processor 110 may include busses and bus interfaces. The bus interfaces may include communication link interfaces 138, 136 and memory interfaces 133, 132. For example, the CGR processor 110 may include busses and communication link interfaces such as peripheral component interconnect express (PCIe) channels and interfaces and/or network access channels such as InfiniBand™ (IB) or Ethernet channels and interfaces. As another example, the CGR processor 110 may include busses and memory interfaces such as direct memory access (DMA) channels, and/or double data rate (DDR) channels. If desired, CGR processor 110 may include a top-level network (TLN) 130. If desired, CGR processor 110 may include a top-level network per die and die-to-die (D2D) interfaces that bridge the top-level networks together.

As shown in FIG. 1, the first die 162 of CGR processor 110 may include a first communication link interface 138, and the second die 164 may include a second communication link interface 136. Illustratively, the first die 162 may include a first memory interface 133, and the second die 164 may include a second memory interface 132.

Databus 130, which may be part of a top-level network (TLN), may couple the first die 162 to the second die 164, the arrays of CGR units 120 on the first die 162, and thus the first die 162, via the first communication link interface 138 with communication link 185 and the arrays of CGR units 125 on the second die 164, and thus the second die 164, via the second communication link interface 136 with communication link 185. Thus, the first die 162 includes the first communication link interface 138 that is operatively coupled to the communication link 185, thereby coupling the first die 162 to the runtime processor 180 via the communication link 185, and the second die 164 includes the second communication link interface 136 that is operatively coupled to the communication link 185, thereby coupling the second die 164 to the runtime processor 180 via the communication link 185.

Runtime processor 180 communicates with the first communication link interface 138 on the first die 162 via the communication link 185 and with the second communication link interface 136 on the second die 164 via the communication link 185.

In some implementations, arrays of CGR units 120 on the first die 162 may be identical to arrays of CGR units 125 on the second die 164. In other implementations, arrays of CGR units 120 on the first die 162 may be different than arrays of CGR units 125 on the second die.

An array of CGR units 120, 125 on either one of the first and second dies 162, 164 may include control and status registers, compute units and memory units that are interconnected with an array-level network (ALN). The array of CGR units 120, 125 may provide the circuitry for execution of a computation graph or a data flow graph that may have been derived from a high-level program with user algorithms and functions. The high-level program may include a set of procedures, such as learning or inferencing in an AI or ML system. More specifically, the high-level program may include applications, graphs, application graphs, user applications, computation graphs, control flow graphs, data flow graphs, models, deep learning applications, deep learning neural networks, programs, program images, jobs, tasks and/or any other procedures and functions that may perform serial and/or parallel processing. In some implementations, execution of the graph(s) may involve using more than one CGR processor 110.

CGR processor 110 may accomplish computational tasks by executing a configuration file (e.g., a processor-executable format (PEF) file). For the purposes of this description, a configuration file corresponds to a data flow graph, or a translation of a data flow graph, and may further include initialization data. A compiler compiles the high-level program to provide the configuration file. In some implementations described herein, a CGR array 120 is configured by programming one or more configuration stores with all or parts of the configuration file. Therefore, the configuration file is sometimes also referred to as a programming file.

A single configuration store may be at the level of the CGR processor 110, at the level of the first or second die 162, 164, or the level of a CGR array 120, 125, or a CGR unit may include an individual configuration store. The configuration store may include configuration and status registers (CSRs).

The CSRs may be divided into a predetermined number of memory blocks having a predetermined size. If desired, the CSRs in each CGR array 120 of the first die 162 and/or each CGR array 125 of the second die 164 may be organized in one or more memory blocks. As an example, each CGR array 120 of the first die 162 and/or each CGR array 125 of the second die 164 may include one memory block for the CSRs. As another example, each CGR array 120 of the first die 162 and/or each CGR array 125 of the second die 164 may include two memory blocks for the CSRs. If desired, switches within a CGR array 120, 125 or between CGR arrays 120 of the first die 162 and/or within a CGR array 125 or between CGR arrays 125 of the second die 164 and/or between CGR arrays 120, 125 of the first and second dies 162, 164 may include CSRs.

The configuration file may include configuration data for the CGR array and CGR units in the CGR array, and link the computation graph to the CGR array. Execution of the configuration file by CGR processor 110 causes the CGR array(s) to implement the user algorithms and functions in the data flow graph.

CGR processor 110 can be implemented with two or more dies with CGR arrays in a multichip module (MCM). An MCM is an electronic package that may comprise two or more dies with CGR arrays and other optional devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Runtime processor 180 may be, or be included in, a computer or host. Runtime processor 180 may execute runtime processes, as further referenced herein. If desired, the runtime processor may be configured with logic that implements runtime processes.

As mentioned above, the first communication link interface 138 is operatively coupled to the communication link 185, thereby coupling the first die 162 to the runtime processor 180 via the communication link 185, and the second communication link interface 136 is operatively coupled to the communication link 185, thereby coupling the second die 164 to the runtime processor 180 via the communication link 185.

Illustratively, the runtime processor 180 is adapted for configuring the first communication link interface 138 to provide access to the K arrays of CGR units 120 of the first die 162 through the communication link 185 from a first physical function driver 183 and from up to M virtual function drivers 186, 187 where M is a non-negative integer. In some implementations, M may be zero, and the runtime processor 180 may be adapted for configuring the first communication link interface 138 to provide access to the K arrays of CGR units 120 of the first die 162 through the communication link 185 from the first physical function driver 183 only.

In some implementations, a first physical function 193 that is associated with the first physical function driver 183 has exclusive access to a first portion of the K arrays of CGR units 120 of the first die 162, and the first physical function 193 shares access to a second portion of the K arrays of CGR units 120 of the first die 162 that is different than the first portion with up to M virtual functions 196, 197 that are associated with the up to M virtual function drivers 186, 187. The first and second portions of the K arrays of CGR units 120 may include the entire first die 162.

If desired, the first physical function driver 183 and the second physical function driver 184 are a same physical function driver (e.g., PF1 Driver 183), and a first physical function (e.g., PF1 193) that is associated with the same physical function driver has access to the first die 162, and a second physical function (e.g., PF2 194) that is associated with the same physical function driver has access to the second die 164.

Each virtual function of the up to M virtual functions 196, 197 may have exclusive access among the up to M virtual functions to at least one of the K arrays of CGR units 120 of the first die 162. As an example, consider the scenario in which a first virtual function (e.g., VF1 196) of the up to M virtual functions 196, 197 is assigned a first array of CGR units of the K arrays of CGR units 120 of the first die 162. In this scenario, VF1 196 has exclusive access among the up to M virtual functions 196, 197 to the first array of CGR units, and no other virtual function of the up to M virtual functions (e.g., VF2 197) can validly access the first array of CGR units, while the first array of CGR units is assigned to VF1 196.

Illustratively, the runtime processor 180 is adapted for configuring the second communication link interface 136 to provide access to the K arrays of CGR units 120 of the first die 162 and to the L arrays of CGR units 125 of the second die 164 through the communication link 185 from a second physical function driver 184 and from up to N virtual function drivers 186, 187, where N is a non-negative integer. In some implementations, N may be zero, and the runtime processor 180 may be adapted for configuring the second communication link interface 136 to provide access to the K arrays of CGR units 120 of the first die 162 and to the L arrays of CGR units 125 of the second die 164 through the communication link 185 from the second physical function driver 184 only.

In some implementations, a second physical function 194 that is associated with the second physical function driver 184 has exclusive access to a first portion of the K arrays of CGR units 120 of the first die 162 and to a first portion of the L arrays of CGR units 125 of the second die 164, and the second physical function 194 shares access to a second portion of the K arrays of CGR units 120 of the first die 162 and to a second portion of the L arrays of CGR units 125 of the second die 164 with up to N virtual functions (e.g., 196, 197, 198, 199, . . . ) that are associated with the up to N virtual function drivers (e.g., 186, 187, . . . ). As an example, virtual function 196 may be associated with virtual function driver 186, and virtual function 198 may be associated with virtual function driver 187. As another example, virtual functions 196 and 198 may both be associated with virtual function driver 186. In this example, the virtual functions 196 and 198 may be a same virtual function that appears to extend from die 162 to die 164. The first and second portions of the K arrays of CGR units 120 and the L arrays of CGR units 125 may include the entire first and second dies 162, 164.

Each virtual function of the up to N virtual functions (e.g., 196, 197, 198, 199, . . . ) may have exclusive access among the up to N virtual functions to at least one of the K arrays of CGR units 120 of the first die 162 and the L arrays of CGR units 125 of the second die 164. As an example, consider the scenario in which a first virtual function (e.g., VF3 198) of the up to N virtual functions 196, 197, 198, 199 is assigned a first array of CGR units of the L arrays of CGR units 125 of the second die 164. In this scenario, VF3 198 has exclusive access among the up to N virtual functions 196, 197, 198, 199 to the first array of CGR units, and no other virtual function of the up to N virtual functions (e.g., VF4 199) can validly access the first array of CGR units, while the first array of CGR units is assigned to VF3 198.

In some implementations, up to N virtual functions (e.g., 196, 197, 198, 199) are associated with one virtual function driver (e.g., VF1 Driver 186) of the up to N virtual function drivers 186, 187, . . . . In these implementations, the up to N virtual functions are enabled and assigned arrays of the K arrays of coarse-grained reconfigurable units 120 of the first die 162 and/or of the L arrays of coarse-grained reconfigurable units 125 of the second die 164.

In some scenarios, an additional reconfigurable processor of the one or more reconfigurable processors includes an additional package, at least a third die arranged in the additional package that having J arrays of coarse-grained reconfigurable units, where J is an integer greater than 1. In these scenarios, the up to N virtual functions may further be enabled and assigned arrays of the J arrays of coarse-grained reconfigurable units of the third die.

By way of example, N is greater than or equal to M. Thus, the runtime processor 180 may enable at least the same number of virtual functions by configuring the second communication link interface 136 than by configuring the first communication link interface 138.

Illustratively, K may be equal to M and L equal to N. Thus, the runtime processor 180 may assign a CGR array of the K CGR arrays 120 of the first die 162 to each one of the up to M virtual functions through the first communication link interface, and the runtime processor 180 may assign a CGR array of the L CGR arrays 125 of the second die 164 to each one of the up to N virtual functions through the second communication link interface 136.

In some implementations, the CGR processor 110 may be adapted for generating an interrupt 170 to the runtime processor 180 in response to a predetermined event. For example, the predetermined event may include at least one of a load-complete event, an execution-complete event, a checkpoint event, a direct memory access (DMA) completion event, a DMA error event, a memory access error, or a runtime exception.

The CGR processor 110 may route the interrupt 170 to the first physical function driver 183 and/or the second physical function driver 184 and/or to a virtual function driver 186, 187 based on the predetermined event generating the interrupt 170, the portion of the CGR processor 110 detecting or reporting the event, and the configuration of the virtual functions 196, 197, 198, 199 (e.g., the number of enabled VFs and their binding to the portions of the CGR processor 110).

As an example, the CGR processor 110 may configure delivery of the interrupt 170 to the first physical function driver 183 and to one of the up to M virtual function drivers 186, 187 if the event generating the interrupt occurred on the first die 162. As another example, the CGR processor 110 may configure delivery of the interrupt 170 to the second physical function driver 184 and to one of the up to N virtual function drivers 186, 187 if the event generating the interrupt occurred on the second die 164.

If the runtime processor 180 has configured the first and second communication link interfaces 138, 136 to provide access to at least one of the K or L arrays of CGR arrays 120, 125 on the first or second die 162, 164 from at least one virtual function 196, 197, 198, 199, then the CGR processor 110 is adapted for routing the interrupt 170 to the at least one virtual function driver 186, 187 associated with the at least one virtual function 196, 197, 198, 199.

Figure 2:
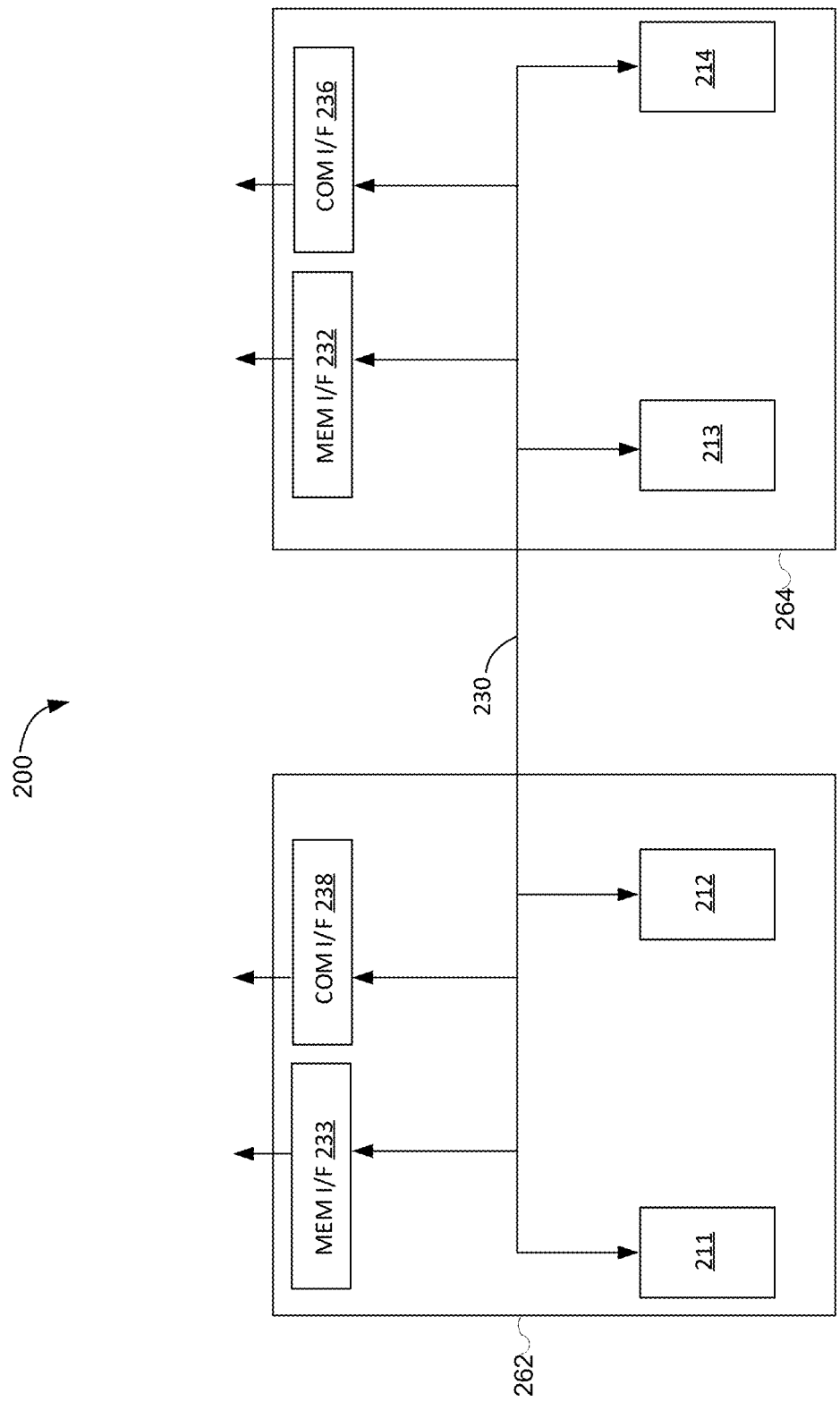
FIG. 2 is a diagram of an illustrative reconfigurable processor with a memory interface, an input-output (IO) interface, and arrays of coarse-grained reconfigurable (CGR) arrays arranged on two dies in a package.

FIG. 2 is a diagram of an illustrative reconfigurable processor 200. Reconfigurable processor 200 may include a first die 262 and a second die 264. The first die 262 may include a memory interface 233, a communication link interface 238, and coarse-grained reconfigurable (CGR) arrays 211, 212. The second die 264 may include a memory interface 232, a communication link interface 236, and CGR arrays 213, 214.

As shown in FIG. 2, each one of the first and second dies 262, 264 of the reconfigurable processor 200 may include two arrays of CGR units 211, 212, 213, 214. The arrays of CGR units 211, 212, 213, 214 may be coupled with each other, with communication link interfaces 238, 236 and with memory interfaces 233, 232 via databus 230 which may be part of a top-level network (TLN). If desired, a die-to-die (D2D) unit may interconnect the first and second dies 262, 264. The D2D unit may be separate from the top-level network (TLN), if desired. Alternatively, the D2D unit may be an extension of the TLN.

Each one of the four arrays of CGR units 211, 212, 213, 214 may include control and status registers, compute units, memory units, and an array-level network that couples the control and status registers, the compute units, and the memory units.

Figure 3:
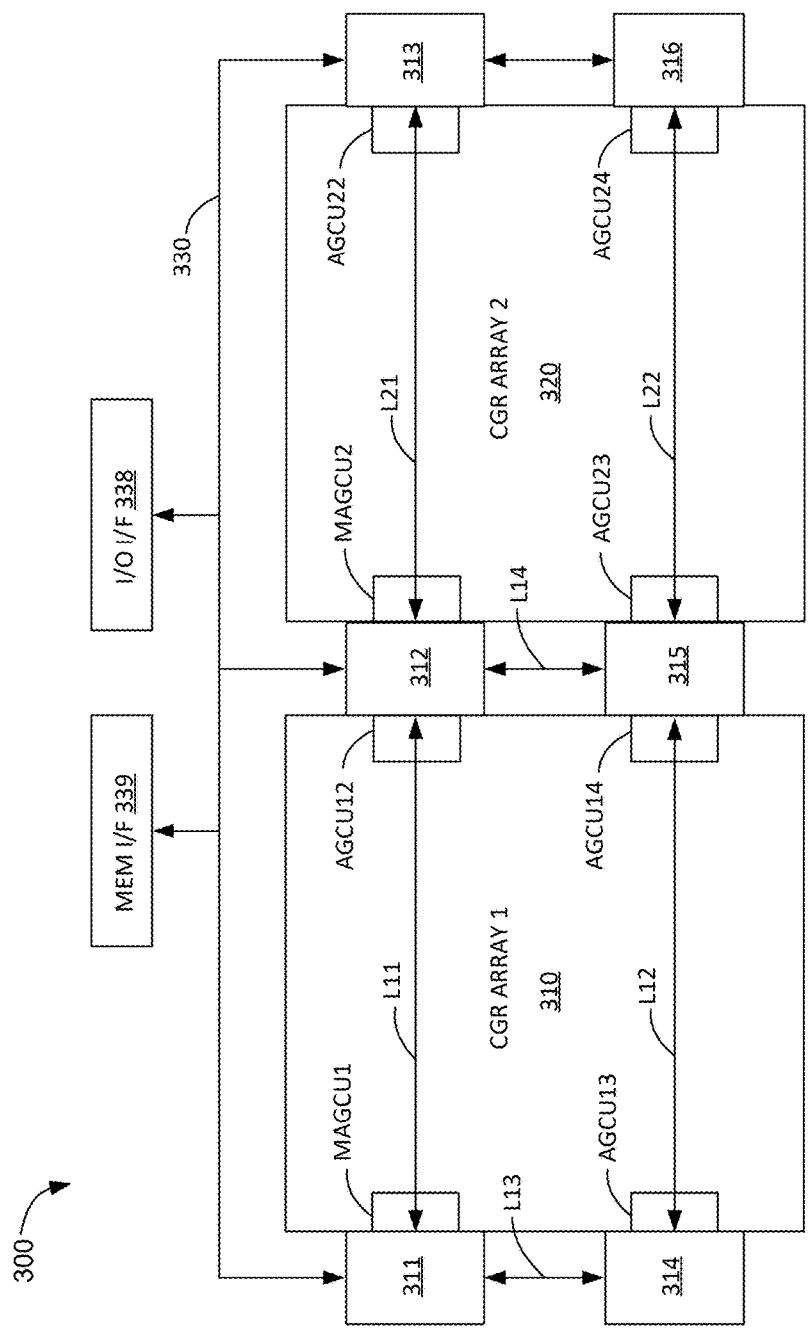
FIG. 3 is a diagram of an illustrative die of a reconfigurable processor with two CGR arrays that are coupled to a top-level network (TLN).

FIG. 3 illustrates example details of a die 300 of a reconfigurable processor including a top-level network (TLN 330) and two CGR arrays (CGR array 310 and CGR array 320). A CGR array comprises an array of CGR units (e.g., pattern memory units (PMUs), pattern compute units (PCUs), fused-control memory units (FCMUs)) coupled via an array-level network (ALN). The ALN may be coupled with the TLN 330 through several Address Generation and Coalescing Units (AGCUs), and consequently with input/output (I/O) interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN 330 and external devices, such as high-capacity memory, host processors including runtime processors, other CGR processors, FPGA devices, and so on, that may be coupled with the interfaces. If desired, the TLN may connect the CGR arrays 310, 320 on die 300 with other CGR arrays and/or other circuitry on one or more other dies in the same package.

As shown in FIG. 3, each CGR array 310, 320 has four AGCUs (e.g., MAGCU1, AGCU12, AGCU13, and AGCU14 in CGR array 310). However, a skilled person may appreciate that a CGR array may have a different number of AGCUs. The AGCUs interface the TLN to the ALNs and route data from the TLN to the ALN or vice versa.

One of the AGCUs in each CGR array in this example is configured to be a master AGCU (MAGCU), which includes an array configuration load/unload controller for the CGR array. Illustratively, more than one array configuration load/unload controller can be implemented, and one array configuration load/unload controller may be implemented by logic distributed among more than one AGCU.

As shown in FIG. 3, the MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN 330 may be constructed using top-level switches (e.g., switch 311, switch 312, switch 313, switch 314, switch 315, and switch 316). If desired, the top-level switches may be coupled with at least one other top-level switch. At least some top-level switches may be connected with other circuits on the TLN, including the AGCUs, external I/O interface 338, memory interface 339, or other top-level switches on one or more other dies in the same package via a die-to-die (D2D) connection.

Illustratively, the TLN 330 includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
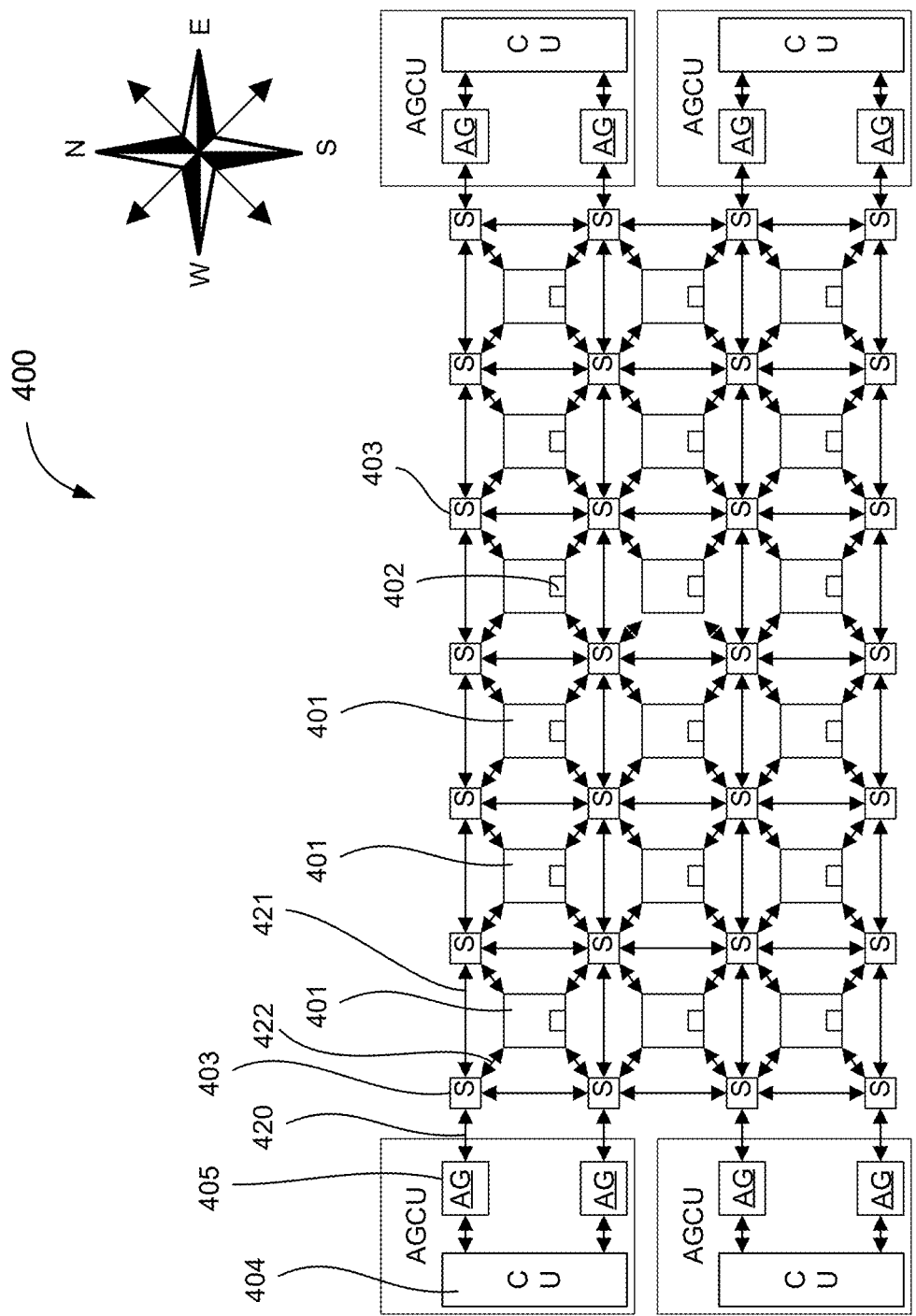
FIG. 4 is a diagram of an illustrative CGR array including CGR units and an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017 Jun. 24-28, 2017, Toronto, ON, Canada.

Illustratively, each of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns.

The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420.

In some implementations, communication channels can be configured as end-to-end connections.

A configuration file may include configuration data representing an initial configuration, or starting state, of each of the CGR units 401 that execute a high-level program with user algorithms and functions. Program load is the process of setting up the configuration stores 402 in the CGR array 400 based on the configuration data to allow the CGR units 401 to execute the high-level program. Program load may also require loading memory units and/or PMUs.

In some implementations, a runtime processor (e.g., runtime processor 180 of FIG. 1) may perform the program load.

The ALN may include one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit 403, as shown in the example of FIG. 4, may have eight interfaces. The North, South, East and West interfaces of a switch unit may be used for links between switch units 403 using interconnects 421. The Northeast, Southeast, Northwest and Southwest interfaces of a switch unit 403 may each be used to make a link with an FCMU, PCU or PMU instance 401 using one of the interconnects 422. Two switch units 403 in each CGR array quadrant have links to an AGCU using interconnects 420. The coalescing unit 404 of the AGCU arbitrates between the AGs 405 and processes memory requests. Each of the eight interfaces of a switch unit 403 can include a vector interface, a scalar interface, and a control interface to communicate with the vector network, the scalar network, and the control network. In other implementations, a switch unit 403 may have any number of interfaces.

During execution of a graph or subgraph in a CGR array 400 after configuration, data can be sent via one or more switch units 403 and one or more links 421 between the switch units to the CGR units 401 using the vector bus and vector interface(s) of the one or more switch units 403 on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
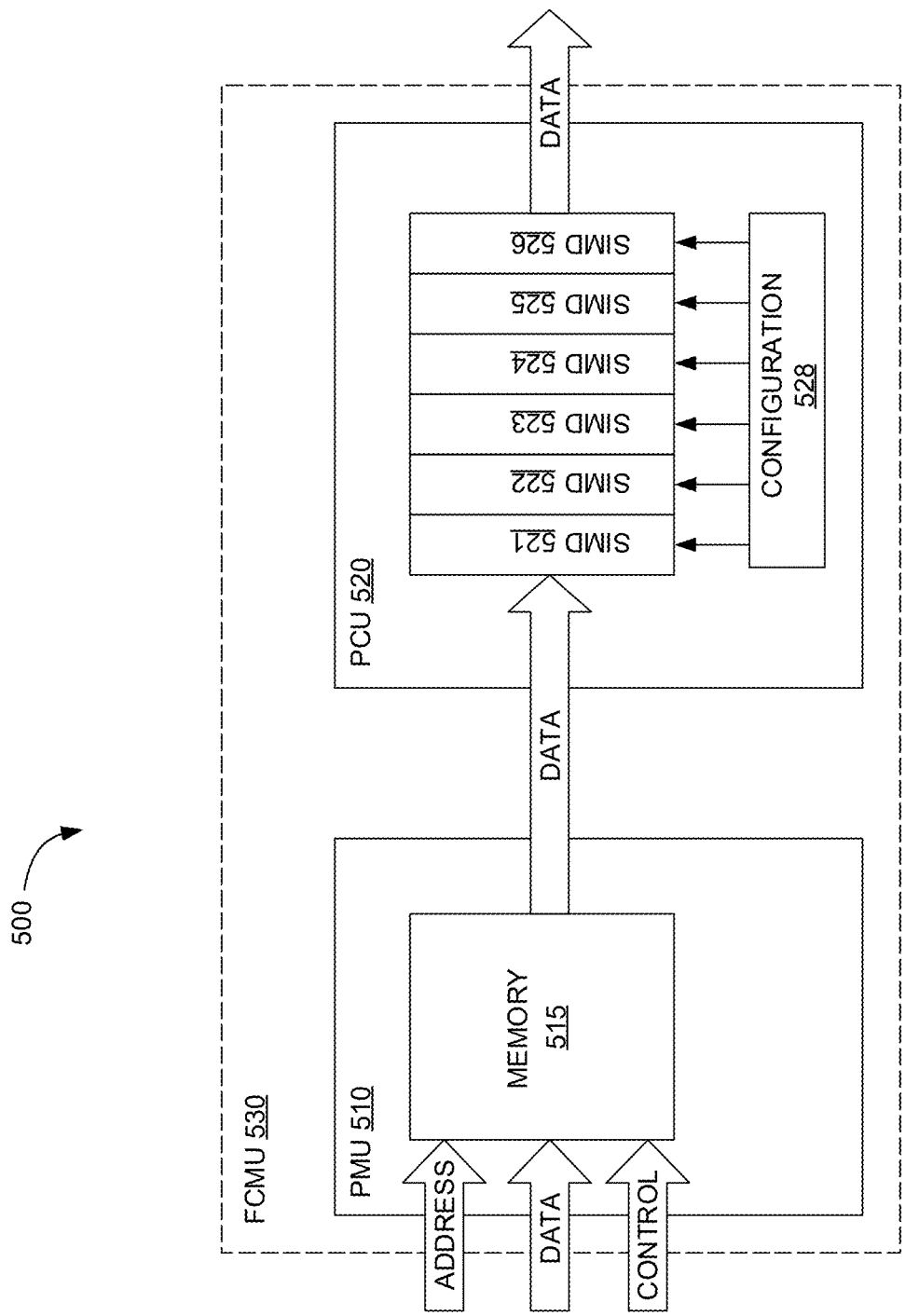
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. PMU 510 includes a scratchpad memory 515, which may receive external data, memory addresses, and memory control information (e.g., write enable, read enable) via one or more buses included in the ALN. PCU 520 includes two or more processor stages, such as single instruction multiple datapath (SIMD) processor 521 through SIMD 526, and configuration store 528. The processor stages may include ALUs, or SIMDs, as drawn, or any other reconfigurable stages that can process data.

Each stage in PCU 520 may also hold one or more registers (not drawn) for short-term storage of parameters. Short-term storage, for example during one to several clock cycles or unit delays, allows for synchronization of data in the PCU pipeline.

Figure 6:
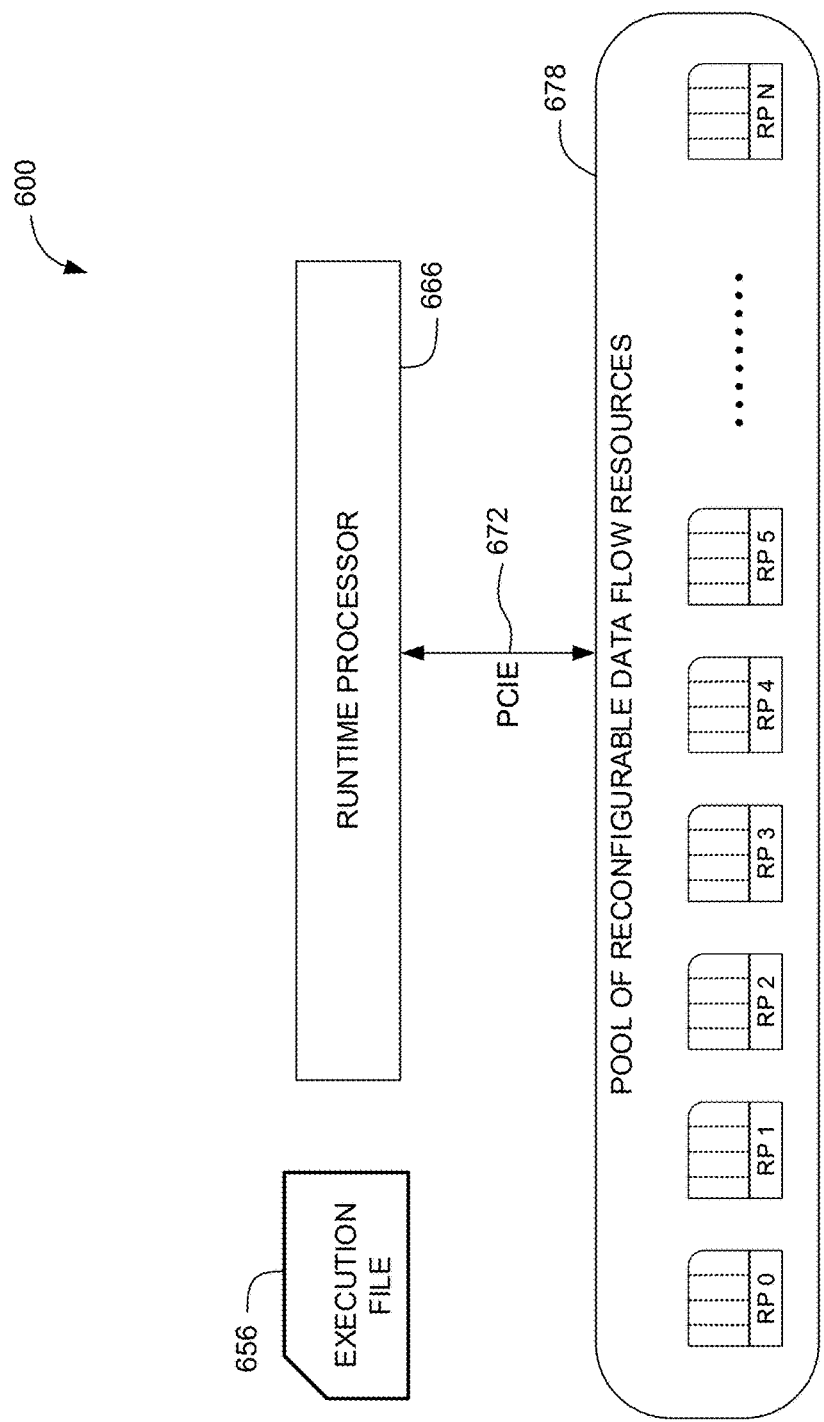
FIG. 6 is a diagram of an illustrative data processing system in which applications are provided a unified interface to a pool of reconfigurable data flow resources such that the pool of reconfigurable data flow resources is available to the applications as a single reconfigurable processor.

FIG. 6 is a diagram of an illustrative data processing system 600 in which applications are provided a unified interface to a pool of reconfigurable data flow resources 678 such that the pool of reconfigurable data flow resources 678 is available to the applications as a single reconfigurable processor.

The pool of reconfigurable data flow resources 678 includes memory circuits (e.g., memory 190 of FIG. 1), busses (e.g., communication link 185, memory link 195, and/or TLN 130 of FIG. 1), and CGR arrays or arrays of CGR units (e.g., CGR arrays 120, 125 of FIG. 1) that are connected with each other and with the memory circuits through the busses.

The busses or transfer resources enable the CGR arrays to receive and send data from and to devices outside the pool of reconfigurable data flow resources 678. Examples of the busses include Peripheral Component Interface Express (PCIe) channels, direct memory access (DMA) channels, double data-rate (DDR) channels, Ethernet channels, and InfiniBand™ channels. In some implementations, the busses include at least one of a DMA channel, a DDR channel, a PCIe channel, an Ethernet channel, or an InfiniBand™ channel.

The arrays of CGR units (e.g., compute units and memory units) are arranged in one or more reconfigurable processors (e.g., one or more of CGR processor 110 of FIG. 1), whereby at least one reconfigurable processor of the one or more reconfigurable processors includes two dies that are arranged in a package, whereby each die includes more than one CGR array. The CGR arrays may be coupled with each other in a programmable interconnect fabric. In some implementations, the arrays of CGR units are aggregated as a uniform pool of resources that are assigned to the execution of user applications.

The memory circuits of the pool of reconfigurable data flow resources 678 may be usable by the arrays of CGR units to store data. Examples of the memory circuits include main memory (e.g., off-chip/external dynamic random-access memory (DRAM)), local secondary storage (e.g., local disks (e.g., hard disk drive (HDD), solid-state drive (SSD))), and remote secondary storage (e.g., distributed file systems, web servers). Other examples of the memory circuits include PMUs, latches, registers, and caches (e.g., SRAM). In some implementations, the memory circuits include at least one of a DRAM, a HDD, a SSD, a distributed file system, or a web server.

The pool of reconfigurable data flow resources 678 is dynamically scalable to meet the performance objectives of applications (or user applications). In some implementations, the applications access the pool of reconfigurable data flow resources 678 over one or more networks (e.g., Internet).

The pool of reconfigurable data flow resources 678 may have different compute scales and hierarchies according to different implementations of the technology disclosed.

In one example, the pool of reconfigurable data flow resources 678 is a node (or a single machine) with CGR arrays that are arranged in a plurality of reconfigurable processors, supported by bus and memory circuits. The node also includes a host processor (e.g., CPU). The host processor includes a runtime processor 666 that manages resource allocation, memory mapping, and execution of the configuration files and execution files 656 for applications requesting execution from the host processor. The runtime processor 666 exchanges data with the plurality of reconfigurable processors (RP0, RP1, RP2, etc.), for example, over a communication link such as a PCIe bus 672.

In another example, the pool of reconfigurable data flow resources 678 is a rack (or cluster) of nodes, such that each node in the rack runs a respective plurality of reconfigurable processors, and includes a respective host processor configured with a respective runtime processor. The runtime processors are distributed across the nodes and communicate with each other so that they have unified access to the reconfigurable processors attached not just to their own node on which they run, but also to the reconfigurable processors attached to every other node in the data center.

The nodes in the rack are connected, for example, over Ethernet or InfiniBand (IB). In yet another example, the pool of reconfigurable data flow resources 678 is a pod that comprises a plurality of racks. In yet another example, the pool of reconfigurable data flow resources 678 is a superpod that comprises a plurality of pods. In yet another example, the pool of reconfigurable data flow resources 678 is a zone that comprises a plurality of superpods. In yet another example, the pool of reconfigurable data flow resources 678 is a data center that comprises a plurality of zones.

Users may execute applications on the compute environment 600. Therefore, applications are sometimes also referred to as user applications. The applications are executed on the pool of reconfigurable data flow resources 678 in a distributed fashion by programming the individual compute and memory components to asynchronously receive, process, and send data and control information.

The applications comprise high-level programs. A high-level program may include source code written in programming languages like C, C++, Java, JavaScript, Python, and/or Spatial, for example, using deep learning frameworks such as PyTorch, TensorFlow, ONNX, Caffe, and/or Keras. The high-level program can implement computing structures and algorithms of machine learning models like AlexNet, VGG Net, GoogleNet, ResNet, ResNext, RCNN, YOLO, SqueezeNet, SegNet, GAN, BERT, ELMo, USE, Transformer, and/or Transformer-XL.

Illustratively, a software development kit (SDK) generates computation graphs (e.g., data flow graphs, control graphs) of the high-level programs of the applications. A compiler may transform the computation graphs into a hardware-specific configuration, which is specified in an execution file 656 generated by the compiler.

In one implementation, the compiler partitions the computation graphs into memory allocations and execution fragments, and these partitions are specified in the execution file 656. Execution fragments represent operations on data. An execution fragment can comprise portions of a program representing an amount of work. An execution fragment can comprise computations encompassed by a set of loops, a set of graph nodes, or some other unit of work that requires synchronization. An execution fragment can comprise a fixed or variable amount of work, as intended by the program. Different ones of the execution fragments can contain different amounts of computation. Execution fragments can represent parallel patterns or portions of parallel patterns and are executable asynchronously.

Memory allocations represent the creation of logical memory spaces in on-chip and/or off-chip memories for data used to implement the computation graphs, and these memory allocations are specified in the execution file 656. Memory allocations define the type and the number of hardware resources (functional units, storage, or connectivity components). Main memory (e.g., DRAM) is off-chip memory for which the memory allocations can be made. Scratchpad memory (e.g., SRAM) is on-chip memory for which the memory allocations can be made. Other memory types for which the memory allocations can be made for various access patterns and layouts include read-only lookup-tables (LUTs), fixed size queues (e.g., FIFOs), and register files.

The compiler binds memory allocations to virtual memory units and binds execution fragments to virtual compute units, and these bindings are specified in the execution file 656. In some implementations, the compiler partitions execution fragments into memory fragments and compute fragments, and these partitions are specified in the execution file 656.

The compiler assigns the memory fragments to the virtual memory units and assigns the compute fragments to the virtual compute units, and these assignments are specified in the execution file 656. Each memory fragment is mapped operation-wise to the virtual memory unit corresponding to the memory being accessed. Each operation is lowered to its corresponding configuration intermediate representation for that virtual memory unit. Each compute fragment is mapped operation-wise to a newly allocated virtual compute unit. Each operation is lowered to its corresponding configuration intermediate representation for that virtual compute unit.

The compiler allocates the virtual memory units to physical memory units of a reconfigurable processor (e.g., pattern memory units (PMUs) of the reconfigurable processor) and allocates the virtual compute units to physical compute units of the reconfigurable processor (e.g., pattern compute units (PCUs) of the reconfigurable processor). These allocations include information about the die that has the physical memory units and the physical compute units within the reconfigurable processor and are specified in the execution file 656. The compiler places the physical memory units and the physical compute units onto positions in the arrays of CGR units of the pool of reconfigurable data flow resources 678 and routes data and control networks between the placed positions, and these placements and routes are specified in the execution file 656.

The compiler may translate the applications developed with commonly used open-source packages such as Keras and/or PyTorch into reconfigurable processor specifications. The compiler generates the configuration files with configuration data for the placed positions and the routed data and control networks. In one implementation, this includes assigning coordinates and communication resources of the physical memory and compute units by placing and routing units onto the arrays of the CGR units while maximizing bandwidth and minimizing latency.

Runtime processor 666 receives the execution file 656 from the SDK and uses the execution file 656 for resource allocation, memory mapping, and execution of the configuration files for the applications on the pool of reconfigurable data flow resources 678.

The execution file 656 may further include resource requests for transfer resources (e.g., PCIe channels, direct memory access (DMA) channels, double data rate (DDR) channels and/or network access channels) and storage resources (e.g., level 1 cache, level 2 cache, level 3 cache, main memory, local secondary storage, and/or remote secondary storage) required to satisfy data and control dependencies of the application graphs.

Furthermore, the runtime processor 666 is operatively coupled to the pool of reconfigurable data flow resources 678 (e.g., via communication link 672). If desired, the communication link may be a PCIe bus 672 or any other communication link that enables the runtime processor 666 to exchange data with the pool of reconfigurable data flow resources 678. As shown in FIG. 6, all reconfigurable processors in the pool of reconfigurable data flow resources 678 share a communication link such as PCIe bus 672 with a single runtime processor 666. However, in some implementations, more than one runtime processor may be coupled via a communication link with one or more reconfigurable processors. For example, the data processing system 600 may include as many runtime processors as reconfigurable processors, and each reconfigurable processor in the pool of reconfigurable data flow resources 678 may be coupled via a separate communication link with one of the runtime processors.

The runtime processor 666 parses the execution file 656, which includes a plurality of configuration files. Configuration files in the plurality of configurations files include configurations of the virtual data flow resources that are used to execute the user applications. The runtime processor 666 allocates a subset of the arrays of CGR units in the pool of reconfigurable data flow resources 678 to the virtual data flow resources.

The runtime processor 666 then loads the configuration files for the applications to the subset of the arrays of CGR units. In the scenario in which the execution file 656 includes two user applications (e.g., a first and a second user application), the runtime processor 666 is adapted for configuring the interface to the PCIe bus 672 of a first die in the pool of reconfigurable data flow resources 678 to provide access to a first subset of the memory units and to a first subset of the arrays of CGR units of the first die in the pool of reconfigurable data flow resources 678 from a physical function driver and from a first virtual function driver and to provide access to a second subset of the memory units and to a second subset of the arrays of CGR units of the first die in the pool of reconfigurable data flow resources 678 from the physical function driver and from a second virtual function driver. In the scenario in which the execution file 656 includes two additional user applications (e.g., a third and a fourth user application), the runtime processor 666 is adapted for configuring the interface to the PCIe bus 672 of a second die, that may be in the same package as the first die, in the pool of reconfigurable data flow resources 678 to provide access to a third subset of the memory units and to a third subset of the arrays of CGR units of the second die in the pool of reconfigurable data flow resources 678 from an additional physical function driver and from a third virtual function driver and to provide access to a fourth subset of the memory units and to a fourth subset of the arrays of CGR units of the second die in the pool of reconfigurable data flow resources 678 from the additional physical function driver and from a fourth virtual function driver.

An application for the purposes of this description includes the configuration files for reconfigurable data flow resources in the pool of reconfigurable data flow resources 678 compiled to execute a mission function procedure or set of procedures using the reconfigurable data flow resources, such as inferencing or learning in an artificial intelligence or machine learning system. A virtual machine for the purposes of this description comprises a set of reconfigurable data flow resources (including arrays of CGR units on one or more die in one or more reconfigurable processor, bus and memory units) configured to support execution of an application in arrays of CGR units and associated bus and memory units in a manner that appears to the application as if there were a physical constraint on the resources available, such as would be experienced in a physical machine. The virtual machine can be established as a part of the application of the mission function that uses the virtual machine, or it can be established using a separate configuration mechanism. In implementations described herein, virtual machines are implemented using resources of the pool of reconfigurable data flow resources 678 that are also used in the application, and so the configuration files for the application include the configuration data for its corresponding virtual machine, and links the application to a particular set of CGR units in the arrays of CGR units and associated bus and memory units.

The runtime processor 666 implements a first application in virtual machine VM1 that is allocated a particular set of reconfigurable data flow resources and implements a second application in virtual machine VM2 that is allocated another set of reconfigurable data flow resources. Virtual machine VM1 includes a particular set of CGR units, which can include some or all CGR units of a die in a reconfigurable processor, of multiple dies in a reconfigurable processor, or of multiple reconfigurable processors, along with associated bus and memory units (e.g., PCIe channels, DMA channels, DDR channels, DRAM memory). Virtual machine VM2 includes another set of CGR units, which can include some or all CGR units of a die in a reconfigurable processor, of multiple dies in a reconfigurable processor, or of multiple reconfigurable processors, along with associated bus and memory units (e.g., PCIe channels, DMA channels, DDR channels, DRAM memory).

Illustratively, CSRs of an example reconfigurable processor may be used for memory mapping virtual buffers in a virtual memory space to a physical memory space. CSRs in the allocated physical element may be used to map the application virtual buffer addresses to the appropriate physical addresses by having the runtime processor 666 program them.

In one implementation, the runtime processor 666 may configure CSRs of the dies(s) or of the reconfigurable processor(s) with configuration data (e.g., bit stream) identifying the mapping between the virtual address spaces and the physical address spaces for the configuration files to access the physical memory segments during execution of the applications.

Illustratively, the runtime processor 666 may allocate a memory region and create memory manager mappings. If desired, a first set of the physical memory segments mapped to buffers allocated to a first one of the applications are different from a second set of the physical memory segments mapped to buffers allocated to a second one of the applications. Also, access of the buffers allocated to the first one of the applications is confined to the first set of the physical memory segments, and access of the buffers allocated to the second one of the applications is confined to the second set of the physical memory segments.

The reconfigurable processor may provide several configurations for double data rate (DDR) and/or high bandwidth memory (HBM) access that define the memory access physical address map (i.e., memory access from the runtime processor 666 using the base address and memory access from the application).

As an example, consider the scenario in which each CGR array in a reconfigurable processor has a DDR interface and an HBM interface. Consider further that each CGR array is allocated to a different virtual function. In this scenario, a configuration may isolate the CGR arrays and thus the virtual functions in the reconfigurable processor from each other, and the virtual functions can access the DDR interface and the HBM interface connected to the local CGR array, but cannot access the DDR interfaces and the HBM interfaces connected to the other CGR arrays.

As another example, consider the scenario in which the reconfigurable processor includes more than one die arranged on a same package. Consider further that each die has a DDR interface and an HBM interface and that all CGR arrays on a die are allocated to a same virtual function. In this scenario, a configuration may isolate the dies and thus the virtual functions in the reconfigurable processor from each other, and the virtual and physical functions can access the DDR interface and the HBM interface connected to the local die, but cannot access the DDR interfaces and the HBM interfaces on the other dies.

An alternative configuration may provide the physical function and the virtual functions on a die access to the DDR interface and the HBM interface on the die from two or more CGR arrays (e.g., access to memory interface 233 from the CGR arrays 211 and 212 of the first die 262 of FIG. 2). As an example, in the alternative configuration, the physical function may partition the physical address map by interleaving DDR accesses with each CGR array, but may not interleave DDR accesses between the CGR arrays on the die.

As another example, in the alternative configuration, the physical function may partition the physical address map by interleaving DDR accesses across the different CGR arrays on the die.

If desired, a separate configuration may control the physical address may during HBM interleaving. For example, the HBM interleaving configuration may support interleaving within an HBM controller. However, disabling interleaving may facilitate restriction of memory access from a given CGR array to a single DDR or HBM interface.

If desired, controls other than interleaving are available that allow the PF to partition the physical address map dynamically between the VFs.

The reconfigurable processor may provide peer-to-peer (P2P) and P2P route-through capabilities that are operable between the CGR arrays or dies for the physical function and the virtual functions. For more details on the P2P and P2P route-through capabilities, see U.S. Provisional Patent Application No. 63/389,767, entitled, "Peer-To-Peer Communication Between Reconfigurable Dataflow Units" and U.S. Provisional Patent Application No. 63/405,240, entitled, "Peer-To-Peer Route Through in a Reconfigurable Computing System." For example, an AGCU of one CGR array (e.g., AGCU13 of CGR array 1 310 of FIG. 3) or die (e.g., die 262 of FIG. 2) may need to send its P2P transaction to another CGR array (e.g., CGR array 2 320 of FIG. 3) or die (e.g., die 264 of FIG. 2). The reconfigurable processor may support these accesses regardless of the CSR address map option implemented, and regardless of memory access map configuration. The physical function may use the AGCU Real to Physical Buffer (R2PB) to limit or control each virtual function's access to other CGR arrays or dies and to PCIe interfaces for P2P, if desired. In some implementations, the R2PB may limit the memory that is accessible to other CGR arrays or dies.

As an example, the address map may be implemented for each CGR array or die with no access to the other CGR arrays or dies. Thus, the address map provides access to the resources on the respective CGR array or die, but provides no access to the CSRs on the other CGR arrays or dies, for example by requiring R2PB entries.

As another example, the address map may be implemented for a single CGR array or die, and the single CGR array or die address map may be copied to each CGR array or die, and a CGR array or die identifier may statically map each CGR array or die to a portion of the overall address map. For example, consider the scenario in which the reconfigurable processor includes two identical dies (e.g., first die 262 and second die 264 of FIG. 2) with arrays of CGR units, whereby the first die includes first control and status registers (CSRs), and the second die includes second CSRs. In this scenario, the runtime processor may implement a same virtual address map for the first CSRs on the first die and for the second CSRs on the second die, and a physical address map of the first and second CSRs in the package includes the same virtual address map and an additional bit for identifying the first die or the second die. For example, a lower power-of-two sized portion of the overall address map (e.g., identified by a '0' in the most significant bit (MSB)) may be assigned as the additional bit to the first die, and an upper power-of-two sized portion of the overall address map (e.g., identified by a '1' in the MSB) may be assigned as the additional bit to the second die.

As yet another example, the address map may be implemented for a single CGR array and die, and the single CGR array and die address map may be copied to each CGR array and die, and a CGR array and die identifier may statically map each CGR array and die to a portion of the overall address map. For example, if the reconfigurable processor includes two dies (e.g., first die 262 and second die 264 of FIG. 2), each having two CGR arrays (e.g., CGR array 1 and CGR array 2 of FIG. 3), a first bit of the overall address map may be assigned to the die and a second bit of the overall address map may be assigned to the CGR array on the die. For example, a '0' or '1' in the most significant bit (MSB) of the overall address map may be assigned the first die or the second die, respectively, and a '0' or '1' in the second MSB of the overall address map may be assigned to CGR array 1 or CGR array 2, respectively, on the die.

Consider the scenario in which CGR array 1 on the first die of a CGR processor is assigned to virtual function VF1 and CGR array 1 of the second die of the same CGR processor is assigned to virtual function VF2. In this scenario, the virtual functions VF1 and VF2 use virtualized addresses, there is no need for the virtual function to explicitly set the bit that identifies the die or the CGR array of the overall address map. Instead, an interface between the runtime processor 666 and the reconfigurable processor in the pool of reconfigurable data flow resources 678 may adjust the virtualized addresses to address the correct CGR array and/or die, if desired. In this example, the physical function(s)' addresses may not be virtualized. Therefore, the physical function driver(s) (e.g., in the runtime processor 666) may know the addressed CGR array and/or die. In the scenario in which the CGR array or die has its own host PCIe connection, the physical function knows which one of the PCIe connections it is using to access the addressed CGR array or die.

As yet another example, the address map may be arranged by distinguishing between a local CGR array or die and other CGR arrays or dies, whereby the local CGR array or die has a host PCIe connection and the other CGR arrays or dies have a host PCIe connection. In this example, the physical function driver (e.g., the runtime processor 666) and/or one or more virtual functions may use virtualized CSR addresses. The single CGR array or die address map may be copied to each CGR array or die and provide relative addressing rather than absolute addressing. For example, if the reconfigurable processor includes two CGR arrays (e.g., local CGR array and other CGR array) or two dies (e.g., local die and other die), each having a host PCIe connection, a lower power-of-two sized portion of the overall address (e.g., identified by a '0' in the most significant bit (MSB)) map may be assigned to the local CGR array or die, and an upper power-of-two sized portion of the overall address map (e.g., identified by a '1' in the MSB) may be assigned to the other CGR array or die, respectively. Since the virtual functions use virtualized addresses, there is no need for the virtual function to explicitly set the bit that identifies the lower and upper power-of-two sized portions of the overall address map. Instead, an interface between the runtime processor 666 and the reconfigurable processor in the pool of reconfigurable data flow resources 678 may adjust the virtualized addresses to address the correct CGR array or die, if desired.

The runtime processor 666 respects the topology information (e.g., topology information 704 of FIG. 7) in the execution file 656 when allocating CGR units to the virtual data flow resources requested in the execution file 656. As an example, consider the scenario in which the reconfigurable processor has a non-uniform communication bandwidth in East/West directions versus North/South directions. In this scenario, a virtual function that requires, for example, two CGR arrays arranged horizontally, may suffer in performance if mapped to a physical geometry in which two CGR arrays are arranged vertically. As another example, consider the scenario in which the reconfigurable processor has a higher communication bandwidth within a die than between dies. In this scenario, a virtual function that requires, for example, two CGR arrays, may suffer in performance if mapped to a physical geometry in which the two CGR arrays are arranged on different dies.

As discussed above, the configurations of virtual data flow resources in the execution file 656 specify virtual memory segments for the reconfigurable data flow resources in the pool of reconfigurable data flow resources 678, including virtual address spaces of the virtual memory segments and sizes of the virtual address spaces. The runtime processor 666 maps the virtual address spaces of the virtual memory segments to physical address spaces of physical memory segments in the memory. The memory can be host memory, or device memory (e.g., off-chip DRAM).

The runtime processor 666 configures control and status registers of the reconfigurable data flow resources in the pool of reconfigurable data flow resources 678 with configuration data identifying the mapping between the virtual address spaces and the physical address spaces for the configuration files to access the physical memory segments during execution of the applications.

Figure 7:
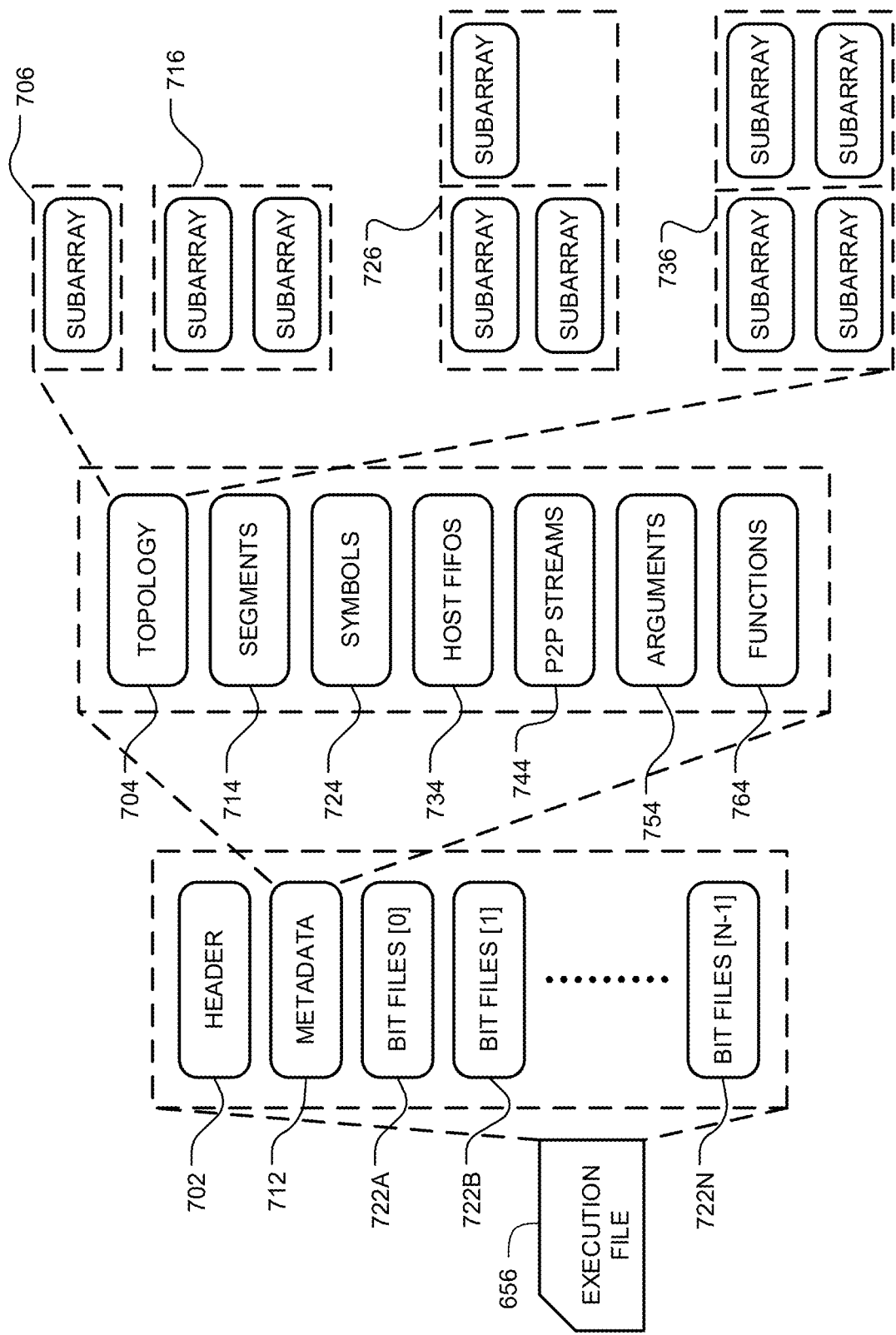
FIG. 7 is a diagram of an illustrative implementation of an execution file used by the technology disclosed to execute the applications on arrays of CGR units.

Turning to FIG. 7, the illustrative execution file 656 includes configuration files (e.g., configuration files 722a, 722b, . . . 722n). The configuration files are sometimes also referred to as bit files 722a, 722b, . . . 722n that implement the computation graphs of the user applications using the arrays of CGR units and the bus and memory units in the pool of reconfigurable data flow resources 678 of FIG. 6.

A program executable contains a bit-stream representing the initial configuration, or starting state, of each of the CGR units that execute the program. This bit-stream is referred to as a bit file, or hereinafter as a configuration file. The execution file 656 includes header 702 that indicates destinations on the reconfigurable processors for configuration data in the configuration files. In some implementations, a plurality of configuration files is generated for a single application.

The execution file 656 includes metadata 712 that accompanies the configuration files and specifies configurations of virtual data flow resources used to execute the applications. In one example, the execution file 656 can specify that a particular application uses an entire reconfigurable processor for execution, and as a result the metadata 712 identifies virtual data flow resources equaling at least the entire reconfigurable processor for loading and executing the configuration files for the particular application. In another example, the execution file 656 can specify that a particular application uses one or more dies of a reconfigurable processor for execution, and as a result the metadata 712 identifies virtual data flow resources equaling at least the one or more dies of the reconfigurable processor for loading and executing the configuration files for the particular application.

In yet another example, the execution file 656 can specify that a particular application uses an entire node for execution, and as a result the metadata 712 identifies virtual data flow resources equaling at least the entire node for loading and executing the configuration files for the particular application. In yet another example, the execution file 656 can specify that a particular application uses two or more nodes for execution, and as a result the metadata 712 identifies virtual data flow resources equaling at least the two or more nodes for loading and executing the configuration files for the particular application.

One skilled in the art would appreciate that the execution file 656 can similarly specify reconfigurable processors or portions thereof spanning across racks, pods, superpods, and zones in a data center, and as a result the metadata 712 identifies virtual data flow resources spanning across the racks, pods, superpods, and zones in the data center for loading and executing the configuration files for the particular application.

As part of the metadata 712, the execution file 656 includes topology information 704 that specifies orientation or shapes of portions of a reconfigurable processor for loading and executing the configuration files for a particular application.

In one implementation, a reconfigurable processor comprises a plurality of CGR arrays. Illustratively, a reconfigurable processor may include two dies (e.g., dies 262 and 264 of FIG. 2), each having two CGR arrays (e.g., CGR arrays 211, 212 of die 262 and CGR arrays 213, 214 of die 264 of CGR processor 200 of FIG. 2). If desired, a reconfigurable processor may include more than two dies, each having more than two CGR arrays. For example, a reconfigurable processor may include four, eight, or sixteen CGR arrays per die, or any other number of CGR arrays per die, including numbers that are not a power of two. In some implementations, different dies may include different numbers of CGR arrays. The topology information 704 specifies an orientation of CGR arrays for each die in the two or more dies used to load and execute the configuration files for a particular application.

For example, when the reconfigurable processor includes a package with two dies, each having two CGR arrays that are arranged vertically on the die, and the particular application is allocated two CGR arrays, the topology information 704 specifies that the two CGR arrays are arranged on the same die 716. The topology information 704 can also allocate a single CGR array 706 on a die of the reconfigurable processor to the particular application. The topology information 704 can also allocate two CGR arrays on one die and one CGR array on the other die 726 to a particular application. The topology information 704 can also allocate four CGR arrays 736, two on each die of the reconfigurable processor to the particular application.

The execution file 656 also specifies virtual flow resources like PCIe channels, DMA channels, and DDR channels used to load and execute the configuration files for a particular application. The execution file 656 also specifies virtual flow resources like main memory (e.g., off-chip/external DRAM), local secondary storage (e.g., local disks (e.g., HDD, SSD)), remote secondary storage (e.g., distributed file systems, web servers), latches, registers, and caches (e.g., SRAM) used to load and execute the configuration files for a particular application.

The execution file 656 also specifies virtual memory segments 714 for the requested virtual flow resources, including virtual address spaces of the virtual memory segments and sizes of the virtual address spaces. The execution file 656 also specifies symbols 724 (e.g., tensors, streams) used to load and execute the configuration files for a particular application. The execution file 656 also specifies host FIFOs 734 accessed by the configuration files for a particular application during execution. The execution file 656 also specifies peer-to-peer (P2P) streams 744 (e.g., data flow exchanges and control token exchanges between sources and sinks) exchanged between configurable units on which the configuration files for a particular application are loaded and executed. The execution file 656 also specifies arguments 754 that modify execution logic of a particular application by supplying additional parameters or new parameter values to the configuration files for the particular application. The execution file 656 also specifies functions 764 (e.g., data access functions like transpose, alignment, padding) to be performed by the configurable units on which the configuration files for a particular application are loaded and executed.

Figure 8H:
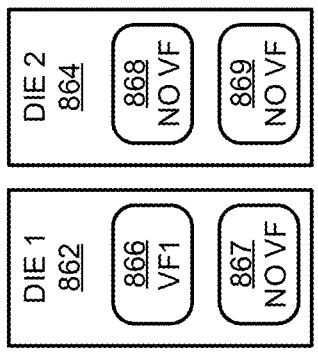
FIG. 8H is a diagram of an illustrative configuration in which a virtual function is assigned an array of CGR units on die 1 of a reconfigurable processor.
Figure 8I:
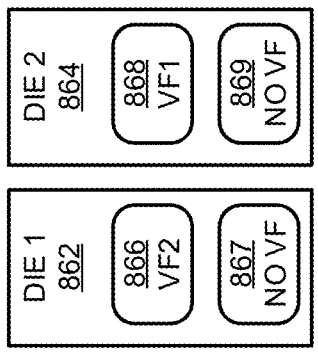
FIG. 8I is a diagram of an illustrative configuration in which a first virtual function is assigned an array of CGR units on die 2 and a second virtual function is assigned an array of CGR units on die 1 of a reconfigurable processor.
Figure 8J:
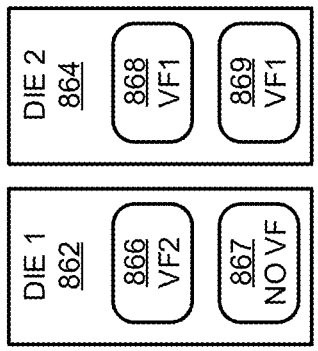
FIG. 8J is a diagram of an illustrative configuration in which a first virtual function is assigned two arrays of CGR units on die 2 and a second virtual function is assigned an array of CGR units on die 1 of a reconfigurable processor.
Figure 8K:
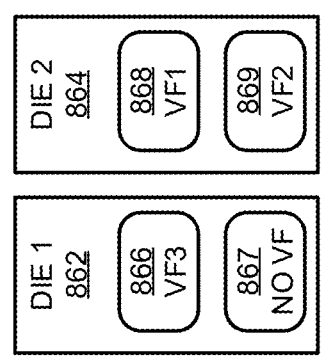
FIG. 8K is a diagram of an illustrative configuration in which two virtual functions are each assigned an array of CGR units on die 2 and a third virtual function is assigned an array of CGR units on die 1 of a reconfigurable processor.
Figure 8L:
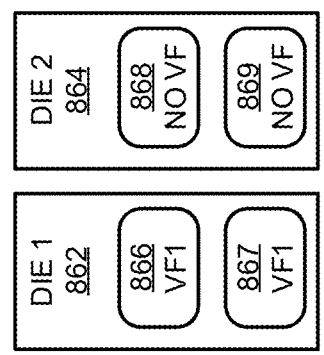
FIG. 8L is a diagram of an illustrative configuration in which a virtual function is assigned two arrays of CGR units on die 1 of a reconfigurable processor.
Figure 8M:
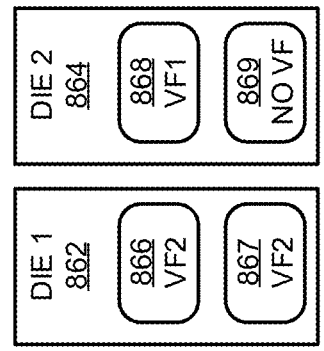
FIG. 8M is a diagram of an illustrative configuration in which a first virtual function is assigned an array of CGR units on die 2 and a second virtual function is assigned two arrays of CGR units on die 1 of a reconfigurable processor.
Figure 8N:
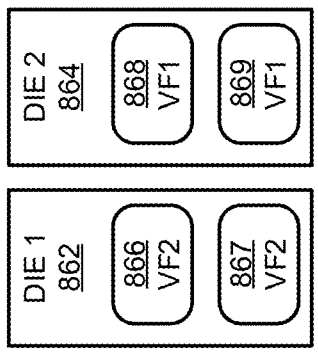
FIG. 8N is a diagram of an illustrative configuration in which a first virtual function is assigned two arrays of CGR units on die 2 and a second virtual function is assigned two arrays of CGR units on die 1 of a reconfigurable processor.
Figure 8P:
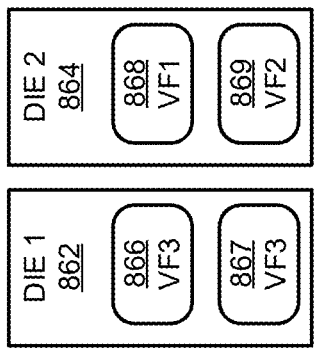
FIG. 8P is a diagram of an illustrative configuration in which two virtual functions are each assigned an array of CGR units on die 2 and a third virtual function is assigned two arrays of CGR units on die 1 of a reconfigurable processor.
Figure 8Q:
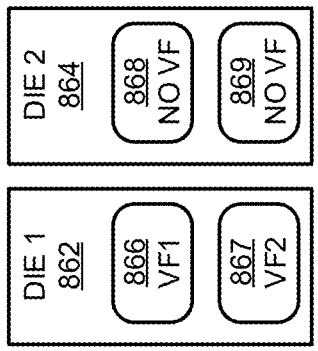
FIG. 8Q is a diagram of an illustrative configuration in which two virtual functions are each assigned an array of CGR units on die 1 of a reconfigurable processor.
Figure 8R:
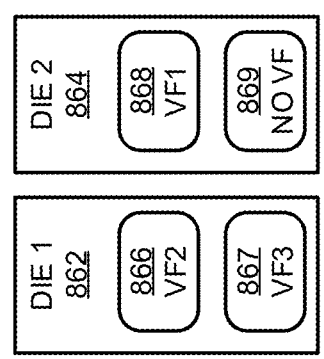
FIG. 8R is a diagram of an illustrative configuration in which a first virtual function is assigned an array of CGR units on die 2 and second and third virtual functions are each assigned an array of CGR units on die 1 of a reconfigurable processor.
Figure 8S:
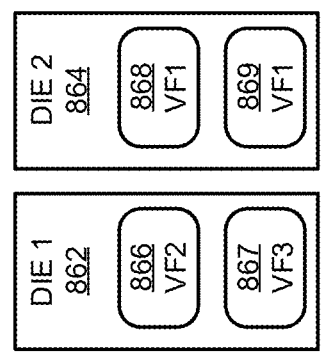
FIG. 8S is a diagram of an illustrative configuration in which a first virtual function is assigned two arrays of CGR units on die 2 and second and third virtual functions are each assigned an array of CGR units on die 1 of a reconfigurable processor.
Figure 8T:
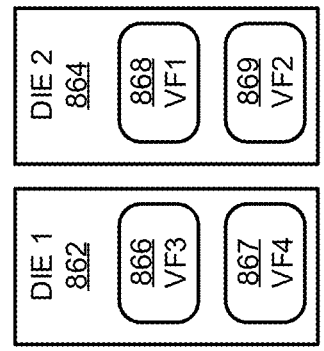
FIG. 8T is a diagram of an illustrative configuration in which first and second virtual functions are each assigned an array of CGR units on die 2 and third and fourth virtual functions are each assigned an array of CGR units on die 1 of a reconfigurable processor.

Turning now to FIGS. 8A to 8T. Illustratively, a reconfigurable processor may have a first die 862 and a second die 864 that are arranged in a package. The first die 862 may have two CGR arrays 866, 867, and the second die 864 may have two CGR arrays 868, 869. The reconfigurable processor may be configured to be under control of two physical function drivers (e.g., PF1 driver 183 and PF2 driver 184 of FIG. 1). In some implementations, a first physical function driver (e.g., PF1 driver 183 of FIG. 1) may be provided access to the CGR arrays on the first die 862, and a second physical function driver (e.g., PF2 driver 184 of FIG. 1) may be provided access to the CGR arrays on the second die 864. In other implementations, a single physical function driver (e.g., PF1 driver 183 of FIG. 1) may be provided access to the CGR arrays on the first die 862 and to the CGR arrays on the second die 864. If desired, one or more virtual function drivers (e.g., VF1 186 and/or VF2 187 of FIG. 1) may have been provided access to CGR arrays on the first and/or second dies 862, 864 of the reconfigurable processor.

In some implementations, a virtual function driver (e.g., VF 1 driver 186 of FIG. 1) can access virtual functions (e.g., VF1 of FIG. 8D) on different dies (e.g., VF1 on die 862 of FIG. 8D and VF1 on die 864 of FIG. 8D) as though the virtual functions are all one virtual function. Thus, the virtual function VF1 appears to extend from die 2 to die 1, which is a conceptual view that illustrates the assignment of virtual functions to CGR arrays. This conceptual view is adopted throughout in FIGS. 8A to 8T.

In some implementations, a runtime processor (e.g., runtime processor 180 of FIG. 1) may be adapted for configuring communication link interfaces (e.g., COM I/F 138 and COM I/F 136 of FIG. 1) that are operatively coupled to a communication link (e.g., communication link 185 of FIG. 1) between the dies on the reconfigurable processor and the runtime processor. If desired, the runtime processor may be adapted for configuring the communication link interfaces based at least in part on a number of virtual functions to enable and based on resource requirements of the virtual functions.

Consider the scenario in which the first die 862 has a first communication link interface, and the second die 864 has a second communication link interface. Consider further that the runtime processor is adapted for configuring the second communication link interface to provide access to the two CGR arrays 866, 867 of the first die 862 and to the two CGR arrays 868, 869 of the second die 864 through the communication link from a first physical function driver and from up to N virtual function drivers, where N is a non-negative integer. Consider further that the runtime processor is adapted for configuring the first communication link interface to provide access to the two CGR arrays 866, 867 of the first die 862 through the communication link from a second physical function driver and from up to M virtual function drivers. This scenario will be referred to hereinafter as the configuration scenario.

In the configuration scenario, the runtime processor may be adapted for configuring the second communication link interface according to a first configuration in which no virtual function of the up to N virtual functions is enabled. The first configuration is illustratively shown in FIG. 8A.

In the configuration scenario, the runtime processor may be adapted for configuring the second communication link interface according to a second configuration in which one virtual function (VF1) of the up to N virtual functions is assigned one array 868 of the two CGR arrays of the second die 864. The second configuration is illustratively shown in FIG. 8B.

In the configuration scenario, the runtime processor may be adapted for configuring the second communication link interface according to a third configuration in which one virtual function (VF1) of the up to N virtual functions is assigned both of the CGR arrays 868, 869 of the second die 864, The third configuration is illustratively shown in FIG. 8C.

In the configuration scenario, the runtime processor may be adapted for configuring the second communication link interface according to a fourth configuration in which one virtual function (VF1) of the up to N virtual functions is assigned both of the two CGR arrays 868, 869 of the second die 864 and one CGR array 866 of the two CGR arrays of the first die 862. The fourth configuration is illustratively shown in FIG. 8D.

In FIG. 8D, virtual function VF1 is assigned CGR array 866 on die 1 862. However, in some scenarios, virtual function VF1 may be assigned CGR array 867 on die 1 instead. For example, virtual function VF1 may be assigned CGR array 867 on die 1 if CGR array 867 is located closer to CGR array 868 or 869 than CGR array 866 such that communications between CGR array 867 and the CGR arrays on die 2 864 have a lower latency than communications between CGR array 866 and the CGR arrays on die 2 864. Whether CGR array 866 or 867 of die 1 862 is located closer to one of CGR arrays 868 or 869 may depend on the physical arrangement of die 1 862 relative to die2 864 in a package and the location of the die-to-die interconnection. As an example, in the scenario in which die 2 864 is arranged below (i.e., south of) die 1 862 on a same substrate in a package, CGR array 867 is arranged adjacent to CGR array 868. Thus, CGR array 867 is closer to CGR arrays 868, 869 than CGR array 866. As another example, in the scenario in which CGR array 867 is located closer to the die-to-die interconnection, communications between CGR array 867 and the CGR arrays on die 2 864 may have a lower latency than communications between CGR array 866 and the CGR arrays on die 2 864.

In the configuration scenario, the runtime processor may be adapted for configuring the second communication link interface according to a fifth configuration in which one virtual function (VF1) of the up to N virtual functions is assigned the two CGR arrays 866, 867 of the first die 862 and the two CGR arrays 868, 869 of the second die 864. In the fifth configuration, the runtime processor may be adapted for configuring the first communication link interface to a seventh configuration in which no virtual function of the up to M virtual functions is enabled. The configuration in which the runtime processor configures the second communication link to assign one virtual function all four CGR arrays and the first communication link to enable no virtual function is illustratively shown in FIG. 8E.

In the configuration scenario, the runtime processor may be adapted for configuring the second communication link interface according to a sixth configuration wherein a first virtual function (VF1) of the up to N virtual functions is assigned a first array 868 of the two CGR arrays of the second die 864 and a second virtual function (VF2) of the up to N virtual functions is assigned a second array 869 of the two CGR arrays of the second die 864. The sixth configuration is illustratively shown in FIG. 8F.

When the second communication link interface is configured to the fourth configuration, the runtime processor may be adapted for configuring the first communication link interface to a seventh configuration in which no virtual function of the up to M virtual functions is enabled. The seventh configuration is illustratively shown in FIG. 8D.

When the second communication link interface is configured to the fourth configuration, the runtime processor may be adapted for configuring the first communication link interface to an eighth configuration in which one virtual function (VF2) of the up to M virtual functions is assigned one array 867 of the K arrays of coarse-grained reconfigurable units of the first die 862. The eighth configuration is illustratively shown in FIG. 8G.

When the second communication link interface is configured to the first, second, third, or sixth configuration, the runtime processor may be adapted for configuring the first communication link interface to a ninth configuration in which no virtual function of the up to M virtual functions is enabled. The ninth configuration is illustratively shown in FIGS. 8A, 8B, 8C, and 8F, respectively.

When the second communication link interface is configured to the first, second, third, or sixth configuration, the runtime processor may be adapted for configuring the first communication link interface to a tenth configuration in which one virtual function (VF1 in FIG. 8H, VF2 in FIGS. 8I, 8J and VF3 in FIG. 8K) of the up to M virtual functions is assigned one array 866 of the two CGR arrays of the first die 862.

When the second communication link interface is configured to the first, second, third, or sixth configuration, the runtime processor may be adapted for configuring the first communication link interface to an eleventh configuration wherein one virtual function (VF1 in FIG. 8L, VF2 in FIGS. 8M and 8N, and VF3 in FIG. 8P) of the up to M virtual functions is assigned the two CGR arrays 866, 867 of the first die 862.

When the second communication link interface is configured to the first, second, third, or sixth configuration, the runtime processor may be adapted for configuring the first communication link interface to a twelfth configuration wherein a first virtual function (VF1 in FIG. 8Q, VF2 in FIGS. 8R and 8S, and VF3 in FIG. 8T) of the up to M virtual functions is assigned a first CGR array 866 of the two CGR arrays of the first die 862 and a second virtual function (VF2 in FIG. 8Q, VF3 in FIGS. 8R and 8S, and VF4 in FIG. 8T) of the up to M virtual functions is assigned a second CGR array 867 of the two CGR arrays of the first die 862.

Other configurations are possible. For example, in a thirteenth configuration, the configuration shown in FIG. 8I may be achieved when the runtime processor configures the second communication link interface to assign virtual function VF1 CGR array 868 of the second die 864 and virtual function VF2 CGR array 866 of the first die 862. However, in the thirteenth configuration, a single physical function may be provided access to both, the first and second dies 862, 864, and the two virtual functions VF1, VF2 may share the communication link interface on the second die 864. In contrast thereto, in the eleventh configuration in which the runtime processor configures the second communication link interface to assign virtual function VF1 CGR array 868 of the second die 864 and the first communication link interface to assign virtual function VF2 CGR array 866 of the first die 862, a first physical function may be provided access to the first die 862, a second physical function may be provided access to the second die 864, and the two virtual functions VF1, VF2 may use a different communication link interface.

Furthermore, in the scenario that the two dies 862, 864 are identical, the number of configurations may be reduced. For example, the configurations shown in FIGS. 8B and 8H, in FIGS. 8C and 8L, in FIGS. 8F and 8Q, in FIGS. 8J and 8M, in FIGS. 8K and 8R, and in FIGS. 8P and 8S are identical in this scenario and could be achieved by inverting the configurations of the first and second communication link interfaces.

Moreover, virtual functions may be assigned different CGR arrays than shown in FIGS. 8A to 8T. As an example, instead of assigning VF2 CGR array 866 of the first die 862 as shown in FIGS. 8I and 8J, VF2 may be assigned CGR array 867 of the first die 862. As another example, instead of assigning VF1 CGR array 868 of the second die 864 as shown in FIGS. 8B, 8I, 8M, and 8R, VF1 may be assigned CGR array 869 of the second die 864. However, the actual allocation of the first or second CGR array of a die to a virtual function may be unimportant if both CGR arrays on a die are identical and have access to an identical set of resources.

Illustratively, the physical CGR array or physical CGR arrays of the first and second dies 862, 864 that execute a virtual function may be abstracted from the user. In the scenario in which the first and second dies 862, 864 have two physical CGR arrays each that are denoted CGR array 0 and CGR array 1, and the virtual function is executing on a single physical CGR array, the virtual function may execute on any one of the CGR arrays. However, the virtual function may appear to always execute on CGR array 0 of the die, if desired. In other words, the die may dynamically map the references of the virtual function onto the physical CGR array of the die.

Illustratively, each die of the first die 862 and the second die 864 may include a double-data rate (DDR) memory interface. Thus, the first die 862 may include a first DDR memory interface, and the second die 864 may include a second DDR memory interface. In the configurations shown in FIGS. 8F, 8K, 8P, and 8T, the virtual function VF2 is enabled to access the second DDR interface of die 2 864 and prevented from accessing the first DDR memory interface of die 1 862. In the configurations shown in FIGS. 8B, 8C, 8F, 8I, 8J, 8K, 8M, 8N, 8P, 8R, 8S and 8T, the virtual function VF1 is enabled to access the second DDR interface of die 2 864 and prevented from accessing the first DDR memory interface of die 1 862. In the configurations shown in FIGS. 8D, 8E, and 8G, the virtual function VF1 is enabled to access the first DDR interface on die 1 862 and the second DDR interface on die 2 864. In the configurations shown in FIGS. 8H, 8L, and 8Q, the virtual function VF1, in the configurations shown in FIGS. 8G, 8I, 8J, 8M, 8N, 8Q, 8R, and 8S, the virtual function VF2, in the configuration shown in FIGS. 8K, 8P, 8R, 8S, and 8T, the virtual functions VF3, and in the configurations shown in FIG. 8T, the virtual function VF4 are enabled to access the first DDR interface of die 1 862 and prevented from accessing the second DDR memory interface of die 2 864.

It should be noted that the reconfigurable processor is described with two dies having two CGR arrays each for illustration purposes only. However, one skilled in the art would appreciate that the described technology equally applies to other reconfigurable processors with a different number of CGR arrays on a different number of dies. As an example, the reconfigurable processor may have three, four, five, six, or more dies in the same package. As another example, the reconfigurable processor may have three, four, five, six, seven, or more CGR arrays on each die. If desired, the reconfigurable processor may have a single CGR array (i.e., no distinction into separate CGR arrays) on each die. Moreover, there may be different number of CGR arrays on different dies. Furthermore, the CGR arrays may be arranged in any configuration on a die. As an example, the CGR arrays may be arranged in a column or in a row on a die. As another example, the CGR arrays may be arranged in an M×N array on a die.

As mentioned above with reference to FIG. 1, a communication link (e.g., communication link 185 of FIG. 1) may couple a reconfigurable processor (e.g., CGR processor 110) to a runtime processor (e.g., runtime processor 180). In some implementations, the communication link may include a PCIe bus.

Illustratively, the reconfigurable processor may include one or more communication link interfaces that are operatively coupled to the communication link. For example, the reconfigurable processor may have one or more PCIe interfaces that are operatively coupled to the PCIe bus.

The number of PCIe interfaces that connect the reconfigurable processor to the runtime processor via the PCIe bus may be related to the number of dies in the package of the reconfigurable processor. As an example, each die of the reconfigurable processor may have a PCIe interface that couples the respective die to the runtime processor via the PCIe bus, and each die's resources may be accessed through the respective die's host PCIe connection, which is sometimes also referred to as host end point (HEP). As another example, a predetermined number of dies may share a PCIe connection with the host.

Illustratively, the runtime processor may use a certain address range for the physical address and other, different address ranges for each virtual function (VF). Thus, the address may define the referenced physical function (PF) or virtual function (e.g., VF1, VF2, VF3, or VF4) based on the address range with which the address is associated. Illustratively, the addresses for the physical and/or virtual functions may be tracked as part of the PCIe device configuration. If desired, the PCIe core may use an Advanced extensible Interface (AXI) with a function identifier that identifies the corresponding physical or virtual function to interface with the other portions of the reconfigurable processor.

Figure 9:
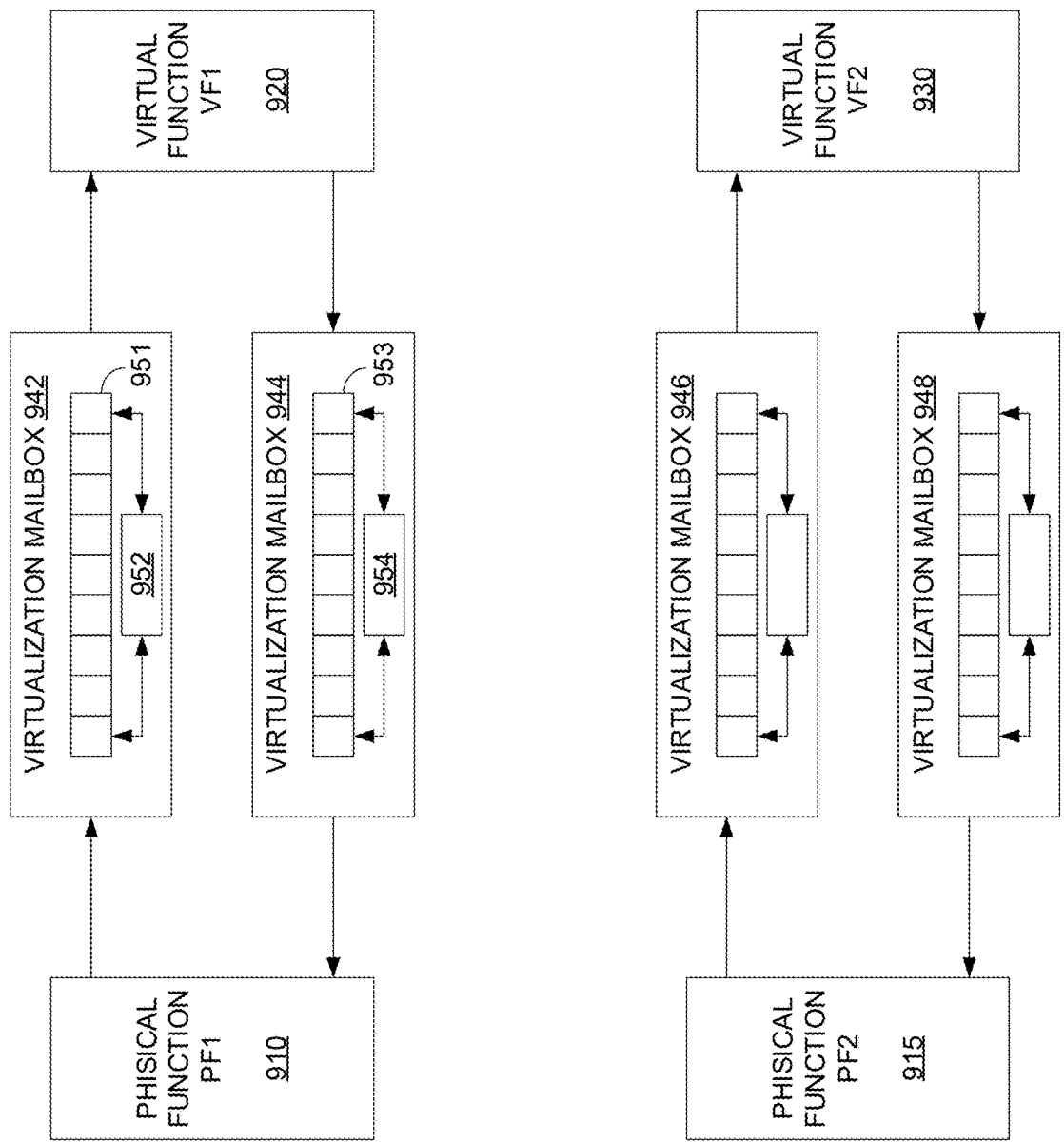
FIG. 9 is a diagram of illustrative virtualization mailboxes between a physical function and virtual functions.

FIG. 9 is a diagram of illustrative virtualization mailboxes between a first physical function 910 and a first virtual functions 920 (e.g., between physical function 193 and virtual function 196 of the first die 162 of CGR processor 110 of FIG. 1) and between a second physical function 915 and a second virtual function 930 (e.g., between physical function 194 and virtual function 198 of the second die 164 of CGR processor 110 of FIG. 1).

Illustratively, there may be twice as many virtualization mailboxes as the number of virtual functions supported by the reconfigurable processor. For example, there may be one virtualization mailbox each the physical functions 910, 915 to an associated virtual function 920, 930 and one virtualization mailbox from each virtual function 920, 930 to the associated physical function 910, 915. As shown in FIG. 9, there are two virtualization mailboxes 942, 944 between PF1 910 and VF1 920, a first virtualization mailbox 942 from PF1 910 to VF1 920 and a second virtualization mailbox 944 from VF1 920 to PF1 910, and there are two virtualization mailboxes 946, 948 between PF2 915 and VF2 930, a third virtualization mailbox 946 from PF2 915 to VF2 930 and a fourth virtualization mailbox 948 from VF2 930 to PF2 915.

Each virtualization mailbox pair (between each PF/VF pair) may include a predetermined number of control registers and/or mailbox message buffers. If desired, each virtualization mailbox of a virtualization mailbox pair may include a mailbox message buffer and a control register. The control register may be adapted for signaling when a mailbox message buffer has received a message and when the message has been retrieved from the mailbox message buffer, thereby facilitating mailbox message buffer management handshake between the PF and the VF as they allow PF and VF to signal when a mailbox message buffer is free for reuse. As shown in FIG. 9, each virtualization mailbox of virtualization mailbox pair 942, 944 may include a control registers 952, 954 and a mailbox message buffer 951, 953.

If desired, PF1 910 may generate an interrupt when PF1 910 sends a message to VF1, and the reconfigurable processor may be adapted for only routing the interrupt to a virtual function driver that is associated with VF1 about the interrupt, which in turn may notify VF1 that a message has been delivered.

In some implementations, a reconfigurable processor (e.g., CGR processor 110 of FIG. 1) may include more than one die in a packet (e.g., dies 162 and 164 in package 160 of FIG. 1) and each die may include a PCIe interface (e.g., I/O interfaces 138 and 136 of FIG. 1) that couples the respective die of the reconfigurable processor to a runtime processor (e.g., runtime processor 180 of FIG. 1) through a PCIe bus (e.g., communication link 185 of FIG. 1 may be a PCIe bus). In these implementations, the runtime processor may be adapted for configuring each PCIe interface as a single-root input-output virtualization (SR-IOV) interface. The respective SR-IOV interface may allow a die on the reconfigurable processor to separate access to its resources among various PCIe hardware functions.

As an example, a first SR-IOV interface may provide access to one or more CGR arrays (e.g., the K CGR arrays 120) on the first die of the reconfigurable processor through the PCIe bus from a first physical function driver (e.g., PF1 driver 183 of FIG. 1) and from up to M virtual functions drivers, where M is a non-negative integer (e.g., VF1 driver 186 and/or VF2 driver 187 of FIG. 1). As another example, a second SR-IOV interface may provide access to one or more CGR arrays (e.g., the L CGR arrays 125) on the second die of the reconfigurable processor through the PCIe bus from a second physical function driver (e.g., PF2 driver 184 of FIG. 1) and from up to N virtual functions drivers, where N is a non-negative integer (e.g., VF1 driver 186 and/or VF2 driver 187 of FIG. 1).

Resources of each die of the reconfigurable processor such as control and status registers (CSRs), compute units, memory units, and an array-level network, may be divided between a physical function that is associated with the respective physical function driver and virtual functions that are associated with the respective virtual function drivers. Some resources may be exclusively controlled by the respective physical function, and the respective virtual function may have no access to these resources. As an example, the respective physical function may include controls for enabling the respective virtual functions, and the respective virtual functions may have no access to these controls.

In some implementations, the respective physical function (i.e., PF1 on the first die of the reconfigurable processor and PF2 on the second die of the reconfigurable processor) is a PCIe function of a network adapter (e.g., an I/O resource on a PCIe interface) that supports the single root I/O virtualization (SR-IOV) interface, as defined by the PCI Special Interest Group (PCISIG) "Single Root I/O Virtualization and Sharing Specification, Rev. 1.0", which is incorporated by reference herein, and as updated through various engineering change notices (ECNs) and specification updates. Physical functions may be fully featured PCIe functions that can be discovered, managed, and manipulated like any other PCIe device. The respective physical function (PF) may be used to configure and control the SR-IOV functionality of the network adapter, such as enabling virtualization and exposing PCIe Virtual Functions (VFs). A virtual function (VF) may be a PCIe function that has one or more physical resources in common with the physical function and with virtual functions that are associated with that physical function. A VF can only configure its own behavior.

Illustratively, a runtime processor may configure the devices (e.g., reconfigurable processors, storage devices, etc.) on a PCIe bus. For example, the runtime processor may query the devices on the PCIe bus to determine the amount of memory space and the supported functions of the devices. If desired, the runtime processor may enable or disable virtual functions.

Figure 10:
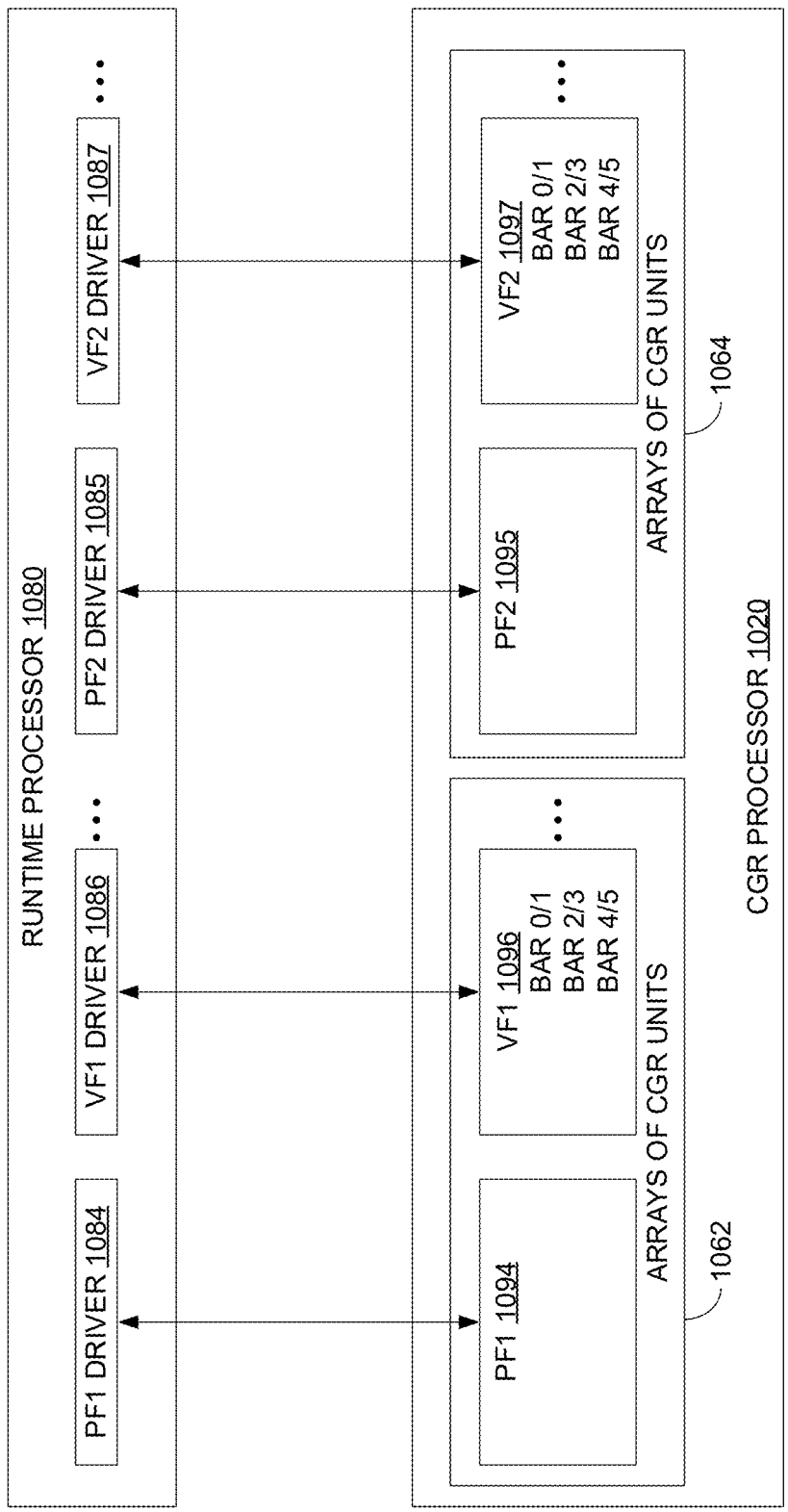
FIG. 10 is a diagram of an illustrative programming of base address registers (BARs) for virtual functions that are assigned arrays of CGR units that are arranged on two different dies.

When a virtual function is enabled, a predetermined number of base address registers (BARs) of a PCIe interface may be programmed for the virtual function. FIG. 10 is a diagram of an illustrative programming of base address registers (BARs) for virtual functions that are assigned arrays of CGR units that are arranged on two different dies 1062, 1064 in a CGR processor 1020 that is coupled to a runtime processor 1080 via a PCIe bus. Each one of the two dies 1062, 1064 may have a PCIe interface.

Illustratively, runtime processor 1080 may include physical function drivers 1084 (PF1 driver) and 1085 (PF2 driver) and virtual function drivers 1086 (VF1 driver) and 1087 (VF2 driver). Physical function 1 driver 1084 may communicate via the PCIe bus and a first PCIe interface with physical function 1 (PF1) 1094, PF2 driver 1085 may communicate via the PCIe bus and a second PCIe interface with physical function 2 1095 (PF2), VF1 driver 1086 may communicate via the PCIe bus and the first PCIe interface with virtual function 1 1096 (VF1), and VF2 driver 1087 may communicate via the PCIe bus and the second PCIe interface with virtual function 2 1097 (VF2).

Runtime processor 1080 may be adapted for programming first BARs of the first PCIe interface for VF1 1096 and second BARs of the second PCIe interface for a VF2 1097. For example, runtime processor 1080 may be adapted for programming BAR 0/1 in the first PCIe interface (i.e., the PCIe interface of die 1062) that are associated with a configuration space (e.g., for PCIe controller configuration), BAR 2/3 that are associated with memory access operations (e.g., DRAM and/or other device memory), and BAR 4/5 that are associated with accessing control and status registers (CSRs) and/or other resources within the arrays of CGR units of the first die 1062 to implement the virtual function VF1 1096 on the first die 1062 of CGR processor 1020. Runtime processor 1080 may be adapted for programming BAR 0/1 in the second PCIe interface (i.e., the PCIe interface of die 1064) that are associated with a configuration space (e.g., for PCIe controller configuration), BAR 2/3 that are associated with memory access operations (e.g., DRAM and/or other device memory), and BAR 4/5 that are associated with accessing control and status registers and/or other resources within the arrays of CGR units of the second die 1064 to implement the virtual function VF2 1097 on the second die 1064 of CGR processor 1020.

If desired, the BARs that are associated with the virtual functions VF1 1096 and VF2 1097 may be associated with corresponding virtual function drivers VF1 driver 1086 and VF2 driver 1087 within the runtime processor, respectively.

Thus, the virtual functions VF1 1096 and VF2 1097 are assigned three address ranges, and the physical functions PF1 1094 and PF2 1096 are assigned three address ranges. The elements of the first and second die 1062, 1064 that are accessible through the three address ranges may differ. For example, some registers on the first die 1062 may be reserved for the physical function PF1 1094, and some registers on the second die 1064 may be reserved for the physical function PF2 1095.

By way of example, the reconfigurable processor may provide BAR 2/3 on each die as one virtualization feature. The software that configures the dies of the reconfigurable processor and enables the VFs may configure BAR 2/3 for each VF of the VFs to determine the amount of physical memory that the VF can access. If desired, the interface between the PCIe bus and each die of the reconfigurable processor may include a Real to Physical Buffer (R2PB). The R2PB may provide for memory protection and memory address translation. For example, the software configuring each die of the reconfigurable processor may program the R2PB to translate the addresses used by each VF in its BAR 2/3 address range into physical addresses for the device memory. The R2PB may provide the configuring software the ability to map each VF's memory accesses to different physical addresses, or to map some or all address ranges to shared physical addresses.

Illustratively, the reconfigurable processor may check BAR 4/5 accesses for virtual functions and ensure that the access is for a supported address. If desired, the reconfigurable processor may report virtual function accesses to CSRs that are reserved for the physical function as errors.

As mentioned above, the reconfigurable processor (e.g., CGR processor 110 of FIG. 1) may be adapted for generating an interrupt to the runtime processor (e.g., runtime processor 180 of FIG. 1) in response to a predetermined event. The predetermined event may include at least one of a load-complete event, an execution-complete event, a checkpoint event, a direct memory access (DMA) completion event, a DMA error event, a memory access error, a runtime exception (e.g., a numerical exception occurring in a compute unit or an address-out-of-bounds exception occurring in a memory unit), or interrupts from other sources (e.g., performance interrupts or program completion interrupts).

Figure 11:
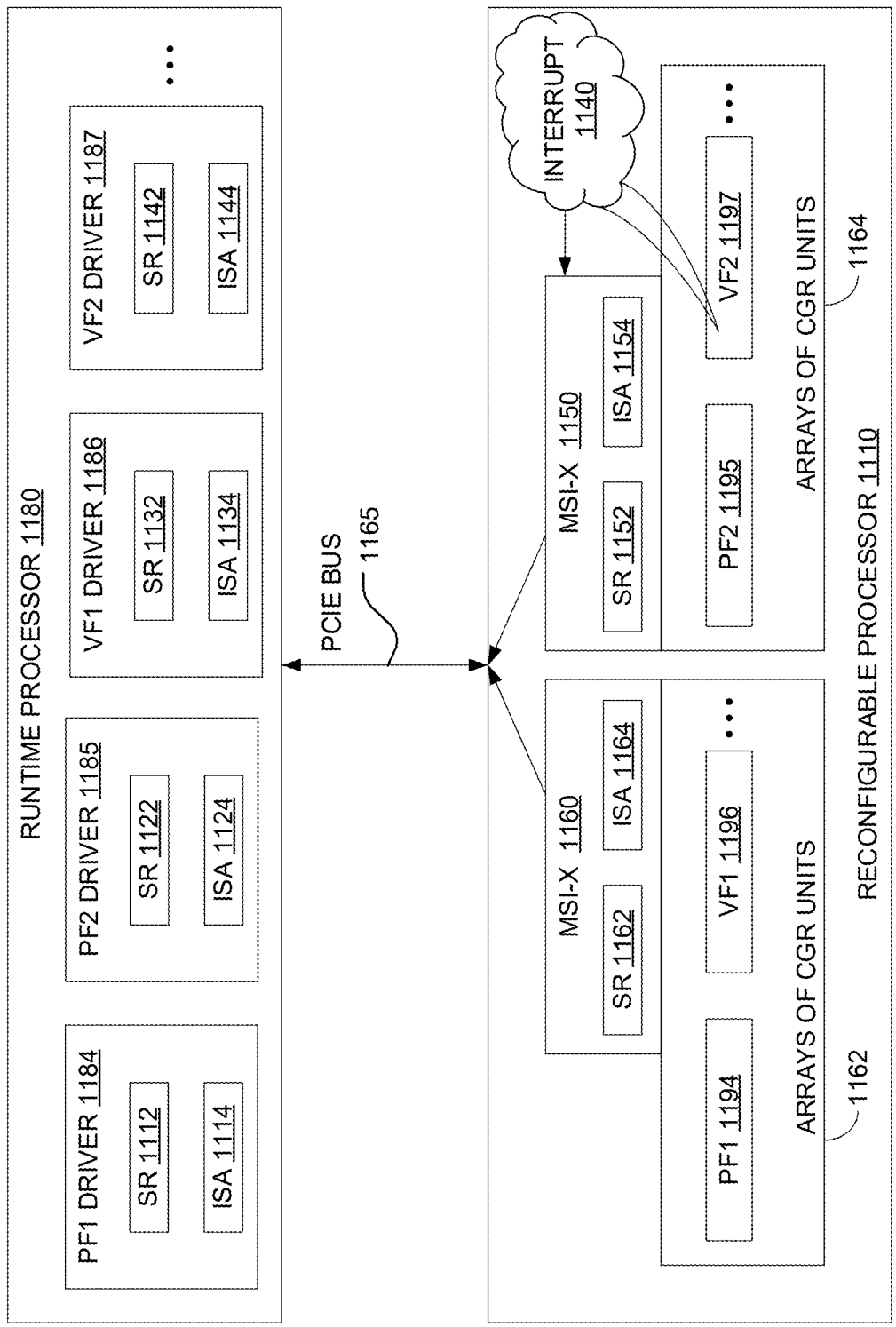
FIG. 11 is a diagram of an illustrative interrupt that is generated by a reconfigurable processor with CGR arrays arranged on two dies in response to a predetermined event.

FIG. 11 is a diagram of an illustrative system with a reconfigurable processor 1110 and a runtime processor 1180 that are coupled by a PCIe bus 1165. The reconfigurable processor 1110 includes two dies 1062, 1064 that are arranged in a package, each including arrays of CGR units, which are herein also referred to as CGR arrays (e.g., CGR arrays 120, 125 of FIG. 1).

As shown in FIG. 11, the runtime processor 1180 may provide access to the arrays of CGR units on die 1162 through the PCIe bus 1165 from a first physical function driver (PF1 driver) 1184 and from a first virtual function driver (VF2 driver) 1186. The runtime processor 1180 may provide access to the arrays of CGR units on die 1164 through the PCIe bus 1165 from a second physical function driver (PF2 driver) 1185 and from a second virtual function driver (VF2 driver) 1187. If desired, the runtime processor 1180 may provide access to the arrays on CGR units on die 1162 and on die 1164 from more than one virtual function driver. For example, the runtime processor 1180 may provide access to the arrays of CGR units on die 1162 and/or to the arrays of CGR units on die 1164 from two or more virtual function drivers.

The physical function (PF1) 1194 that is associated with PF1 driver 1184 has exclusive access to a first portion of the arrays of CGR units on the first die 1162, and PF1 1194 shares access to a second portion of the arrays of CGR units on the first die 1162 with a virtual function (VF1) 1196 that is associated with VF1 driver 1186. The physical function (PF2) 1195 that is associated with PF2 driver 1185 has exclusive access to a first portion of the arrays of CGR units on the second die 1164, and PF2 1195 shares access to a second portion of the arrays of CGR units on the second die 1164 with a virtual function (VF2) 1197 that is associated with VF1 driver 1187.

In some implementations, the reconfigurable processor 1110 may be adapted for generating an interrupt 1140 in response to a predetermined event. For example, the predetermined event may include at least one of a load-complete event, an execution-complete event, a checkpoint event, a direct memory access (DMA) completion event, a DMA error event, a memory access error, or a runtime exception.

The reconfigurable processor 1110 may configure delivery of the interrupt 1140 for PF1 driver 1184 or PF2 driver 1185. If desired, the reconfigurable processor 1110 may configure delivery of the interrupt 1140 for virtual function drivers 1186, 1187. The reconfigurable processor 1110 may route the interrupt 1140 to the appropriate physical function driver 1184, 1185 and/or virtual function drivers 1186, 1187 based on the event generating the interrupt 1140, the portion of the reconfigurable processor 1110 detecting or reporting the event, and the configuration of the virtual functions 1196, 1197 (e.g., the number of enabled VFs and their binding to the portions of the reconfigurable processor 1110).

As an example, VF1 1196 may have exclusive access among virtual functions VF1 1196, VF2 1197, . . . to a predetermined array of the arrays of CGR units on die 1162. In this example, the reconfigurable processor 1110 is adapted for only routing the interrupt 1140 to PF1 driver 1184 and to VF1 driver 1186 when the predetermined event occurred in the predetermined array of the arrays of CGR units on die 1162.

As another example, external memory (e.g., memory 190 of FIG. 1) may be operatively coupled to the PCIe bus 1165 and/or via a memory link (e.g., memory link 195 of FIG. 1) and VF1 1196 may have exclusive access among virtual functions VF1 1196 and VF2 1197, . . . to a predetermined portion of the external memory. In this example, the reconfigurable processor 1110 is adapted for only routing the interrupt 1140 to PF1 driver 1184 and to VF1 driver 1186 when the predetermined event occurred in the predetermined portion of the external memory or during access to the predetermined portion of the external memory.

As yet another example, reconfigurable processor 1110 may include a virtualization mailbox for sending messages from PF1 1194 to VF1 1196. If desired, PF1 may generate an interrupt when PF1 1194 sends a message to VF1 1196. In this example, the reconfigurable processor 1110 is adapted for only routing the interrupt 1140 to VF1 driver 1186, which in turn notifies VF1 1196 about the interrupt.

In some implementations, the reconfigurable processor 1110 may include storage circuitry. The storage circuitry may be adapted for storing a first identifier that identifies a die of the first and second dies and/or an array of the arrays of CGR units on the respective die that generated the interrupt 1140 and for storing a second identifier that identifies the predetermined event that caused the interrupt.

Illustratively, the reconfigurable processor 1110 is adapted for implementing a PCIe message signaled interrupt (MSI-X) 1160 in response to the predetermined event occurring on the first die 1162 and for implementing a PCIe message signaled interrupt (MSI-X) 1150 in response to the predetermined event occurring on the second die 1164. The message signaled interrupt (MSI-X) 1150, 1160 may record interrupts in storage circuitry on the first and second dies 1162, 1164. For example, the storage circuitry may include status registers 1152, 1162 and interrupt status arrays (ISA) 1154, 1164. Status registers 1152, 1162 and ISA 1154, 1164 may have one entry for each interrupt.

The status registers 1152, 1162 may be adapted for storing the first identifier that identifies an array of the arrays of CGR units 1120 that generated the interrupt 1140, and the ISA 1154, 1164 may be adapted for storing the second identifier that identifies the predetermined event that caused the interrupt. In some implementations, the ISA 1154, 1164 may store both, the first and second identifiers.

Illustratively, the runtime processor 1180 may be adapted for implementing a pair of interrupt status array status registers for each physical function drivers 1184, 1185 and for each virtual function driver 1186, 1187. As shown in FIG. 11, the runtime processor 1180 may implement status registers 1112 and ISA 1114 for PF1 driver 1184, status registers 1122 and ISA 1124 for PF2 driver 1185, status registers 1132 and ISA 1134 for VF1 driver 1187, and status registers 1142 and ISA 1144 for VF2 driver 1187.

In some implementations, the status registers are the CSRs of the respective PCIe interface and are fully virtualized. Thus, each virtual function 1196, 1197 may access its own status registers 1162, 1152 using the same addresses. The ISA (and the controls for the MSI-X messages) may be part of the MSI-X address region.

MSI-X interrupts 1150, 1160 generated from the PCIe host end point (HEP) may be disabled individually or all together using the MSI-X configuration registers in the PCIe configuration space. If desired, all interrupt events may be disabled in their respective source agent CSRs. Both MSI-X config and the source agent CSRs may be configured for an MSI-X interrupt to be sent.

Each interrupt request may be assigned an interrupt number. An interface may translate an event reported from any agent to an Interrupt Vector Number (INT #) along with an optional Event Data bit that can further specify one of the two possible events. Interrupt requests that are mutually exclusive (e.g., the AGCU program load and program execute completion, program checkpoint complete and program quiesce complete, or host tail pointer update and host header pointer update, just to name a few) may be merged into a single interrupt using this scheme. If desired, this scheme may be extended beyond two events in the group of mutually exclusive events being reported using a same Interrupt Vector Number (INT #), if desired.

Events and interrupts may be available to the PF1 driver 1184 or PF2 driver 1185, e.g., PF1 driver 1184 or PF 2 driver 1185 can subscribe to events and interrupts regardless of the virtualization status.

The CGR array-specific events, the DMA events, real to physical buffer (R2PB) misses, and the virtualization mailbox Interrupt may be available to VF1 driver 1186 and/or VF2 driver 1187 when virtualization is enabled. If multiple CGR arrays are assigned to one VF (e.g., as shown in FIGS. 8C, 8D, 8E, etc.), then the events from different CGR arrays may be reported using separate and incremental interrupt numbers, if desired.

As an example, a virtualization mailbox from a VF to the PF (e.g., virtualization mailbox 944 or 948 of FIG. 9) may generate an interrupt to the PF driver when the VF puts something in the virtualization mailbox, and the PF driver may receive this interrupt and notify the PF that something is in the virtualization mailbox. As another example, a virtualization mailbox from the PF to a VF (e.g., virtualization mailbox 942 or 946 of FIG. 9) may generate an interrupt to the VF driver when the PF puts something in the mailbox, and the VF driver may receive this interrupt and notify the VF that something is in the virtualization mailbox.

Illustratively, die 1162 of the reconfigurable processor 1110 may provide for M different interrupt identifiers that are numbered from 1 to M (or 0 to M−1, if desired), and die 1164 may provide for N different interrupt identifiers that are numbered 1 to N (or 0 to N−1, if desired). In some implementations, M may be equal to N. In other implementations, M may be different than N. As an example, die 1162 and die 1164 may provide for M=N=32 interrupt numbers. It should be noted that each die of the reconfigurable processor may provide a different number of interrupt numbers. For example, each die of the reconfigurable processor may provide more or less than 32 interrupts.

Consider the scenario in which each die 1162, 1164 of the reconfigurable processor 1110 supports 32 interrupts that are numbered 0 to 31. Consider further that each die of the reconfigurable processor 1110 supports 26 virtualized interrupts.

The virtualized interrupts (e.g., interrupts 1 to 26) on each die have to be mapped for PF and VF. Illustratively, the interrupts map directly for the PF of the die. In other words, PF may receive the interrupts as physical interrupt numbers. For several interrupt groups, a single event identifier may generate one of several physical interrupt numbers. The AGCU that sent the request may determine which physical interrupt is generated. For example, in the scenario in which the reconfigurable processor includes two dies, each having two CGR arrays, physical interrupt 3 may be generated in response to the master AGCU on physical CGR array 3 sending event ID 0. Thus, AGCU Event IDs 0 and 1 may generate physical interrupts 1 to 4, AGCU Event IDs 2 and 4 may generate physical interrupts 5 to 8, AGCU Event IDs 5 and 6 may generate physical interrupts 19 to 22, and AGCU Event ID 3 may generate physical interrupts 23 to 26.

TABLE 1

Mapping between physical interrupt numbers and actual interrupt numbers for the first die

| Physical Interrupt Number | PF Interrupt Number | 2 VF (1 tile each) Mappings | | 1 VF 1 tile Mappings | 1 VF 2 tile Mappings | 1 VF 4 tile Mappings |
|---|---|---|---|---|---|---|
| | | VF1 | VF2 | VF1 | VF1 | VF1 |
| 1 | 1 | 1 | | 1 | 1 | 1 |
| 2 | 2 | | 1 | | 2 | 2 |
| 3 | 3 | | | | | 3 |
| 4 | 4 | | | | | 4 |
| 5 | 5 | 5 | | 5 | 5 | 5 |
| 6 | 6 | | 5 | | 6 | 6 |
| 7 | 7 | | | | | 7 |
| 8 | 8 | | | | | 8 |
| 11 | 11 | 11 | | 11 | 11 | 11 |
| 12 | 12 | 12 | | 12 | 12 | 12 |
| 13 | 13 | 13 | | 13 | 13 | 13 |
| 14 | 14 | 14 | | 14 | 14 | 14 |
| 15 | 15 | | 11 | 15 | 15 | 15 |
| 16 | 16 | | 12 | 16 | 16 | 16 |
| 17 | 17 | | 13 | 17 | 17 | 17 |
| 18 | 18 | | 14 | 18 | 18 | 18 |
| 19 | 19 | 19 | | 19 | 19 | 19 |
| 20 | 20 | | 19 | | 20 | 20 |
| 21 | 21 | | | | | 21 |
| 22 | 22 | | | | | 22 |
| 23 | 23 | 23 | | 23 | 23 | 23 |
| 24 | 24 | | 23 | | 24 | 24 |
| 25 | 25 | | | | | 25 |
| 26 | 26 | | | | | 26 |

Table 1 shows an illustrative mapping between physical interrupt numbers and actual interrupt numbers for the virtual functions for a first die of a reconfigurable processor having two CGR arrays with two virtual functions enabled, each assigned a CGR array (2VF (1 tile each) Mappings) as illustratively shown in FIGS. 8Q to 8T, with one virtual functions assigned one CGR array (1VF 1 tile Mappings) as illustratively shown in FIGS. 8H to 8K, with one virtual function assigned two CGR arrays (1VF 2 tile Mappings) as illustratively shown in FIGS. 8L to 8P, and with one virtual function assigned four CGR arrays (1VF 4 tile Mappings) as illustratively shown in FIG. 8E.

TABLE 2

Mapping between physical interrupt numbers and actual interrupt numbers for the second die

| Physical Interrupt Number | PF Interrupt Number | 2 VF (1 tile each) Mappings | | 1 VF 1 tile Mappings | 1 VF 2 tile Mappings | 1 VF 4 tile Mappings |
|---|---|---|---|---|---|---|
| | | VF1 | VF2 | VF1 | VF1 | VF1 |
| 1 | 1 | | | | | 3 |
| 2 | 2 | | | | | 4 |
| 3 | 3 | 1 | | 1 | 1 | 1 |
| 4 | 4 | | 1 | | 2 | 2 |
| 5 | 5 | | | | | 7 |
| 6 | 6 | | | | | 8 |
| 7 | 7 | 5 | | 5 | 5 | 5 |
| 8 | 8 | | 5 | | 6 | 6 |
| 11 | 11 | 11 | | 11 | 11 | 11 |
| 12 | 12 | 12 | | 12 | 12 | 12 |
| 13 | 13 | 13 | | 13 | 13 | 13 |
| 14 | 14 | 14 | | 14 | 14 | 14 |
| 15 | 15 | | 11 | 15 | 15 | 15 |
| 16 | 16 | | 12 | 16 | 16 | 16 |
| 17 | 17 | | 13 | 17 | 17 | 17 |
| 18 | 18 | | 14 | 18 | 18 | 18 |
| 19 | 19 | | | | | 21 |
| 20 | 20 | | | | | 22 |
| 21 | 21 | 19 | | 19 | 19 | 19 |
| 22 | 22 | | 19 | | 20 | 20 |
| 23 | 23 | | | | | 25 |
| 24 | 24 | | | | | 26 |
| 25 | 25 | 23 | | 23 | 23 | 23 |
| 26 | 26 | | 23 | | 24 | 24 |

Table 2 shows an illustrative mapping between physical interrupt numbers and actual interrupt numbers for the virtual functions for a second die of a reconfigurable processor having two CGR arrays with two virtual functions enabled, each one assigned a CGR array (2VF (1 tile each) Mappings) as illustratively shown in FIG. 8K, 8P, or 8T, one virtual functions assigned one CGR array (1VF 1 tile Mappings) as illustratively shown in FIG. 8B, 8I, 8M, or 8R, one virtual function enabled on two CGR arrays (1VF 2 tile Mappings) as illustratively shown in FIG. 8C, 8J, 8N, or 8S, and one virtual function enabled on four CGR arrays (1VF 4 tile Mappings) as illustratively shown in FIG. 8E.

For example, physical interrupt numbers 1 to 4 may indicate an event of a first predetermined type that occurred in the respective CGR arrays 1 to 4. In this example, the respective physical function and/or the associated physical function driver and the one virtual function driver and/or the associated virtual function that is assigned all four CGR arrays (1VF 4 tile Mappings) may receive the same interrupt numbers 1 to 4. Each one of the virtual functions assigned to a single CGR array (i.e., 2VF (1 tile each) Mappings or 1 VF 1 tile Mappings) and/or the associated virtual function driver may receive the interrupt number 1 to indicate that the first predetermined event has occurred in the CGR array in which the virtual function is enabled. In the 1VF 2 tile Mappings, VF1 is assigned CGR arrays 1 and 2. Therefore, VF1 and/or the associated virtual function driver receives interrupt numbers 1 and 2 when the first predetermined event occurred in CGR arrays 1 and 2, respectively.

If desired, some CSRs may allow the physical function to disable the reporting of specific events from specific units to the virtual functions, and other CSRs may allow the virtual functions to disable reporting of specific events from specific units to itself. Because these disables affect interrupt delivery to VFs, interrupt requests that do not generate virtualized interrupts do not need these controls. For example, DDR and HBM may have no interrupt requests that generate interrupts to VFs and so have no virtualization interrupt request disables.

Figure 12:
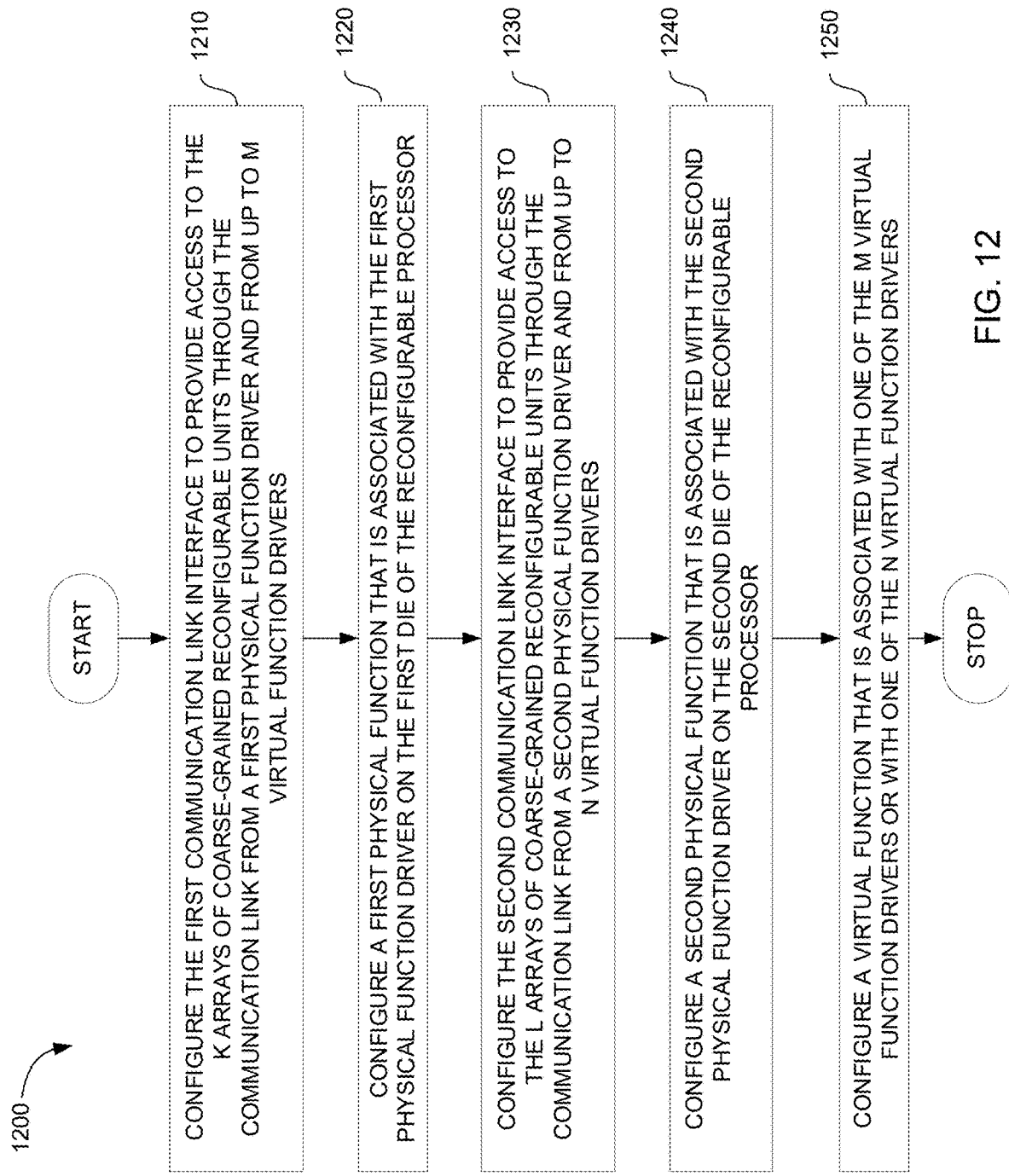
FIG. 12 is a flowchart showing illustrative operations that a runtime processor of a data processing system may perform for enabling virtual functions in a reconfigurable processor with two dies.

FIG. 12 is a flowchart 1200 showing illustrative operations that a runtime processor may perform in a system (e.g., system 100 of FIG. 1) such that virtual functions are enabled. An example system as shown in FIG. 1 includes a communication link 185, a runtime processor 180 that is operatively coupled to the communication link 185, and a reconfigurable processor 110 that includes a package 160 and first and second dies 162, 164 that are arranged in the package 160. The first die 162 includes K arrays of coarse-grained reconfigurable units 120, where K is an integer greater than 1, and a first communication link interface 138 that is operatively coupled to the communication link 185, thereby coupling the first die 162 to the runtime processor 180 via the communication link 185. The second die 164 is coupled to the first die 162 and comprises L arrays of coarse-grained reconfigurable units 125, where L is an integer greater than 1, and a second communication link interface 136 that is operatively coupled to the communication link 185, thereby coupling the second die 164 to the runtime processor 180 via the communication link 185.

During operation 1210, the runtime processor configures the first communication link interface to provide access to the K arrays of coarse-grained reconfigurable units through the communication link from a first physical function driver and from up to M virtual function drivers, where M is a non-negative integer. For example, the runtime processor 180 of FIG. 1 may configure the first communication link interface 138 to provide access to the K arrays of coarse-grained reconfigurable units 120 through the communication link 185 from a first physical function driver 183 and from up to M virtual function drivers 186, 187.

During operation 1220, the runtime processor configures a first physical function that is associated with the first physical function driver on the first die of the reconfigurable processor, wherein the first physical function is provided access to both a first portion and a second portion of the first die. For example, the runtime processor 180 of FIG. 1 may configure a first physical function 193 that is associated with the first physical function driver 183 on the first die 162 of the reconfigurable processor 110, wherein the first physical function 193 is provided access to both a first portion and a second portion of the first die 162.

During operation 1230, the runtime processor configures the second communication link interface to provide access to the L arrays of coarse-grained reconfigurable units through the communication link from a second physical function driver and from up to N virtual function drivers, where N is a non-negative integer. For example, the runtime processor 180 of FIG. 1 may configure the second communication link interface 136 to provide access to the L arrays of coarse-grained reconfigurable units 125 through the communication link 185 from a second physical function driver 184 and from up to N virtual function drivers 186, 187.

During operation 1240, the runtime processor configures a second physical function that is associated with the second physical function driver on the second die of the reconfigurable processor, wherein the second physical function is provided access to both a first portion and a second portion of the second die. For example, the runtime processor 180 of FIG. 1 may configure a second physical function 194 that is associated with the second physical function driver 184 on the second die 164 of the reconfigurable processor 110, wherein the second physical function 194 is provided access to both a first portion and a second portion of the second die 164.

During operation 1250, the runtime processor configures a virtual function that is associated with one of the M virtual function drivers or with one of the N virtual function drivers on the first die and/or the second die of the reconfigurable processor, wherein the virtual function is provided access to the second portion of the first and/or to the second portion of the second die and is blocked from accessing the first portion of the first die and the first portion of the second die. For example, the runtime processor 180 of FIG. 1 may configure a virtual function 196 that is associated with one of the M virtual function drivers 186, 187 or with one of the N virtual function drivers 186, 187 on the first die 162 and/or the second die 164 of the reconfigurable processor 110, wherein the virtual function 196 is provided access to the second portion of the first die 162 and/or to the second portion of the second die 164 and is blocked from accessing the first portion of the first die 162 and the first portion of the second die 164.

In some implementations, each die of the reconfigurable processor comprises two CGR arrays (e.g., CGR arrays 211, 212 on die 262 and CGR arrays 213, 214 on die 264 of reconfigurable processor 200 of FIG. 2). In these implementations, the runtime processor may configure the second communication link interface to one of a first configuration wherein no virtual function of the up to N virtual functions is enabled (e.g., as illustratively shown in FIG. 8H, 8L, or 8Q), a second configuration wherein one virtual function of the up to N virtual functions is assigned one array of the L arrays of coarse-grained reconfigurable units of the second die (e.g., as illustratively shown in FIG. 8B, 8I, 8M, or 8R), a third configuration wherein one virtual function of the up to N virtual functions is assigned both of the L arrays of coarse-grained reconfigurable units of the second die (e.g., as illustratively shown in FIG. 8C, 8J, 8N, or 8S), a fourth configuration wherein one virtual function of the up to N virtual functions is assigned both of the L arrays of coarse-grained reconfigurable units of the second die and on one of the K arrays of coarse-grained reconfigurable units of the first die (e.g., as illustratively shown in FIG. 8D or 8G), a fifth configuration wherein one virtual function of the up to N virtual functions is assigned the K arrays of coarse-grained reconfigurable units of the first die and on the L arrays of coarse-grained reconfigurable units of the second die (e.g., as illustratively shown in FIG. 8E), or a sixth configuration wherein a first virtual function of the up to N virtual functions is assigned a first array of the L arrays of coarse-grained reconfigurable units of the second die and a second virtual function of the up to N virtual functions is assigned a second array of the L arrays of coarse-grained reconfigurable units of the second die (e.g., as illustratively shown in FIG. 8F, 8K, 8P, or 8T).

In these implementations, the runtime processor may configure the first communication link interface to one of a seventh configuration wherein no virtual function of the up to M virtual functions is enabled (e.g., as illustratively shown in FIGS. 8B to 8F), an eighth configuration wherein one virtual function of the up to M virtual functions is enabled on one array of the K arrays of coarse-grained reconfigurable units of the first die, when the second communication link interface is configured in the first, second, third, fourth, or sixth configuration (e.g., as illustratively shown in FIGS. 8G to 8K), a ninth configuration wherein one virtual function of the up to M virtual functions is enabled on both of the K arrays of coarse-grained reconfigurable units of the first die, when the second communication link interface is configured in the first, second, third, or sixth configuration (e.g., as illustratively shown in FIGS. 8L to 8P), and a tenth configuration wherein a first virtual function of the up to M virtual functions is enabled on a first array of the K arrays of coarse-grained reconfigurable units of the first die and a second virtual function of the up to M virtual functions is enabled on a second array of the K arrays of coarse-grained reconfigurable units of the first die, when the second communication link interface is configured in the first, second, third, or sixth configuration (e.g., as illustratively shown in FIGS. 8Q to 8T).

In some scenarios, each die of the first and second dies further comprises a double-data rate (DDR) memory interface. For example, dies 162 and 164 of FIG. 1 both includes a memory interface 133, 132, which may both be implemented as a DDR memory interface. In these scenarios, configuring the second communication link interface in the second, third, and sixth configurations, may include enabling, with the runtime processor, access from the respective virtual function on the second die to the DDR memory interface of the second die and preventing access from the respective virtual function on the second die to the DDR memory interface of the first die. Configuring the second communication link interface in the fourth and fifth configurations, may include enabling, with the runtime processor, access from the respective virtual function to the DDR memory interface of the first die and to the DDR memory interface of the second die.

In some implementations, the communication link comprises a Peripheral Component Interface Express (PCIe) bus and the first and second communication link interfaces each comprise a PCIe interface. In these implementations, the runtime processor may program a first predetermined number of base address registers (BARs) of the first PCIe interface for a first virtual function of the up to M virtual functions and a second predetermined number of BARs of the second PCIe interface for a second virtual function of the up to N virtual functions.

In some implementations, when programming a first predetermined number of BARs of the first PCIe interface for the first virtual function, the runtime processor may assign to the first virtual function two BARs that are associated with a configuration space, two BARs that are associated with memory access operations, and two BARs that are associated with accessing control and status registers. Similarly, when programming a second predetermined number of BARs of the second PCIe interface for the second virtual function, the runtime processor may assign to the second virtual function two BARs that are associated with a configuration space, two BARs that are associated with memory access operations, and two BARs that are associated with accessing control and status registers. If desired, the BARs that are associated with the first and second virtual functions may be assigned to corresponding first and second virtual function drivers within the runtime processor.

In the scenario above in which the communication link comprises a Peripheral Component Interface Express (PCIe) bus and the first and second communication link interfaces are PCIe interfaces, the runtime processor may configure the PCIe interfaces as single-root input-output virtualization (SR-IOV) interfaces to provide access to the CGR arrays on the first and second dies through the PCIe bus from the first and second physical function driver and from the first and/or second virtual function.

If desired, a non-transitory computer-readable storage medium includes instructions that, when executed by a processing unit (e.g., runtime processor 180 of FIG. 1), cause the processing unit to operate a system (e.g., system 100 of FIG. 1) by performing operations 1210 to 1250.

For example, such a non-transitory computer-readable storage medium may include instructions for configuring the interface to the communication link to provide access to the K arrays of coarse-grained reconfigurable units through the communication link from a first physical function driver and from up to M virtual function drivers, where M is a non-negative integer, instructions for configuring a first physical function that is associated with the first physical function driver on the first die of the reconfigurable processor, wherein the first physical function is provided access to both a first portion and a second portion of the first die, instructions for configuring the second communication link interface to provide access to the L arrays of coarse-grained reconfigurable units through the communication link from a second physical function driver and from up to N virtual function drivers, where N is a non-negative integer, instructions for configuring a second physical function that is associated with the second physical function driver on the second die of the reconfigurable processor, wherein the second physical function is provided access to both a first portion and a second portion of the second die, and instructions for configuring a virtual function that is associated with one of the M virtual function drivers or with one of the N virtual function drivers on the first die and/or the second die of the reconfigurable processor, wherein the virtual function is provided access to the second portion of the first and/or second die and is blocked from accessing the first portion of the first die and the first portion of the second die.

FIG. 13 is a flowchart 1300 showing illustrative operations that a runtime processor and a reconfigurable processor may perform in a system (e.g., system 100 of FIG. 1) for handling interrupts when virtual functions are enabled in a reconfigurable processor. An example system as shown in FIG. 1 includes a communication link 185, a runtime processor 180 that is operatively coupled to the communication link 185, and a reconfigurable processor 110 that includes a package 160 and first and second dies 162, 164 that are arranged in the package 160. The first die 162 includes first arrays of coarse-grained reconfigurable units 120 and a first communication link interface 138 that couples the first die 162 to the runtime processor 180 via the communication link 185. The second die includes second arrays of coarse-grained reconfigurable units 125 and a second communication link interface 136 that couples the second die 164 to the runtime processor 180 via the communication link 185.

During operation 1310, the runtime processor configures the first and second communication link interfaces to provide access to the first and second arrays of coarse-grained reconfigurable units from first and second physical function drivers and from at least one virtual function driver. For example, the runtime processor 180 of FIG. 1 may configure the first and second communication link interfaces 138, 136 to provide to the first and second arrays of coarse-grained reconfigurable units 120, 125 from first and second physical function drivers 183, 184 and from at least one virtual function driver 186, 187.

During operation 1320, the reconfigurable processor generates an interrupt in response to a predetermined event. For example, the reconfigurable processor 110 of FIG. 1 may generate interrupt 170 in response to an event in one of the CGR arrays 120 that is assigned to virtual function VF1 196.

During operation 1330, the reconfigurable processor routes the interrupt to one of the first physical function driver or the second physical function driver and to a virtual function driver of the at least one virtual function driver. As an example, the reconfigurable processor 110 of FIG. 1 may route the interrupt 170 to the physical function driver 183 of runtime processor 180 and to VF1 driver 186 of runtime processor 180. As another example, the reconfigurable processor 110 of FIG. 1 may route the interrupt 170 to the physical function driver 183 and to VF2 driver 187.

In some implementations, the reconfigurable processor further comprises storage circuitry for storing a first identifier in the storage circuitry that identifies a die of the first and second dies that generated the interrupt and for storing a second identifier in the storage circuitry that identifies the predetermined event that caused the interrupt.

Illustratively, the communication link comprises a Peripheral Component Interface Express (PCIe) bus, and the reconfigurable processor may implement a PCIe message signaled interrupt (MSI-X) in response to the predetermined event.

In some scenarios, the storage circuitry includes status registers that are adapted for storing the first identifier and an interrupt status array (ISA) that is adapted for storing the second identifier. In these scenarios, the runtime processor may implement a pair of ISA and status registers for each one of the first and second physical function drivers and for each one of the at least one virtual functions driver.

By way of example, a first virtual function of the at least one virtual function that is associated with a first virtual function driver of the at least one virtual function driver, has exclusive access among the at least one virtual function to a predetermined array of the first arrays of coarse-grained reconfigurable units on the first die, and the reconfigurable processor only routes the interrupt to the first physical function driver and to the first virtual function driver when the predetermined event occurred in the predetermined array of the first arrays of coarse-grained reconfigurable units.

In some implementations, the system may include external memory (e.g., memory 190 of system 100 of FIG. 1) that is operatively coupled to the communication link, and a first virtual function of the at least one virtual function that is associated with a first virtual function driver of the at least one virtual function driver has exclusive access among the at least one virtual function to a predetermined portion of the external memory. In these implementations, the reconfigurable processor may route the interrupt to the first physical function driver and to the first virtual function driver when the predetermined event occurred in the predetermined portion of the external memory or during access to the predetermined portion of the external memory.

In some implementations, the reconfigurable processor includes a virtualization mailbox for sending messages from the first physical function that is associated with the first physical function driver to a first virtual function of the at least one virtual function that is associated with a first virtual function driver of the at least one virtual function driver, and the first physical function may generate an interrupt when the first physical function sends a message to the first virtual function. In these implementations, the reconfigurable processor may route the interrupt to the first virtual function driver.

If desired, a non-transitory computer-readable storage medium includes instructions that, when executed by a processing unit (e.g., runtime processor 180 of FIG. 1), cause the processing unit to operate a system (e.g., system 100 of FIG. 1) by performing operations 1310, 1320, and 1330.

For example, a non-transitory computer-readable storage medium includes instructions for configuring the first and second communication link interfaces to provide access to the first and second arrays of coarse-grained reconfigurable units from first and second physical function drivers and from at least one virtual function driver, instructions for generating an interrupt in response to a predetermined event, and routing the interrupt to one of the first physical function driver or the second physical function driver and to a virtual function driver of the at least one virtual function driver.

In some implementations, a first virtual function of at least one virtual function that is associated with a first virtual function driver of the at least one virtual function driver may have exclusive access among the at least one virtual function to a predetermined array of the first arrays of coarse-grained reconfigurable units on the first die. In these implementations, the non-transitory computer-readable storage medium may include instructions for routing the interrupt to the first physical function driver and to the first virtual function driver when the predetermined event occurred in the predetermined array of the first arrays of coarse-grained reconfigurable units on the first die.

In some implementations, the system may include external memory (e.g., memory 190 of system 100 of FIG. 1) that is operatively coupled to the communication link, and a first virtual function of the at least one virtual function that is associated with a first virtual function driver of the at least one virtual function driver has exclusive access among the at least one virtual function to a predetermined portion of the external memory. In these implementations, the non-transitory computer-readable storage medium may include instructions for routing the interrupt to the first physical function driver and to the first virtual function driver when the predetermined event occurred in the predetermined portion of the external memory or during access to the predetermined portion of the external memory.

In some implementations, the reconfigurable processor includes a virtualization mailbox for sending messages from the first physical function that is associated with the first physical function driver to a first virtual function of the at least one virtual function that is associated with a first virtual function driver of the at least one virtual function driver, and the first physical function may generate an interrupt when the first physical function sends a message to the first virtual function. In these implementations, the non-transitory computer-readable storage medium may include instructions for routing the interrupt to the first virtual function driver.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

As will be appreciated by those of ordinary skill in the art, aspects of the presented technology may be embodied as a system, device, method, or computer program product apparatus. Accordingly, elements of the present disclosure may be implemented entirely in hardware, entirely in software (including firmware, resident software, micro-code, or the like) or in software and hardware that may all generally be referred to herein as a "apparatus," "circuit," "circuitry," "module," "computer," "logic," "FPGA," "unit," "system," or other terms. Furthermore, aspects of the presented technology may take the form of a computer program product embodied in one or more computer-readable medium(s) having computer program code stored thereon. The phrases "computer program code" and "instructions" both explicitly include configuration information for a CGRA, an FPGA, or other programmable logic as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of the present technology may be written in any combination of one or more programming languages, including object-oriented programming languages such as Java, Python, C++, or the like, conventional procedural programming languages, such as the "C" programming language or similar programming languages, or low-level computer languages, such as assembly language or microcode. In addition, the computer program code may be written in VHDL, Verilog, or another hardware description language to generate configuration instructions for an FPGA, CGRA IC, or other programmable logic. The computer program code if converted into an executable form and loaded onto a computer, FPGA, CGRA IC, or other programmable apparatus, produces a computer implemented method. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

Example 1 is a data processing system, comprising: a communication link; a runtime processor that is operatively coupled to the communication link; and one or more reconfigurable processors, a reconfigurable processor of the one or more reconfigurable processors comprising: a package; a first die that is arranged in the package and comprises: K arrays of coarse-grained reconfigurable units, where K is an integer greater than 1; and a first communication link interface that is operatively coupled to the communication link, thereby coupling the first die to the runtime processor via the communication link, wherein the runtime processor is adapted for configuring the first communication link interface to provide access to the K arrays of coarse-grained reconfigurable units through the communication link from a first physical function driver and from up to M virtual function drivers, where M is a non-negative integer; and a second die that is arranged in the package, coupled to the first die via a die-to-die link, and comprises: L arrays of coarse-grained reconfigurable units, where L is an integer greater than 1; and a second communication link interface that is operatively coupled to the communication link, thereby coupling the second die to the runtime processor via the communication link, wherein the runtime processor is adapted for configuring the second communication link interface to provide access to the K arrays of coarse-grained reconfigurable units of the first die and to the L arrays of coarse-grained reconfigurable units of the second die through the communication link from a second physical function driver and from up to N virtual function drivers, where N is a non-negative integer.

In Example 2, N of Example 1 is greater than or equal to M.

In Example 3, L of Example 1 is greater than or equal to K.

In Example 4, K of Example 1 is equal to M and L is equal to N.

In Example 5, a first physical function that is associated with the first physical function driver of Example 1 has exclusive access to a first portion of the K arrays of coarse-grained reconfigurable units of the first die, and wherein the first physical function shares access to a second portion of the K arrays of coarse-grained reconfigurable units of the first die that is different than the first portion of the first die with up to M virtual functions that are associated with the up to M virtual function drivers.

In Example 6, each virtual function of the up to M virtual functions of Example 5 has exclusive access among the up to M virtual functions to at least one of the K arrays of coarse-grained reconfigurable units of the first die.

In Example 7, K and L of Example 1 are both equal to two, wherein up to M virtual functions that are associated with the up to M virtual function drivers are enabled and assigned arrays of the K arrays of coarse-grained reconfigurable units of the first die, wherein up to N virtual functions that are associated with the up to N virtual function drivers are enabled and assigned arrays of the K arrays of coarse-grained reconfigurable units of the first die and/or of the L arrays of coarse-grained reconfigurable units of the second die, and the runtime processor is adapted for configuring the second communication link interface to one of: a first configuration wherein no virtual function of the up to N virtual functions is enabled, a second configuration wherein one virtual function of the up to N virtual functions is assigned one array of the L arrays of coarse-grained reconfigurable units of the second die, a third configuration wherein one virtual function of the up to N virtual functions is assigned both of the L arrays of coarse-grained reconfigurable units of the second die, a fourth configuration wherein one virtual function of the up to N virtual functions is assigned both of the L arrays of coarse-grained reconfigurable units of the second die and one of the K arrays of coarse-grained reconfigurable units of the first die, a fifth configuration wherein one virtual function of the up to N virtual functions is assigned the K arrays of coarse-grained reconfigurable units of the first die and the L arrays of coarse-grained reconfigurable units of the second die, or a sixth configuration wherein one virtual function of the up to N virtual functions is assigned a first array of the L arrays of coarse-grained reconfigurable units of the second die and another virtual function of the up to N virtual functions is assigned a second array of the L arrays of coarse-grained reconfigurable units of the second die.

In Example 8, the runtime processor of Example 7 is adapted for configuring the first communication link interface when the second communication link interface is configured to the fifth configuration to: a seventh configuration wherein no virtual function of the up to M virtual functions is enabled.

In Example 9, the runtime processor of Example 7 is adapted for configuring the first communication link interface when the second communication link interface is configured to the fourth configuration to one of: a seventh configuration wherein no virtual function of the up to M virtual functions is enabled, or an eighth configuration wherein one virtual function of the up to M virtual functions is assigned one array of the K arrays of coarse-grained reconfigurable units of the first die.

In Example 10, the runtime processor of Example 7 is adapted for configuring the first communication link interface when the second communication link interface is configured to the first, second, third, or sixth configuration to one of: a seventh configuration wherein no virtual function of the up to M virtual functions is enabled, an eighth configuration wherein one virtual function of the up to M virtual functions is assigned one array of the K arrays of coarse-grained reconfigurable units of the first die, a ninth configuration wherein one virtual function of the up to M virtual functions is assigned both of the K arrays of coarse-grained reconfigurable units of the first die, or a tenth configuration wherein one function of the up to M virtual functions is assigned a first array of the K arrays of coarse-grained reconfigurable units of the first die and another virtual function of the up to M virtual functions is assigned a second array of the K arrays of coarse-grained reconfigurable units of the first die.

In Example 11, each die of the first and second dies of Example 7 further comprises: a double-data rate (DDR) memory interface, wherein the one virtual function of the second, third, and sixth configurations is enabled to access the DDR memory interface of the second die and is prevented from accessing the DDR memory interface of the first die.

In Example 12, each die of the first and second dies of Example 7 further comprises: a double-data rate (DDR) memory interface, wherein the one virtual function of the fourth and fifth configurations is enabled to access the DDR memory interface of the first die and the DDR memory interface of the second die.

In Example 13, the runtime processor of Example 1 is adapted for programming a first predetermined number of base address registers (BARs) of the first communication link interface for a first virtual function of the up to M virtual functions that are associated with the up to M virtual function drivers and for programming a second predetermined number of BARs of the second communication link interface for a second virtual function of the up to N virtual functions that are associated with the up to N virtual function drivers, wherein the communication link comprises a Peripheral Component Interface Express (PCIe) bus, and wherein the first and second communication link interfaces each comprise a PCIe interface.

In Example 14, the first die of Example 1 comprises first control and status registers and wherein the second die comprises second control and status registers, wherein the reconfigurable processor implements a virtual address map for the first control and status registers on the first die and for the second control and status registers on the second die, and wherein a physical address map of the first and second control and status registers in the package comprises the virtual address map and one additional bit for identifying the first die or the second die.

In Example 15, each array of the K arrays of coarse-grained reconfigurable units on the first die of Example 1 and each array of the L arrays of coarse-grained reconfigurable units on the second die comprises: control and status registers; compute units; memory units; and an array-level network that couples the control and status registers, the compute units, and the memory units.

In Example 16, the first physical function driver and the second physical function driver of Example 1 are a same physical function driver, wherein a first physical function that is associated with the same physical function driver has access to the first die, and wherein a second physical function that is associated with the same physical function driver has access to the second die.

In Example 17, up to N virtual functions are associated with one virtual function driver of the up to N virtual function drivers of Example 1, and wherein the up to N virtual functions are enabled and assigned arrays of the K arrays of coarse-grained reconfigurable units of the first die and/or of the L arrays of coarse-grained reconfigurable units of the second die.

In Example 18, an additional reconfigurable processor of the one or more reconfigurable processors of Example 17 comprises an additional package, at least a third die arranged in the additional package that comprises J arrays of coarse-grained reconfigurable units, where J is an integer greater than 1, and wherein the up to N virtual functions are further enabled and assigned arrays of the J arrays of coarse-grained reconfigurable units of the third die.

Example 19 is a method of operating a data processing system that comprises a communication link, a runtime processor that is operatively coupled to the communication link, and a reconfigurable processor, wherein the reconfigurable processor comprises a package, and first and second dies that are arranged in the package, wherein the first die comprises K arrays of coarse-grained reconfigurable units, where K is an integer greater than 1, and a first communication link interface that is operatively coupled to the communication link, thereby coupling the first die to the runtime processor via the communication link, and wherein the second die is coupled to the first die and comprises L arrays of coarse-grained reconfigurable units, where L is an integer greater than 1, and a second communication link interface that is operatively coupled to the communication link, thereby coupling the second die to the runtime processor via the communication link, the method comprising: configuring, with the runtime processor, the first communication link interface to provide access to the K arrays of coarse-grained reconfigurable units through the communication link from a first physical function driver and from up to M virtual function drivers, where M is a non-negative integer; configuring, with the runtime processor, a first physical function that is associated with the first physical function driver on the first die of the reconfigurable processor, wherein the first physical function is provided access to both a first portion and a second portion of the first die; configuring, with the runtime processor, the second communication link interface to provide access to the L arrays of coarse-grained reconfigurable units through the communication link from a second physical function driver and from up to N virtual function drivers, where N is a non-negative integer; configuring, with the runtime processor, a second physical function that is associated with the second physical function driver on the second die of the reconfigurable processor, wherein the second physical function is provided access to both a first portion and a second portion of the second die; and configuring, with the runtime processor, a virtual function that is associated with one of the M virtual function drivers or with one of the N virtual function drivers on the first die and/or the second die of the reconfigurable processor, wherein the virtual function is provided access to the second portion of the first and/or to the second portion of the second die and is blocked from accessing the first portion of the first die and the first portion of the second die.

In Example 20, K and L are both equal to two, wherein up to M virtual functions that are associated with the up to M virtual function drivers of Example 19 are enabled and assigned arrays of the K arrays of coarse-grained reconfigurable units of the first die, wherein up to N virtual functions that are associated with the up to N virtual function drivers are enabled and assigned arrays of the K arrays of coarse-grained reconfigurable units of the first die and/or of the L arrays of coarse-grained reconfigurable units of the second die, and wherein configuring, with the runtime processor, the second communication link interface further comprises: configuring, with the runtime processor, the second communication link interface to one of: a first configuration wherein no virtual function of the up to N virtual functions is enabled, a second configuration wherein one virtual function of the up to N virtual functions is assigned one array of the L arrays of coarse-grained reconfigurable units of the second die, a third configuration wherein one virtual function of the up to N virtual functions is assigned both of the L arrays of coarse-grained reconfigurable units of the second die, a fourth configuration wherein one virtual function of the up to N virtual functions is assigned both of the L arrays of coarse-grained reconfigurable units of the second die and one of the K arrays of coarse-grained reconfigurable units of the first die, a fifth configuration wherein one virtual function of the up to N virtual functions is assigned the K arrays of coarse-grained reconfigurable units of the first die and the L arrays of coarse-grained reconfigurable units of the second die, or a sixth configuration wherein one virtual function of the up to N virtual functions is assigned a first array of the L arrays of coarse-grained reconfigurable units of the second die and another virtual function of the up to N virtual functions is assigned a second array of the L arrays of coarse-grained reconfigurable units of the second die.

In Example 21, configuring, with the runtime processor, the first communication link interface of Example 20 further comprises: configuring, with the runtime processor, the first communication link interface to one of: a seventh configuration wherein no virtual function of the up to M virtual functions is enabled, an eighth configuration wherein one virtual function of the up to M virtual functions is assigned one array of the K arrays of coarse-grained reconfigurable units of the first die, when the second communication link interface is configured in the first, second, third, fourth, or sixth configuration, a ninth configuration wherein one virtual function of the up to M virtual functions is assigned both of the K arrays of coarse-grained reconfigurable units of the first die, when the second communication link interface is configured in the first, second, third, or sixth configuration, or a tenth configuration wherein one virtual function of the up to M virtual functions is assigned a first array of the K arrays of coarse-grained reconfigurable units of the first die and another virtual function of the up to M virtual functions is assigned a second array of the K arrays of coarse-grained reconfigurable units of the first die, when the second communication link interface is configured in the first, second, third, or sixth configuration.

In Example 22, each die of the first and second dies of Example 20 further comprises a double-data rate (DDR) memory interface, and wherein configuring, with the runtime processor, the second communication link interface further comprises: in the second, third, and sixth configurations, enabling, with the runtime processor, access from the one virtual function on the second die to the DDR memory interface of the second die and preventing access from the one virtual function on the second die to the DDR memory interface of the first die; and in the fourth and fifth configurations, enabling, with the runtime processor, access from the one virtual function to the DDR memory interface of the first die and to the DDR memory interface of the second die.

In Example 23, the communication link of Example 19 comprises a Peripheral Component Interface Express (PCIe) bus, and wherein the first and second communication link interfaces each comprises a PCIe interface, the method further comprising: programming, with the runtime processor, a first predetermined number of base address registers (BARs) of the first communication link interface for a first virtual function of up to M virtual functions that are associated with the up to M virtual function drivers and a second predetermined number of BARs of the second communication link interface for a second virtual function of up to N virtual functions that are associated with the up to N virtual function drivers.

Example 24 is a non-transitory computer-readable storage medium including instructions that, when executed by a processing unit, cause the processing unit to operate a data processing system that comprises a communication link, a runtime processor that is operatively coupled to the communication link, and a reconfigurable processor, wherein the reconfigurable processor comprises a package, and first and second dies that are arranged in the package, wherein the first die comprises K arrays of coarse-grained reconfigurable units, where K is an integer greater than 1, and a first communication link interface that is operatively coupled to the communication link, thereby coupling the first die to the runtime processor via the communication link, and wherein the second die is coupled to the first die and comprises L arrays of coarse-grained reconfigurable units, where L is an integer greater than 1, and a second communication link interface that is operatively coupled to the communication link, thereby coupling the second die to the runtime processor via the communication link, the instructions comprising: configuring the first communication link interface to provide access to the K arrays of coarse-grained reconfigurable units through the communication link from a first physical function driver and from up to M virtual function drivers, where M is a non-negative integer; configuring a first physical function that is associated with the first physical function driver on the first die of the reconfigurable processor, wherein the first physical function is provided access to both a first portion and a second portion of the first die; configuring the second communication link interface to provide access to the L arrays of coarse-grained reconfigurable units through the communication link from a second physical function driver and from up to N virtual function drivers, where N is a non-negative integer; configuring a second physical function that is associated with the second physical function driver on the second die of the reconfigurable processor, wherein the second physical function is provided access to both a first portion and a second portion of the second die; and configuring a virtual function that is associated with one of the M virtual function drivers or with one of the N virtual function drivers on the first die and/or the second die of the reconfigurable processor, wherein the virtual function is provided access to the second portion of the first and/or to the second portion of the second die and is blocked from accessing the first portion of the first die and the first portion of the second die.

Example 25 is a system, comprising: a communication link; a runtime processor that is operatively coupled to the communication link; a reconfigurable processor adapted for generating an interrupt to the runtime processor in response to a predetermined event, the reconfigurable processor comprising: a package; a first die that is arranged in the package and comprises: first arrays of coarse-grained reconfigurable units, and a first communication link interface that couples the first die to the runtime processor via the communication link; and a second die that is arranged in the package and comprises: second arrays of coarse-grained reconfigurable units, and a second communication link interface that couples the second die to the runtime processor via the communication link, wherein the runtime processor is adapted for configuring the first and second communication link interfaces to provide access to the first and second arrays of coarse-grained reconfigurable units from first and second physical function drivers and from at least one virtual function driver, and wherein the reconfigurable processor is adapted for sending the interrupt to the first physical function driver or for sending the interrupt to the second physical function driver and for sending the interrupt to a virtual function driver of the at least one virtual function driver.

In Example 26, each virtual function of at least one virtual function associated with the at least one virtual function driver of Example 25 has exclusive access among the at least one virtual function to at least one array of the first arrays of coarse-grained reconfigurable units or to at least one array of the second arrays of coarse-grained reconfigurable units.

In Example 27, the predetermined event of Example 25 comprises at least one of a load-complete event, an execution-complete event, a checkpoint event, a direct memory access (DMA) completion event, a DMA error event, a memory access error, or a runtime exception.

In Example 28, each one of the first and second dies of the reconfigurable processor of Example 25 further comprises: storage circuitry that is adapted for storing a first identifier that identifies an array of the first and second arrays of coarse-grained reconfigurable units that generated the interrupt and for storing a second identifier that identifies the predetermined event that caused the interrupt.

In Example 29, the communication link of Example 28 comprises a Peripheral Component Interface Express (PCIe) bus and the first and second communication link interfaces comprise respective PCIe interfaces, wherein the reconfigurable processor is adapted for sending a first PCIe message signaled interrupt (MSI-X) to the runtime processor in response to the predetermined event occurring on the first die, and wherein the reconfigurable processor is adapted for sending a second PCIe message signaled interrupt (MSI-X) to the runtime processor in response to the predetermined event occurring on the second die.

In Example 30, the storage circuitry of Example 29 further comprises: status registers that are adapted for storing the first identifier; and an interrupt status array (ISA) that is adapted for storing the second identifier.

In Example 31, the runtime processor of Example 30 is adapted for implementing a pair of ISA and status registers for each one of the first and second physical function drivers and for each one of the at least one virtual function driver.

In Example 32, a first virtual function of at least one virtual function that is associated with the at least one virtual function driver of Example 25 has exclusive access among the at least one virtual function to a predetermined array of the first arrays of coarse-grained reconfigurable units, and wherein the reconfigurable processor is adapted for routing the interrupt to the first physical function driver and to a first virtual function driver that is associated with the first virtual function when the predetermined event occurred in the predetermined array of the first arrays of coarse-grained reconfigurable units.

In Example 33, external memory that is operatively coupled to the communication link of Example 32, wherein the first virtual function has exclusive access among the at least one virtual function to a predetermined portion of the external memory, and wherein the reconfigurable processor is adapted for routing the interrupt to the first physical function driver and to the first virtual function driver when the predetermined event occurred in the predetermined portion of the external memory or during access to the predetermined portion of the external memory.

In Example 34, the reconfigurable processor of Example 32 further comprises: a virtualization mailbox for sending messages from a first physical function that is associated with the first physical function driver to the first virtual function, wherein the first physical function generates an additional interrupt when the first physical function sends a message to the first virtual function, and wherein the reconfigurable processor is adapted for routing the additional interrupt to the first virtual function driver.

Example 35 is a method of operating a system that comprises a communication link, a runtime processor that is operatively coupled to the communication link, and a reconfigurable processor comprising a package, first and second dies that are arranged in the package, wherein the first die comprises first arrays of coarse-grained reconfigurable units and a first communication link interface that couples the first die to the runtime processor via the communication link, and wherein the second die comprises second arrays of coarse-grained reconfigurable units and a second communication link interface that couples the second die to the runtime processor via the communication link, the method comprising: configuring, with the runtime processor, the first and second communication link interfaces to provide access to the first and second arrays of coarse-grained reconfigurable units from first and second physical function drivers and from at least one virtual function driver; generating, with the reconfigurable processor, an interrupt in response to a predetermined event; and routing, with the reconfigurable processor, the interrupt to one of the first physical function driver or the second physical function driver and to a virtual function driver of the at least one virtual function driver.

In Example 36, each die of the first and second dies of the reconfigurable processor of Example 35 further comprises storage circuitry, the method further comprising: storing a first identifier in the storage circuitry that identifies an array of the first and second arrays of coarse-grained reconfigurable units that generated the interrupt; and storing a second identifier in the storage circuitry that identifies the predetermined event that caused the interrupt.

In Example 37, the communication link of Example 36 comprises a Peripheral Component Interface Express (PCIe) bus, the method further comprising: with the reconfigurable processor, implementing a PCIe message signaled interrupt (MSI-X) in response to the predetermined event.

In Example 38, the storage circuitry of Example 37 further comprises status registers that are adapted for storing the first identifier and an interrupt status array (ISA) that is adapted for storing the second identifier, the method further comprising: with the reconfigurable processor, implementing a pair of ISA and status registers for each one of a first physical function that is associated with the first physical function driver, a second physical function that is associated with the second physical function driver, and for each one of at least one virtual function that is associated with the at least one virtual function driver.

In Example 39, a first virtual function of at least one virtual function that is associated with a first virtual function driver of the at least one virtual function driver of Example 35 has exclusive access among the at least one virtual function to a predetermined array of the first arrays of coarse-grained reconfigurable units, the method further comprising: with the reconfigurable processor, routing the interrupt to the first physical function driver and to the first virtual function driver when the predetermined event occurred in the predetermined array of the first arrays of coarse-grained reconfigurable units.

In Example 40, the system of Example 39 further comprises external memory that is that is operatively coupled to the communication link, wherein the first virtual function has exclusive access among the at least one virtual function to a predetermined portion of the external memory, the method further comprising: with the reconfigurable processor, routing the interrupt to the first physical function driver and to the first virtual function driver when the predetermined event occurred in the predetermined portion of the external memory or during access to the predetermined portion of the external memory.

In Example 41, the reconfigurable processor of Example 39 further comprises a virtualization mailbox for sending messages from the first physical function to the first virtual function, wherein the first physical function generates an additional interrupt when the first physical function sends a message to the first virtual function, the method further comprising: with the reconfigurable processor, routing the additional interrupt to the first virtual function driver.

Example 42 is a non-transitory computer-readable storage medium including instructions that, when executed by a processing unit, cause the processing unit to operate a system that comprises a communication link, a runtime processor that is operatively coupled to the communication link, and a reconfigurable processor comprising a package, first and second dies that are arranged in the package, wherein the first die comprises first arrays of coarse-grained reconfigurable units and a first communication link interface that couples the first die to the runtime processor via the communication link, and wherein the second die comprises second arrays of coarse-grained reconfigurable units and a second communication link interface that couples the second die to the runtime processor via the communication link, the instructions comprising: configuring the first and second communication link interfaces to provide access to the first and second arrays of coarse-grained reconfigurable units from first and second physical function drivers and from at least one virtual function driver; generating an interrupt in response to a predetermined event; and routing the interrupt to one of the first physical function driver or the second physical function driver and to a virtual function driver of the at least one virtual function driver.

In Example 43, a first virtual function of the at least one virtual function that is associated with a first virtual function driver of the at least one virtual function driver of Example 42 has exclusive access among the at least one virtual function to a predetermined array of the first arrays of coarse-grained reconfigurable units, the instructions further comprising: routing the interrupt to the first physical function driver and to the first virtual function driver when the predetermined event occurred in the predetermined array of the first arrays of coarse-grained reconfigurable units.

In Example 44, the system further comprises external memory that is that is operatively coupled to the communication link of Example 43, wherein the first virtual function has exclusive access among the at least one virtual function to a predetermined portion of the external memory, the instructions further comprising: routing the interrupt to the first physical function driver and to the first virtual function driver when the predetermined event occurred in the predetermined portion of the external memory or during access to the predetermined portion of the external memory.

In Example 45, the reconfigurable processor of Example 43 further comprises a virtualization mailbox for sending messages from the first physical function to the first virtual function, wherein the first physical function generates an additional interrupt when the first physical function sends a message to the first virtual function, the instructions further comprising: routing the additional interrupt to the first virtual function driver.

What is claimed is:
1. A system, comprising:
a communication link;
a runtime processor that is operatively coupled to the communication link;
a reconfigurable processor adapted for generating an interrupt to the runtime processor in response to a predetermined event, the reconfigurable processor comprising:
a package;
a first die that is arranged in the package and comprises:
first arrays of coarse-grained reconfigurable units, and a first communication link interface that couples the first die to the runtime processor via the communication link; and
a second die that is arranged in the package and comprises:
second arrays of coarse-grained reconfigurable units, and
a second communication link interface that couples the second die to the runtime processor via the communication link,
wherein the runtime processor is adapted for configuring the first and second communication link interfaces to provide access to the first and second arrays of coarse-grained reconfigurable units from first and second physical function drivers and from at least one virtual function driver, and wherein the reconfigurable processor is adapted for sending the interrupt to the first physical function driver or for sending the interrupt to the second physical function driver and for sending the interrupt to a virtual function driver of the at least one virtual function driver.

2. The system of claim 1, wherein each virtual function of at least one virtual function associated with the at least one virtual function driver has exclusive access among the at least one virtual function to at least one array of the first arrays of coarse-grained reconfigurable units or to at least one array of the second arrays of coarse-grained reconfigurable units.

3. The system of claim 1, wherein the predetermined event comprises at least one of a load-complete event, an execution-complete event, a checkpoint event, a direct memory access (DMA) completion event, a DMA error event, a memory access error, or a runtime exception.

4. The system of claim 1, wherein each one of the first and second dies of the reconfigurable processor further comprises:
storage circuitry that is adapted for storing a first identifier that identifies an array of the first and second arrays of coarse-grained reconfigurable units that generated the interrupt and for storing a second identifier that identifies the predetermined event that caused the interrupt.

5. The system of claim 4, wherein the communication link comprises a Peripheral Component Interface Express (PCIe) bus and the first and second communication link interfaces comprise respective PCIe interfaces, wherein the reconfigurable processor is adapted for sending a first PCIe message signaled interrupt (MSI-X) to the runtime processor in response to the predetermined event occurring on the first die, and wherein the reconfigurable processor is adapted for sending a second PCIe message signaled interrupt (MSI-X) to the runtime processor in response to the predetermined event occurring on the second die.

6. The system of claim 5, wherein the storage circuitry further comprises:
status registers that are adapted for storing the first identifier; and
an interrupt status array (ISA) that is adapted for storing the second identifier.

7. The system of claim 6, wherein the runtime processor is adapted for implementing a pair of ISA and status registers for each one of the first and second physical function drivers and for each one of the at least one virtual function driver.

8. The system of claim 1, wherein a first virtual function of at least one virtual function that is associated with the at least one virtual function driver has exclusive access among the at least one virtual function to a predetermined array of the first arrays of coarse-grained reconfigurable units, and wherein the reconfigurable processor is adapted for routing the interrupt to the first physical function driver and to a first virtual function driver that is associated with the first virtual function when the predetermined event occurred in the predetermined array of the first arrays of coarse-grained reconfigurable units.

9. The system of claim 8, further comprising:
external memory that is operatively coupled to the communication link, wherein the first virtual function has exclusive access among the at least one virtual function to a predetermined portion of the external memory, and wherein the reconfigurable processor is adapted for routing the interrupt to the first physical function driver and to the first virtual function driver when the predetermined event occurred in the predetermined portion of the external memory or during access to the predetermined portion of the external memory.

10. The system of claim 8, wherein the reconfigurable processor further comprises:
a virtualization mailbox for sending messages from a first physical function that is associated with the first physical function driver to the first virtual function, wherein the first physical function generates an additional interrupt when the first physical function sends a message to the first virtual function, and wherein the reconfigurable processor is adapted for routing the additional interrupt to the first virtual function driver.

11. A method of operating a system that comprises a communication link, a runtime processor that is operatively coupled to the communication link, and a reconfigurable processor comprising a package, first and second dies that are arranged in the package, wherein the first die comprises first arrays of coarse-grained reconfigurable units and a first communication link interface that couples the first die to the runtime processor via the communication link, and wherein the second die comprises second arrays of coarse-grained reconfigurable units and a second communication link interface that couples the second die to the runtime processor via the communication link, the method comprising:
configuring, with the runtime processor, the first and second communication link interfaces to provide access to the first and second arrays of coarse-grained reconfigurable units from first and second physical function drivers and from at least one virtual function driver;
generating, with the reconfigurable processor, an interrupt in response to a predetermined event; and
routing, with the reconfigurable processor, the interrupt to one of the first physical function driver or the second physical function driver and to a virtual function driver of the at least one virtual function driver.

12. The method of claim 11, wherein each die of the first and second dies of the reconfigurable processor further comprises storage circuitry, the method further comprising:
storing a first identifier in the storage circuitry that identifies an array of the first and second arrays of coarse-grained reconfigurable units that generated the interrupt; and
storing a second identifier in the storage circuitry that identifies the predetermined event that caused the interrupt.

13. The method of claim 12, wherein the communication link comprises a Peripheral Component Interface Express (PCIe) bus, the method further comprising:
with the reconfigurable processor, implementing a PCIe message signaled interrupt (MSI-X) in response to the predetermined event.

14. The method of claim 13, wherein the storage circuitry further comprises status registers that are adapted for storing the first identifier and an interrupt status array (ISA) that is adapted for storing the second identifier, the method further comprising:
with the reconfigurable processor, implementing a pair of ISA and status registers for each one of a first physical function that is associated with the first physical function driver, a second physical function that is associated with the second physical function driver, and for each one of at least one virtual function that is associated with the at least one virtual function driver.

15. The method of claim 11, wherein a first virtual function of at least one virtual function that is associated with a first virtual function driver of the at least one virtual function driver has exclusive access among the at least one virtual function to a predetermined array of the first arrays of coarse-grained reconfigurable units, the method further comprising:
with the reconfigurable processor, routing the interrupt to the first physical function driver and to the first virtual function driver when the predetermined event occurred in the predetermined array of the first arrays of coarse-grained reconfigurable units.

16. The method of claim 15, wherein the system further comprises external memory that is that is operatively coupled to the communication link, wherein the first virtual function has exclusive access among the at least one virtual function to a predetermined portion of the external memory, the method further comprising:
with the reconfigurable processor, routing the interrupt to the first physical function driver and to the first virtual function driver when the predetermined event occurred in the predetermined portion of the external memory or during access to the predetermined portion of the external memory.

17. The method of claim 15, wherein the reconfigurable processor further comprises a virtualization mailbox for sending messages from the first physical function to the first virtual function, wherein the first physical function generates an additional interrupt when the first physical function sends a message to the first virtual function, the method further comprising:
with the reconfigurable processor, routing the additional interrupt to the first virtual function driver.

18. A non-transitory computer-readable storage medium including instructions that, when executed by a processing unit, cause the processing unit to operate a system that comprises a communication link, a runtime processor that is operatively coupled to the communication link, and a reconfigurable processor comprising a package, first and second dies that are arranged in the package, wherein the first die comprises first arrays of coarse-grained reconfigurable units and a first communication link interface that couples the first die to the runtime processor via the communication link, and wherein the second die comprises second arrays of coarse-grained reconfigurable units and a second communication link interface that couples the second die to the runtime processor via the communication link, the instructions comprising:
    configuring the first and second communication link interfaces to provide access to the first and second arrays of coarse-grained reconfigurable units from first and second physical function drivers and from at least one virtual function driver;
    generating an interrupt in response to a predetermined event; and
    routing the interrupt to one of the first physical function driver or the second physical function driver and to a virtual function driver of the at least one virtual function driver.

19. The non-transitory computer-readable storage medium of claim 18, wherein a first virtual function of the at least one virtual function that is associated with a first virtual function driver of the at least one virtual function driver has exclusive access among the at least one virtual function to a predetermined array of the first arrays of coarse-grained reconfigurable units, the instructions further comprising:
    routing the interrupt to the first physical function driver and to the first virtual function driver when the predetermined event occurred in the predetermined array of the first arrays of coarse-grained reconfigurable units.

20. The non-transitory computer-readable storage medium of claim 19, wherein the system further comprises external memory that is that is operatively coupled to the communication link, wherein the first virtual function has exclusive access among the at least one virtual function to a predetermined portion of the external memory, the instructions further comprising:
    routing the interrupt to the first physical function driver and to the first virtual function driver when the predetermined event occurred in the predetermined portion of the external memory or during access to the predetermined portion of the external memory.

* * * * *